United States Patent
Amano et al.

(10) Patent No.: US 9,924,231 B2
(45) Date of Patent: Mar. 20, 2018

(54) INFORMATION PRESENTATION METHOD, OPERATION PROGRAM, AND INFORMATION PRESENTATION SYSTEM

(71) Applicant: Panasonic Intellectual Property Corporation of America, Torrance, CA (US)

(72) Inventors: Hiroshi Amano, Osaka (JP); Toshihisa Nakano, Osaka (JP); Motoji Ohmori, Osaka (JP); Takako Hirose, Kyoto (JP); Shunji Harada, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 38 days.

(21) Appl. No.: 14/782,678

(22) PCT Filed: Jul. 24, 2014

(86) PCT No.: PCT/JP2014/003916
§ 371 (c)(1),
(2) Date: Oct. 6, 2015

(87) PCT Pub. No.: WO2015/015779
PCT Pub. Date: Feb. 5, 2015

(65) Prior Publication Data
US 2016/0219336 A1 Jul. 28, 2016

Related U.S. Application Data

(60) Provisional application No. 61/860,639, filed on Jul. 31, 2013.

(51) Int. Cl.
*H04N 21/478* (2011.01)
*G01C 21/36* (2006.01)
(Continued)

(52) U.S. Cl.
CPC ....... *H04N 21/478* (2013.01); *G01C 21/3605* (2013.01); *G06F 17/30268* (2013.01);
(Continued)

(58) Field of Classification Search
None
See application file for complete search history.

(56) References Cited

U.S. PATENT DOCUMENTS

2003/0005431 A1* 1/2003 Shinohara ............ H04H 60/45
725/12
2003/0097301 A1* 5/2003 Kageyama ........ G06F 17/30265
705/14.52
(Continued)

FOREIGN PATENT DOCUMENTS

EP 0 240 336 10/1987
JP 2005-294893 10/2005
(Continued)

OTHER PUBLICATIONS

Extended European Search Report issued Jun. 10, 2016 in corresponding European Patent Application No. 14833048.
(Continued)

*Primary Examiner* — Nathan J Flynn
*Assistant Examiner* — Christen A Kurien
(74) *Attorney, Agent, or Firm* — Wenderoth, Lind & Ponack, L.L.P.

(57) ABSTRACT

An information presenting device (100) presents image information; an operative device (200) accepts a predetermined input operation during the presentation of the image information; a guide information managing device (300) stores date and time information indicating a date and a time at which the input operation is accepted, image specifying information specifying image information presented when the input operation is accepted, and guide destination infor-
(Continued)

mation indicating a guide destination to which the user is guided is stored in a database in association with one another, the guide destination information being specified by the date and time information, and the image specifying information; and a guide device (400) presents the guide destination information in response to a request from the user.

16 Claims, 44 Drawing Sheets

(51) Int. Cl.
| | |
|---|---|
| *H04N 21/41* | (2011.01) |
| *H04N 21/482* | (2011.01) |
| *G08G 1/0968* | (2006.01) |
| *H04N 21/235* | (2011.01) |
| *H04N 21/25* | (2011.01) |
| *H04N 21/442* | (2011.01) |
| *H04N 21/4728* | (2011.01) |
| *H04N 21/475* | (2011.01) |
| *G06F 17/30* | (2006.01) |
| *G06Q 30/02* | (2012.01) |
| *H04N 21/422* | (2011.01) |
| *H04N 21/45* | (2011.01) |
| *H04N 21/458* | (2011.01) |

(52) U.S. Cl.
CPC ..... *G06Q 30/0207* (2013.01); *G06Q 30/0241* (2013.01); *G08G 1/096816* (2013.01); *G08G 1/096838* (2013.01); *G08G 1/096861* (2013.01); *G08G 1/096872* (2013.01); *G08G 1/096888* (2013.01); *G08G 1/096894* (2013.01); *H04N 21/2353* (2013.01); *H04N 21/252* (2013.01); *H04N 21/4126* (2013.01); *H04N 21/4221* (2013.01); *H04N 21/42203* (2013.01); *H04N 21/44218* (2013.01); *H04N 21/44222* (2013.01); *H04N 21/458* (2013.01); *H04N 21/4532* (2013.01); *H04N 21/4728* (2013.01); *H04N 21/4755* (2013.01); *H04N 21/4821* (2013.01); *H04N 21/4823* (2013.01)

(56) References Cited

U.S. PATENT DOCUMENTS

| | | | | |
|---|---|---|---|---|
| 2006/0015912 | A1* | 1/2006 | Itabashi | G01C 21/32 725/75 |
| 2010/0169905 | A1* | 7/2010 | Fukuchi | H04N 21/4223 725/10 |
| 2010/0250136 | A1* | 9/2010 | Chen | G06F 17/30247 701/300 |
| 2011/0130953 | A1 | 6/2011 | Ohishi et al. | |
| 2011/0295971 | A1 | 12/2011 | Takagi | |

FOREIGN PATENT DOCUMENTS

| | | |
|---|---|---|
| JP | 2008-96361 | 4/2008 |
| JP | 2008-107927 | 5/2008 |
| JP | 2009-87026 | 4/2009 |
| JP | 2009-129002 | 6/2009 |
| JP | 2011-78008 | 4/2011 |
| JP | 2012-3437 | 1/2012 |
| WO | 2007/099815 | 9/2007 |
| WO | 2007/116662 | 10/2007 |

OTHER PUBLICATIONS

Yolanda Blanco-Fernandez et al., "Exploiting Digital TV Users' Preferences in a Tourism Recommender System based on Semantic Reasoning", May 2010, IEEE Transactions on Consumer Electronics, Vo. 56, No. 2.

International Search Report dated Oct. 21, 2014 in International (PCT) Application No. PCT/JP2014/003916.

* cited by examiner

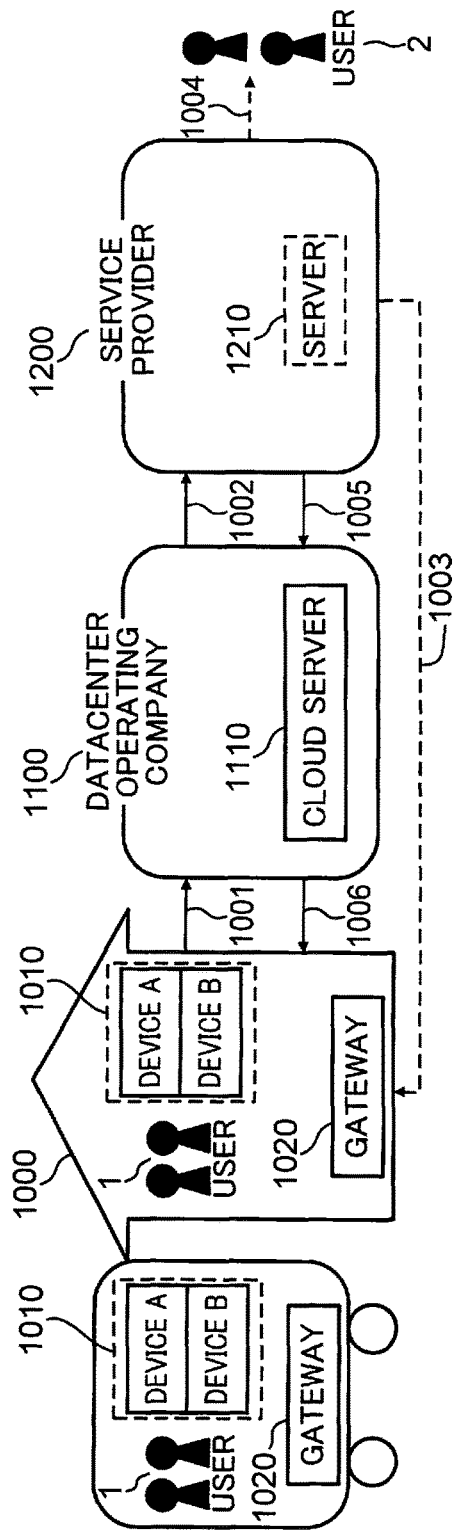
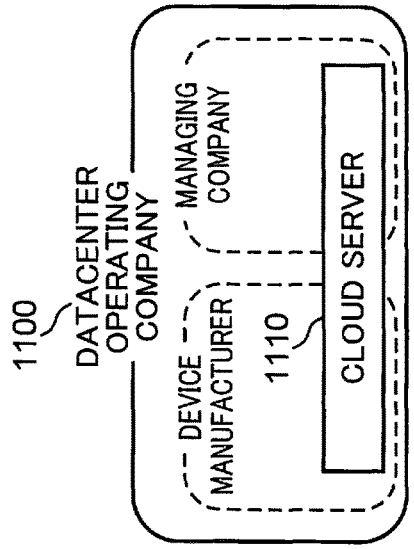
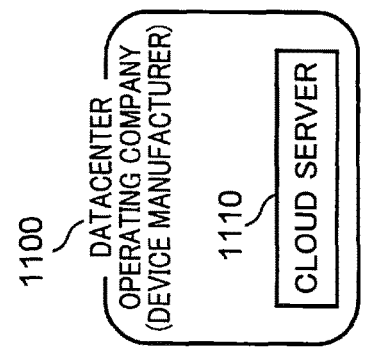

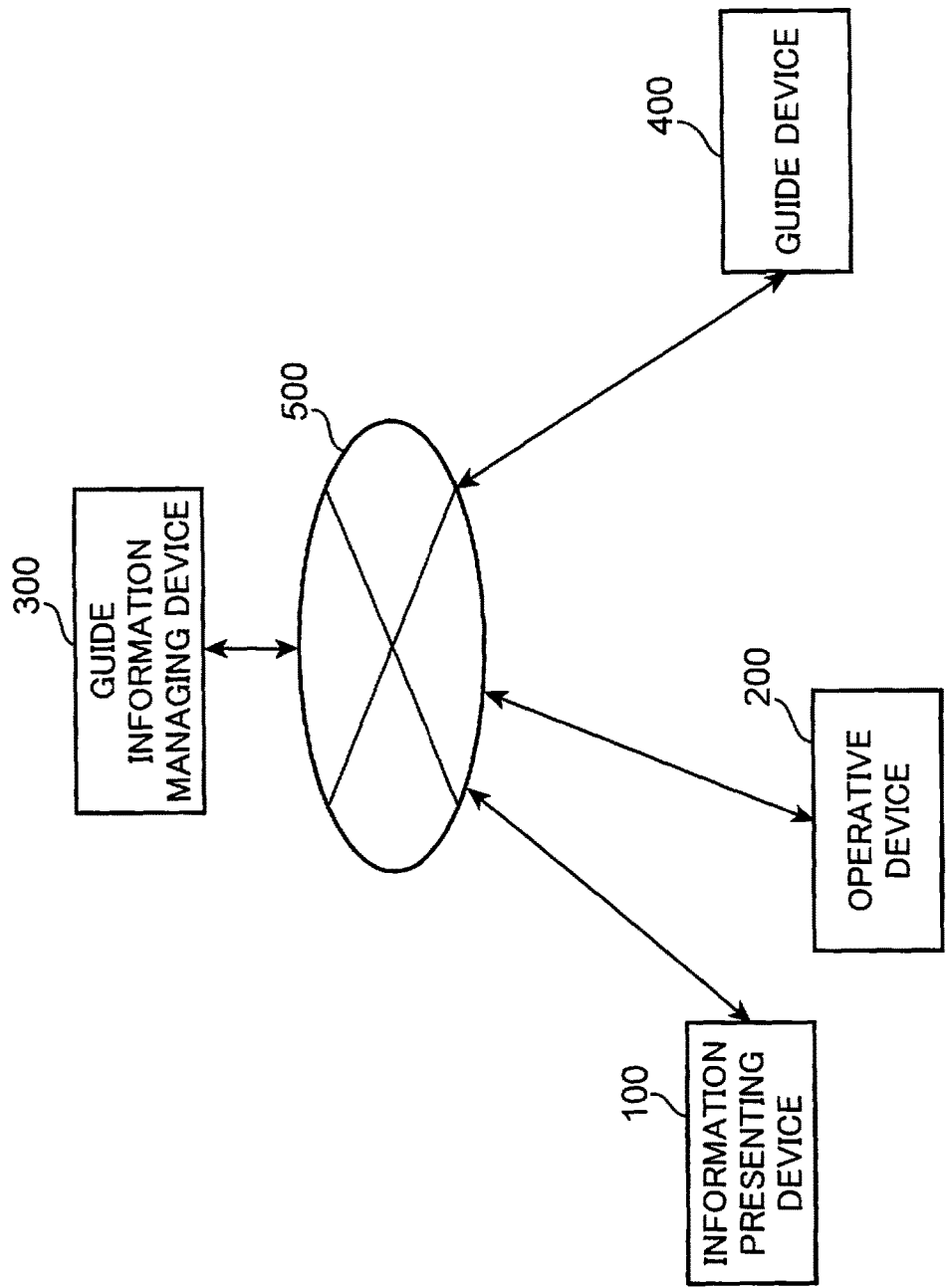

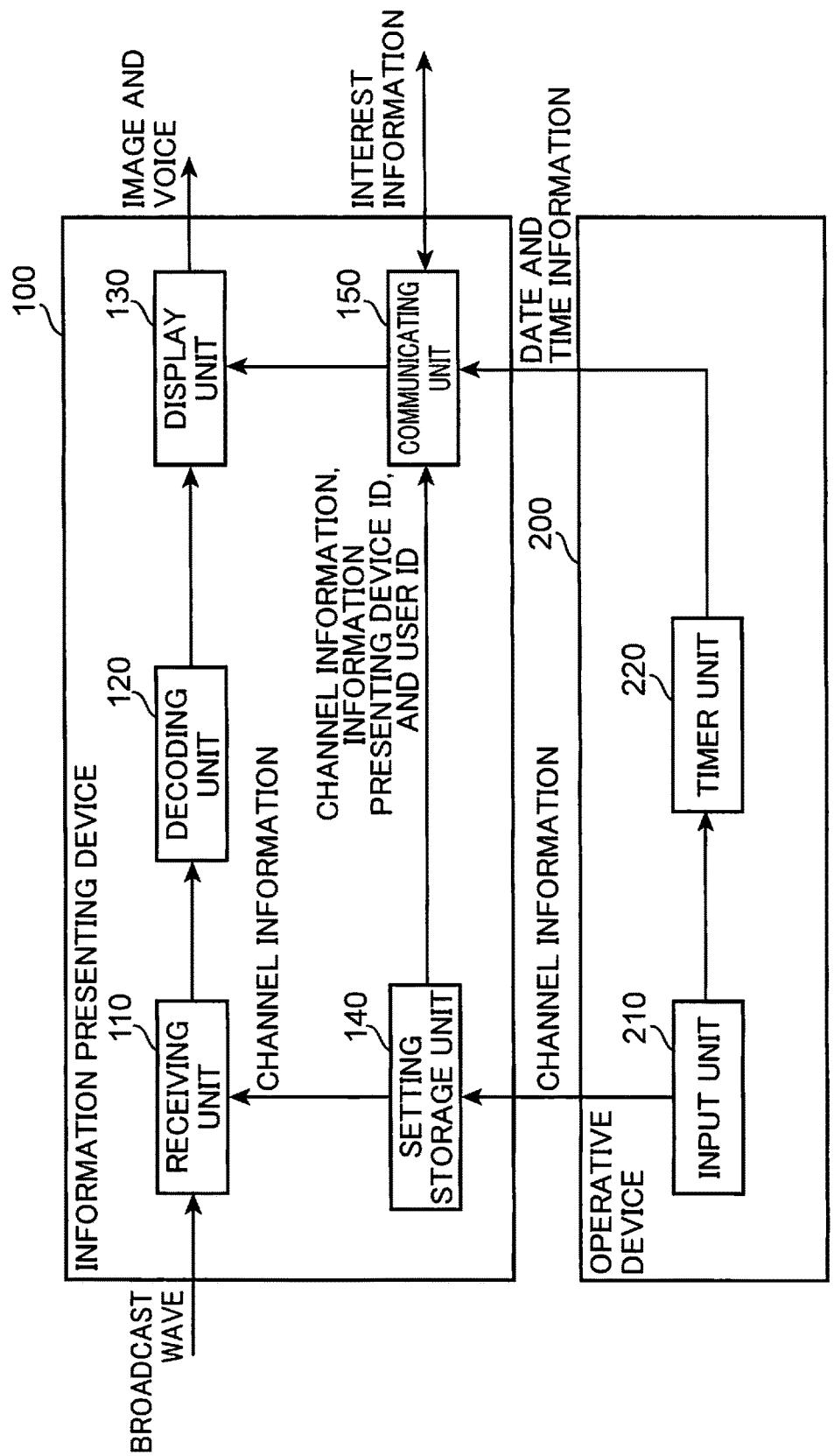

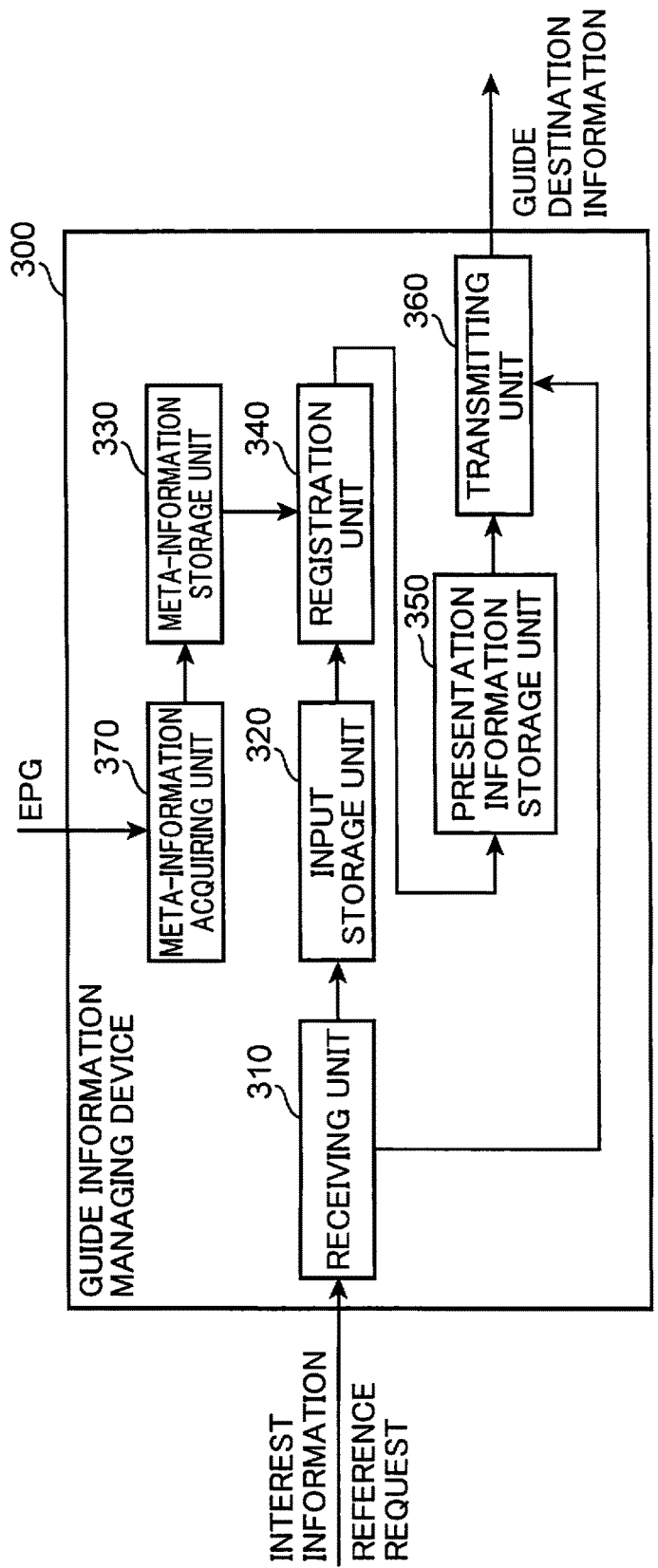

FIG.5

| DATE AND TIME | CHANNEL |
|---|---|
| 2013/06/23 10:17 | ch8 |
| 2013/06/26 11:07 | ch10 |
| 2013/06/26 19:20 | ch7 |
| 2013/06/26 21:01 | ch6 |
| ... | ... |
| 2013/06/28 14:03 | ch6 |

FIG.6

| CHANNEL | DATE AND TIME | PROGRAM NAME | SPOT INFORMATION | LOCATIONAL INFORMATION | ADDRESS | RELEVANT COMMODITY | TELEPHONE NUMBER | URL | CAST | SCENE INFORMATION |
|---|---|---|---|---|---|---|---|---|---|---|
| ch8 | 2013/06/23 10:00–10:15 | XXXX | YY | (34.702369, 135.507628) | AAAA | CCC | 00-0000-0000 | http://www.xxxx.html | EEE FFF GGG | TALK AT START OF PROGRAM |
| ch8 | 2013/06/23 10:15–10:30 | XXXX | ZZ | (34.687394, 135.525844) | BBBB | DDD | 11-1111-1111 | http://www.yyyy.net/ | HHH | HHH GOES TO ZZ |
| ⋮ | ⋮ | ⋮ | ⋮ | ⋮ | ⋮ | ⋮ | ⋮ | ⋮ | ⋮ | ⋮ |

FIG. 27

| DATE AND TIME | CHANNEL | CHARACTER STRING |
|---|---|---|
| 2013/06/23 10:17 | ch8 | CHINESE NOODLE |
| 2013/06/26 11:07 | ch10 | TEMPLE |
| 2013/06/26 19:20 | ch7 | CURRY HOUSE |
| 2013/06/26 21:01 | ch6 | DETARGENT |
| ... | ... | ... |
| 2013/06/28 14:03 | ch6 | AUTOMOBILE |

FIG. 33

| DATE AND TIME | CHANNEL | POSITIONAL COORDINATE (pixel) |
|---|---|---|
| 2013/06/23 10:17 | ch8 | (1234, 345) |
| 2013/06/26 11:07 | ch10 | (456, 987) |
| 2013/06/26 19:20 | ch7 | (46, 87) |
| 2013/06/26 21:01 | ch6 | (634, 245) |
| ... | ... | ... |
| 2013/06/28 14:03 | ch6 | (1534, 545) |

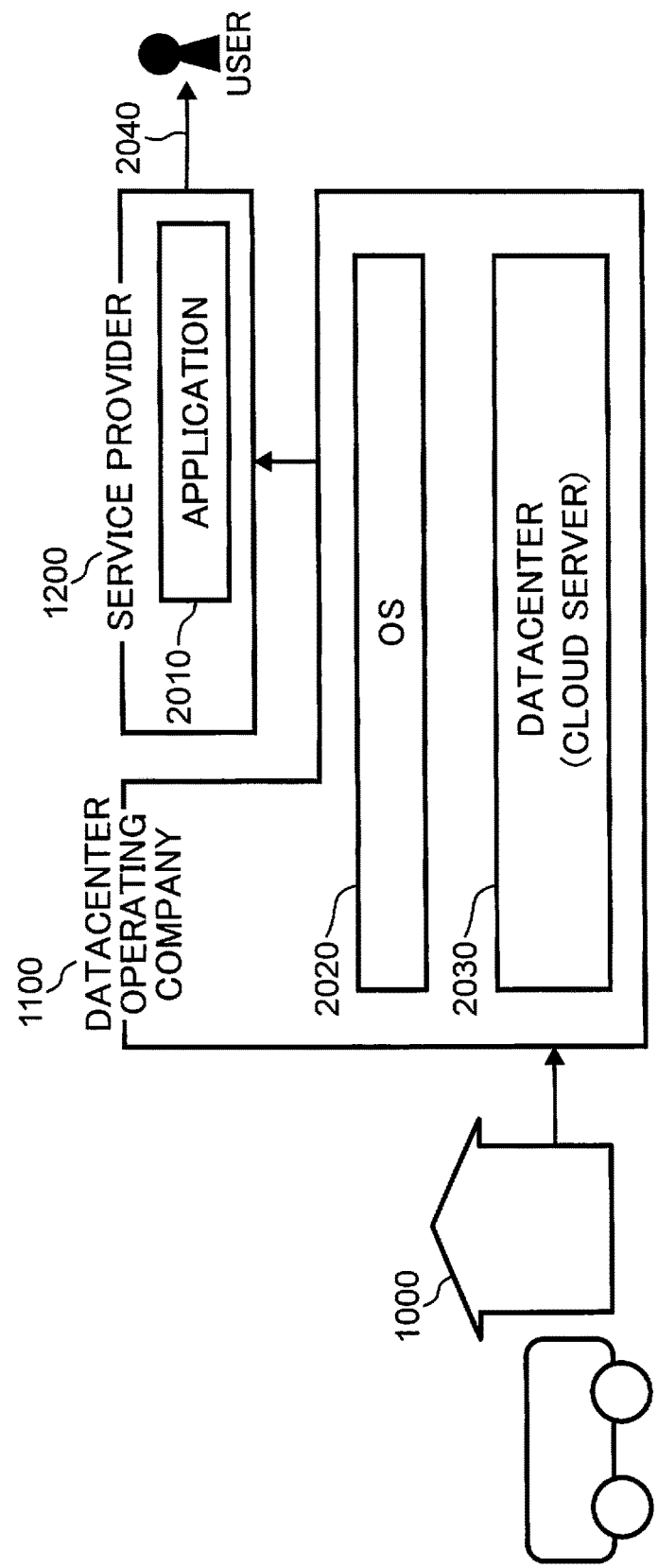

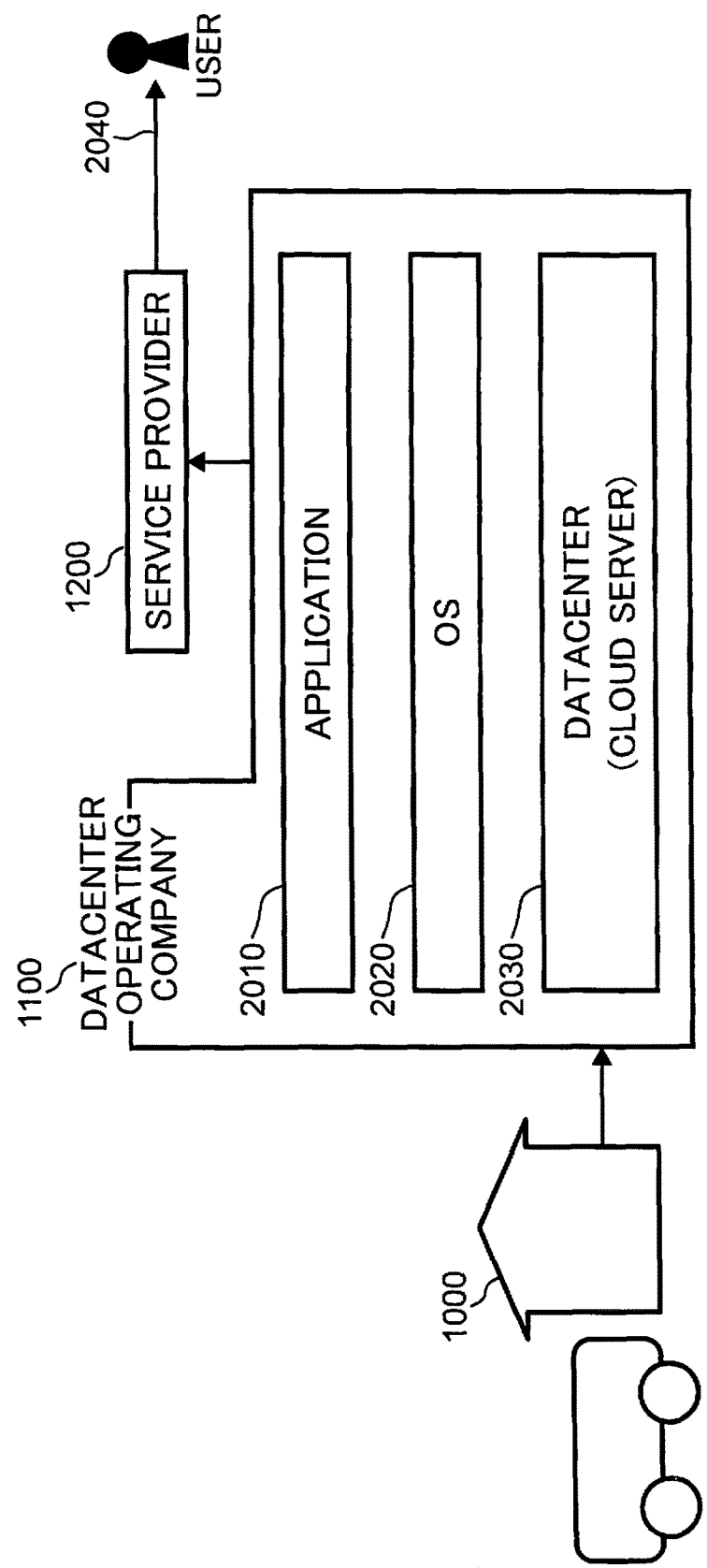

INFORMATION PRESENTATION METHOD, OPERATION PROGRAM, AND INFORMATION PRESENTATION SYSTEM

TECHNICAL FIELD

The present invention relates to a method for presenting information, an operation program, and a system for presenting information.

BACKGROUND ART

Conventionally, there has been a technology that allows to accept an operation input performed by a user at an arbitrary timing during an image output, and transfer locational information given to image data corresponding to the image output to a communication terminal to be used by the user (for example, see Patent Literature 1).

However, the conventional configuration has a problem that it is impossible to acquire locational information in a case that locational information given to an image does not exist during the image output, or that a plurality of pieces of locational information are included.

CITATION LIST

Patent Literature

Patent Literature 1: International Unexamined Patent Publication No. 2007/099815

SUMMARY OF INVENTION

The present invention has been worked out in order to solve the aforementioned problem. The present invention has an object of providing a method for presenting information, an operative program, and a system for presenting information wherein it is possible to guide a user to a guide destination introduced in a scene in which the user has an interest during viewing of interest information.

A method for presenting information according to one accept of the present invention includes: an image information presenting step of presenting image information; an operative step of accepting a predetermined input operation by a user during the presentation of the image information; a guide destination acquiring step of acquiring guide destination information indicating a guide destination to which the user is guided, the guide destination information being specified by date and time information indicating a date and a time at which the input operation is accepted in the operative step, and image specifying information specifying the image information presented in the image information presenting step when the input operation is accepted; a storing step of storing the date and time information, the image specifying information, and the guide destination information in a database in association with one another; and a guide destination presenting step of presenting the guide destination information in response to a request from the user.

According to the present invention, the guide destination information indicating the guide destination to which the user is guided is acquired, and the date and time information, the image specifying information, and the guide destination information is stored in the data base in association with one another, the guide destination information being specified by the date and time information indicating the date and the time at which the input operation is accepted, and the image specifying information specifying the image information presented when the input operation is accepted. Therefore, it is possible to guide the user to the guide destination introduced in the scene in which the user has the interest during viewing of the image information.

BRIEF DESCRIPTION OF DRAWINGS

FIG. 1A is a diagram illustrating an overview of services to be provided by a system for presenting information according to an embodiment, FIG. 1B is a diagram illustrating an example in which a device manufacturer is a datacenter operating company, and FIG. 1C is a diagram illustrating an example in which both or one of a device manufacturer and a managing company are/is the datacenter operating company.

FIG. 2 is a diagram illustrating a general configuration of a system for presenting information according to a first embodiment of the present invention.

FIG. 3 is a diagram illustrating a detailed configuration of an information presenting device and an operative device in the first embodiment of the present invention.

FIG. 4 is a diagram illustrating a detailed configuration of a guide information managing device in the first embodiment of the present invention.

FIG. 5 is a diagram illustrating an exemplary interest information table stored in an input storage unit in the first embodiment of the present invention.

FIG. 6 is a diagram illustrating an exemplary meta-information table stored in a meta-information storage unit in the first embodiment of the present invention.

FIG. 27 is a diagram illustrating an interest information table stored in an input storage unit in the second embodiment of the present invention.

FIG. 33 is a diagram illustrating an exemplary interest information table stored in an input storage unit in the third embodiment of the present invention.

FIG. 43 is a diagram illustrating an overview of services to be provided by a system for presenting information of service type 3 (cloud service using PaaS).

FIG. 44 is a diagram illustrating an overview of services to be provided by a system for presenting information of service type 4 (cloud service using SaaS).

DESCRIPTION OF EMBODIMENTS

Figure 7:
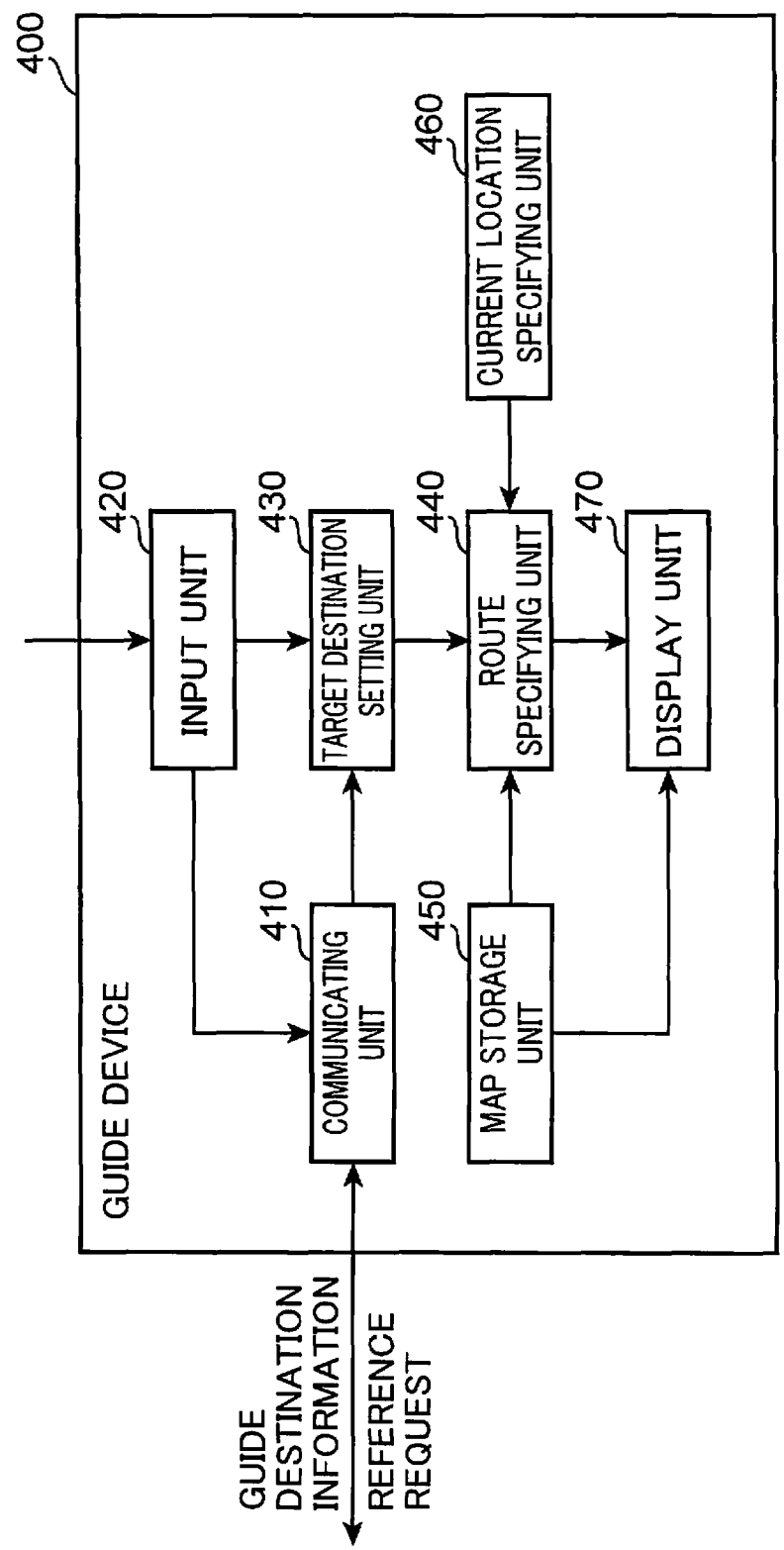
FIG. 7 is a diagram illustrating a detailed configuration of a guide device in the first embodiment of the present invention.

Hereinafter, embodiments of the present invention will be described with reference to the accompanying drawings. It should be noted that the following embodiments illustrate some examples of the invention, and not delimit the protection scope of the present invention.

(Overview of Services to be Provided)

FIG. 1A is a diagram illustrating an overview of services to be provided by a system for presenting information according to an embodiment, FIG. 1B is a diagram illustrating an example in which a device manufacturer is a datacenter operating company, and FIG. 1C is a diagram illustrating an example in which both or one of the device manufacturer and a managing company are/is the datacenter operating company.

A group 1000 is, for example, a company, a party, or a home, and the scale thereof does not matter. The group 1000 contains a plurality of devices 1010 including a device A and a device B, and a home gateway 1020. The plurality of devices 1010 include a device (e.g. a smartphone, a personal computer (PC), or a television) able to connect to the Internet, and a device (e.g. a lighting fixture, a washing machine, or a refrigerator) unable to connect to the Internet by itself. The plurality of devices 1010 may include a device which is not connectable to the Internet by itself, but is connectable to the Internet via the home gateway 1020. User 1 uses the plurality of the devices 1010 in the group 1000. For example, each of the plurality of devices 1010 shown in the group 1000 constitutes a terminal in the present embodiment.

A datacenter operating company 1100 includes a cloud server 1110. The cloud server 1110 is a virtual server associated with a variety of devices via the Internet. The cloud server 1110 mainly manages huge data (big data) which have difficulty in management by widely used database managing tools or the like. The datacenter operating company 1100 manages data, manages the cloud server 1110, and operates a datacenter which performs these operations. The details of the services performed by the datacenter operating company 1100 will be described later.

The datacenter operating company 1100 is not limited to a company which merely manages data or operates the cloud server 1110. For example, as illustrated in FIG. 1B, in the case of a device manufacturer which develops and manufactures one of the plurality of devices 1010 manages data or manages the cloud server 1110, the device manufacturer is the datacenter operating company 1100. Furthermore, the number of datacenter operating companies 1100 is not limited to one. For example, as illustrated in FIG. 1C, in the case of the device manufacturer and another managing company jointly or sharingly manage data or operates the cloud server 1110, both or one of the device manufacturer and the managing company are/is the datacenter operating company 1110.

A service provider 1200 has a server 1210. The scale of the server 1210 does not matter. Thus, the server 1210 includes, for example, a memory in a PC for personal use. Also, the service provider 1200 may not have the server 1210 in another case.

In the aforementioned services, the home gateway 1020 is not a necessary element. For example, in the case that the cloud server 1110 manages all the data, the home gateway 1020 is unnecessary. Furthermore, in the case that all the devices in a house are connected to the Internet, a device unable to connect to the Internet by itself may not exist.

Next, a flow of information in the aforementioned services will be described.

The device A or the device B in the group 1000 transmits corresponding log information to the cloud server 1110 of the datacenter operating company 1100. The cloud server 1110 collects the log information of the device A or the device B (see the arrow 1001 in FIG. 1A). The log information here is information indicating, for example, operation conditions or operation dates and times of the plurality of devices 1010. For example, the log information includes a viewing history of a television, information of recording reservation of a recorder, an operation date and time of a refrigerator, a quantity of laundry, dates and times at which a refrigerator is opened and closed, the number of times of the opening and closing of the refrigerator, but is not limited to these pieces of information, and may include a variety of pieces of information acquirable from a variety of devices. The log information may be directly provided from the plurality of devices 1010 themselves to the cloud server 1110 via the Internet. Also, the log information may be temporarily collected from a plurality of devices 1010 to the home gateway 1020, and provided from the home gateway 1020 to the cloud server 1110.

Subsequently, the cloud server 1110 of the datacenter operating company 1100 provides the collected log information to the service provider 1200 at a discrete extent. The discrete extent may be an extent to which the datacenter operating company 1100 can organize and provide the collected information to the service provider 1200, or an extent to which the service provider 1200 requests. The information is defined to be provided at the discrete extent, but may not be provided at the discrete extent. Alternatively, the amount of information to be provided may vary depending on a condition. The log information is stored in the server 121 (sic, 1210) provided in the service provider 1200, if necessary (see the arrow 1002 in FIG. 1A).

Then, the service provider 1200 organizes the log information into information suitable for a service to be provided to a user, and provides the organized information to the user. The user provided with the service may be the user 1 who uses the plurality of devices 1010, or may be external user 2. A method for providing a service to the users 1, 2 may include, for example, directly providing the service to the users 1, 2, from the service provider 1200 (the arrows 1003 and 1004 in FIG. 1A). A method for providing the service to the user 1 may include, for example, providing the service to the user 1 via the cloud server 1110 of the datacenter operating company 1100 again (the arrows 1005 and 1006 in FIG. 1A). Moreover, the cloud server 1110 of the datacenter operating company 1100 may organize the log information into information suitable for the service to be provided to the user, and provide the organized information to the service provider 1200.

It should be noted that the user 1 may be the same as or different from the user 2.

First Embodiment

General Configuration

FIG. 2 is a diagram illustrating a general configuration of a system for providing information according to a first embodiment of the present invention. The system for providing the information includes an information presenting device 100, an operative device 200, a guide information managing device 300, and a guide device 400.

The information presenting device 100 is communicatively connected to the operative device 200 via a network 500. Furthermore, the information presenting device 100 is communicatively connected to the guide information managing device 300 via the network 500. The guide information managing device 300 is communicatively connected to the guide device 400 via the network 500. The network 500 is, for example, the Internet.

<Detailed Configuration of Information Presenting Device 100>

FIG. 3 is a diagram illustrating a detailed configuration of the information presenting device 100 and the operative device 200 in the first embodiment of the present invention.

As illustrated in FIG. 3, the information presenting device 100 includes a receiving unit 110, a decoding unit 120, a display unit 130, a setting storage unit 140, and a communicating unit 150.

The receiving unit 110 receives a broadcast wave corresponding to channel information set in the setting storage unit 140.

The decoding unit 120 decodes the broadcast wave received by the receiving unit 110.

The display unit 130 presents (displays) the broadcast wave decoded by the decoding unit 120 or the information received by the communicating unit 150. The display unit 130 displays image information.

The setting storage unit 140 stores channel information transmitted from the operative device 200, an identification number of the information presenting device 100 (an information presenting device ID), an identification number of a user (a user ID), an identification number of the guide device 400 (a guide device ID), and other information.

The communicating unit 150 receives date and time information transmitted by the operative device 200. The communicating unit 150 reads out the channel information, the identification number of the information presenting device 100, and the identification number of the user from the setting storage unit 140, when receiving the date and time information. The communicating unit 150 transmits the date and time information received from the operative device 200, and the channel information, the identification number of the information presenting device 100 and the identification number of the user read out from the setting storage unit 140 when receiving the date and time information, as interest information to the guide information managing device 300.

The display unit 130 is configured by, for example, a liquid crystal display, a plasma display, or a projector. The display unit 130 may output a broadcast to a user in a visible manner by itself, or by another display device via a communication interface adapted to transmit an image signal and a voice signal. Moreover, the information presenting device 100 may store a received broadcast program in an internal storage device, or in a storage device (a recording device) connected via a wired cable, a wireless network, or the Internet. It is possible to view the broadcast program at any time which is different from the broadcast time.

<Detailed Configuration of Operative Device 200>

As illustrated in FIG. 3, the operative device 200 includes an input unit 210 and a timer unit 220.

The input unit 210 accepts an input operation about information indicating that a user has an interest in a program being viewed by the user, or information specifying a commodity or a place, in which the user has an interest, introduced in a program being viewed by the user. In this manner, the user can notify that the user has the interest in the presented information at the timing at which the user has the interest in the information presented from the display unit 130. The input unit 210 accepts a predetermined input operation by the user during presentation of the image information. The input unit 210 further accepts an operation of setting a channel for the information presenting device 100.

For example, the input unit 210 is configured by a button. The user pushes down the button at a timing at which the user has an interest in image information presented from the display unit 130 to thereby input the fact that the user has the interest in the currently displayed image information. The input unit 210 may be configured by, for example, a voice collector adaptable to receive a voice input in place of the button. Or, the input unit 210 may be configured by, for example, a device adaptable to accept a sight line input. Alternatively, the input unit 210 may be configured by, for example, a sensor or a camera adaptable to accept a gesture input. The input unit 210 further may be configured by a keyboard adaptable to accept a character input. Also, the input unit 210 may be configured by a pointing device such as a mouse. In this way, the input unit 210 may have any configuration adaptable to accept an input of information by the user about the user's interest.

For example, in the case that the operative device 200 is configured by a remote controller, the remote controller includes an interest button. Alternatively, a specific button provided to the remote controller is used as the interest button. When an interest candidate place is introduced in a program being viewed, the user pushes down the interest button. In this manner, the user can input the timing at which the user has the interest in the program being viewed.

In other cases, for example, in the case that the operative device 200 is configured by a smartphone, the smartphone displays an interest button on a display screen. The user pushes down the interest button when a candidate interest place is introduced in a program being viewed. The smartphone may cause an application adaptable to accept an input operation, or an application adaptable to collect voices in a peripheral area to activate, in place of displaying the interest button. When the interest candidate place is introduced in the program being viewed, the user utters voices indicating a demand, e.g. "want to go", "want to eat", or "want to buy". The application collects the voices indicating the demand of the user. Whereby, the input unit 210 determines that the timing at which the voices indicating the demand for the program being viewed corresponds to the timing at which the user has the interest in the program, and outputs a timing signal. The timer unit 220 outputs date and time information indicating a date and a time in response to the input of the timing signal. Accordingly, the user can specify a seen in which the user has the interest in the program being viewed.

Moreover, the input unit 210 can specify which coordinate position in a program being viewed presents an object or a place in which the user has an interest by, for example, acquiring a sight line position of the user over a screen in response to these input operations.

Furthermore, for example, in the case that a plurality of places are displayed in a program being viewed, when the input unit 210 accepts an voice input, the input unit 210 analyzes contents of the utterance of "want to go to XX" by the user to thereby realize specifying that the user has an interest in "XX". Also, the input unit 210 may judge that the user has an interest in all the information presented in the information presenting device 100, for example, at the timing at which the button is pushed down. Particularly, it can be assumed that the user has an interest in an image and a voice being viewed for which the user sets a channel.

When a signal indicating that the user has an interest in currently displayed image information is input from the input unit 210, the timer unit 220 outputs date and time information indicating the date and time at which the signal is input to the information presenting device 100.

The operative device 200 and the information presenting device 100 are communicatively connected to each other via, for example, an infrared communication, a near-field wireless communication, or a wireless communication.

In the present embodiment, the operative device 200 includes the timer unit 220. Alternatively, the information presenting device 100 may include the timer unit 220 under the condition that the information presented from the display unit 130 to the user is in synchronism with the predetermined input operation by the user.

When the signal indicating the timing at which the user has the interest is input from the input unit 210, and the date and time information is given, the timer unit 220 may provide the date and time information with a predetermined time margin. For example, a motion image of one second is made of thirty pictures, but the date and time information may not necessarily have an accuracy to specify a particular picture. Accordingly, the timer unit 220 can match the information in which the user has the interest with the presented information owing to the predetermined time margin provided to the time date and time information to be given even in the case that there is some difference between the time at which the user inputs to have the interest into the input unit 210 and the time at which the information is presented in the information presenting device 100.

For example, in the timer unit 220, the date and time information may include a time period of five seconds before and after the time at which the input operation is performed.

<Detailed Configuration of Guide Information Managing Device 300>

FIG. 4 is a diagram illustrating a detailed configuration of the guide information managing device 300 in the first embodiment of the present invention.

As illustrated in FIG. 4, the guide information managing device 300 includes a receiving unit 310, an input storage unit 320, a meta-information storage unit 330, a registration unit 340, a presentation information storage unit 350, a transmitting unit 360, and a meta-information acquiring unit 370.

The receiving unit 310 receives interest information transmitted by the information presenting device 100. The receiving unit 310 also receives a reference request transmitted from the guide device 400.

The input storage unit 320 stores the interest information received by the receiving unit 310. At this time, the input storage unit 320 may notify the timing at which the interest information is stored to the registration unit 340.

FIG. 5 is a diagram illustrating an exemplary interest information table stored in the input storage unit in the first embodiment of the present invention.

As illustrated in FIG. 5, the input storage unit 320 stores the interest information table in which the date and time information and the channel information is associated with each other. The interest information table illustrated in FIG. 5 is provided for each identification number of an information presenting device and each identification number of a user. In other words, the interest information transmitted from the information presenting device 100 includes the date and time information, the channel information, the identification number of the information presenting device, and the identification number of the user. The input storage unit 320 stores the date and time information, and the channel information in association with each other in the interest information table corresponding to the identification number of the information presenting device and the identification number of the user.

The meta-information storage unit 330 stores information relevant to the image information (hereinafter, also referred to as meta-information) presented from the information presenting device 100. At this time, the meta-information storage unit 330 may notify the timing at which the meta-information is stored to the registration unit 340.

The meta-information acquiring unit 370 acquires meta-information, and the meta-information storage unit 330 stores the acquired meta-information.

For example, regarding the meta-information to be registered in the meta-information storage unit 330, the meta-information acquiring unit 370 may take out an EPG (Electronic Program Guide) from a broadcast wave, and the meta-information storage unit 330 may store the taken-out EPG as the meta-information. The meta-information acquiring unit 370 may acquire the EPG via a network such as the Internet, and the meta-information storage unit 330 may store the acquired EPG as the meta-information.

It should be noted that the meta-information may not be the EPG. In some cases, the EPG is limited to main information in a program, thus may not include a sufficient amount of data. In the case that a program database service provides information of a program in addition to the EPG, the meta-information acquiring unit 370 may acquire the information of the program from the program database service, and the meta-information storage unit 330 may store the acquired information. Moreover, the meta-information acquiring unit 370 may acquire a picture by decoding a broadcast wave, extract a particular character string or a particular picture by analyzing the acquired picture, and acquire information relevant to the particular character string or the particular picture from the Internet or other network, and the meta-information storage unit 330 may store the acquired information.

Furthermore, the meta-information acquiring unit 370 may acquire information of a program created by an other user having viewed the same program, and the meta-information storage unit 330 may store the acquired information. For example, the meta-information acquiring unit 370 may accept an input of locational information by an other user having viewed the same image, and the meta-information storage unit 330 may store the accepted locational information. Additionally, for example, the meta-information acquiring unit 370 may collect information relevant to an image having been viewed by an other user to thereby add relevant information to the information so as to be stored. In this case, the meta-information acquiring unit 370 may use the character string collected by the user and held in the input storage unit 320.

The meta-information includes guide destination information indicating a place which is specified by the date and time information and the image specifying information, and is introduced in the image information. The meta-information includes guide destination information indicating a network address which is specified by the date and time information and the image specifying information, and is in connection with a selling of a commodity introduced in the image information.

FIG. 6 illustrates a meta-information table stored in a meta-information storage unit in the first embodiment of the present invention.

As illustrated in FIG. 6, the meta-information table stores channel information, date and time information, a program name, spot information, locational information, an address, a relevant commodity, a telephone number, an URL, a cast and scene information in association with one another. Each scene has the meta-information even in the same program.

The channel information represents information specifying a broadcast station which has broadcasted the program. The date and time information represents information indicating a broadcasting date and time of a predetermined scene in the program. The program name represents information indicating the name of the broadcasted program. The spot information represents information indicating the name of the place introduced in the predetermined scene in the program. The locational information represents information indicating the location of the place introduced in the predetermined scene in the program. The address represents information indicating the address of the place introduced in the predetermined scene in the program. The relevant commodity represents information of the name of the commodity introduced in the predetermined scene in the program. The telephone number represents the telephone number of the place introduced in the predetermined scene in the program. The URL represents information indicating the URL of the website about the place introduced in the predetermined scene in the program. The cast represents information indicating the cast in the predetermined scene in the program. The scene information represents the information explaining the contents of the predetermined scene in the program.

The registration unit 340 stores the interest information stored in the input storage unit 320, and the guide destination included in the meta-information stored in the meta-information storage unit 330 in the presentation information storage unit 350 in association with each other. For example, the registration unit 340 refers to the meta-information storage unit 330 at the timing at which the interest information is stored in the input storage unit 320, and reads out the guide destination information included in the meta-information when the meta-information corresponding to the program specified by the channel information and the date and time information included in the stored interest information is stored. Then, the registration unit 340 further outputs the interest information and the guide destination information to the presentation information storage unit 350, and deletes the interest information stored in the input storage unit 320. Moreover, the registration unit 340 refers to the input storage unit 320 at the timing at which the meta-information is stored in the meta-information storage unit 330. When the interest information corresponding to the channel information and the date and time information of the program specified by the meta-information is stored, the registration unit 340 outputs the interest information and the guide destination information to the presentation information storage unit 350, and deletes the interest information stored in the input storage unit 320.

The presentation information storage unit 350 stores the interest information and the guide destination information output from the registration unit 340. At this time, the presentation information storage unit 350 may transmit the timing at which the guide destination information is stored to the transmitting unit 360. The registration unit 340 stores the date and time information indicating the date and time at which the input operation by the user is accepted during the presentation of the image information, the image specifying information specifying image information presented when the input operation is accepted, and guide destination information indicating a guide destination to which the user is guided and which is specified by the date and time information and the image specifying information in the presentation information storage unit 350 in association with one another. The channel information corresponds to one example of the image specifying information.

For example, the presentation information storage unit 350 stores the date and time information included in the interest information, and the name and the address of the place, and the program name included in the meta-information in association with one another.

When the receiving unit 310 receives a reference request from the guide device 400, the transmitting unit 360 acquires the guide destination information from the presentation information storage unit 350 and transmits the acquired guide destination information to the guide device 400. When the transmitting unit 360 receives a signal indicating that the guide destination information is stored from the presentation information storage unit 350, the transmitting unit 360 transmits information indicating that the guide destination information is stored to the information presenting device 100 or the guide device 400. When the information presenting device 100 or the guide device 400 receives the information indicating that the guide destination information is stored, the information presenting device 100 or the guide device 400 notifies the registration completion of the guide destination information to the user. The information presenting device 100 or the guide device 400 may, for example, notify a message stating that "registration has been completed" by a voice, or a text or illustration on a display screen in order to inform the user of the registration completion about the candidate place.

<Detailed Configuration of Guide Device 400>

FIG. 7 is a diagram illustrating a detailed configuration of the guide device 400 in the first embodiment of the present invention.

As shown in FIG. 7, the guide device 400 includes a communicating unit 410, an input unit 420, a target destination setting unit 430, a route specifying unit 440, a map storage unit 450, a current location specifying unit 460, and a display unit 470.

When a reference request for guide destination information is input by the input unit 420, the communicating unit 410 transmits the reference request to the guide information managing device 300. Moreover, the communicating unit 410 receives the guide destination information transmitted from the guide information managing device 300.

The input unit 420 accepts an operation into the guide device 400 by a user. For example, the input unit 420 accepts an input of a reference request for referring to guide destination information. Furthermore, the input unit 420 accepts an input of a keyword relevant to a target destination, an input of a telephone number of the target destination, and an input of an address of the target destination. The input unit 420 further accepts a designation of an item from a menu displayed on the display unit 470. For example, the user may input a specific candidate place by an operation using, for example, a mouse pointer, a voice or a touch screen.

The target destination setting unit 430 sets a target destination. For example, the target destination setting unit 430 performs a push notification or a list display of guide destination information received by the communicating unit 410, and accepts selection of a specific destination among the guide destination information by the user to thereby set the target destination. For example, the target destination setting unit 430 may set the target destination on the basis of the keyword relevant to the target destination, the telephone number of the destination, or the address of the target destination. Moreover, the target destination setting unit 430 may set a transit spot in addition to the target destination. In this case, for example, a target destination which is stored in the input storage unit 320 but is still not registered in the presentation information storage unit 350 may be set as non-selectable.

The current location specifying unit 460 specifies a current location of the guide device 400. For example, the current location specifying unit 460 specifies the current location by a positioning system such as a GPS (Global Positioning System). Additionally, for example, the current location specifying unit 460 may specify the current location by another positioning system using a communication spot such as a wireless LAN (Local Area Network), or a base station such as a SP mode. Or, the current location may be specified by a direct input by a user.

The map storage unit 450 stores map information, and further stores sightseeing information, shop and store information, or event information in addition to information of geographic contours or roads.

The route specifying unit 440 specifies an optimal route from the current location to the target destination by using the current location specified by the current location specifying unit 460, the target destination set by the target destination setting unit 430, and the map information stored in the map storage unit 450.

The display unit 470 displays an operation screen, an information presentation screen, or route guide information of the guide device 400 to a user. The display unit 470 may present guide destination information to the user by a voice in addition to a picture. For example, in the case that the guide device 400 is a car navigation device, a smartphone, or a tablet computer, the car navigation device, the smartphone, or the tablet computer may present guide destination information on each screen, or may output the guide destination information by a voice from each speaker. At this time, for example, when the interest information registered in the input storage unit 320 is associated with the guide destination information and registered in the presentation information storage unit 350, the display unit 470 may notify the storage of the guide destination information.

The configuration of the system for presenting information in the first embodiment of the present invention has been described.

Hereinafter, the operation of the system for presenting information in the first embodiment of the present invention will be described.

<Operation of Information Presenting System>
<Operation of Information Presenting Device 100>

Figure 8:
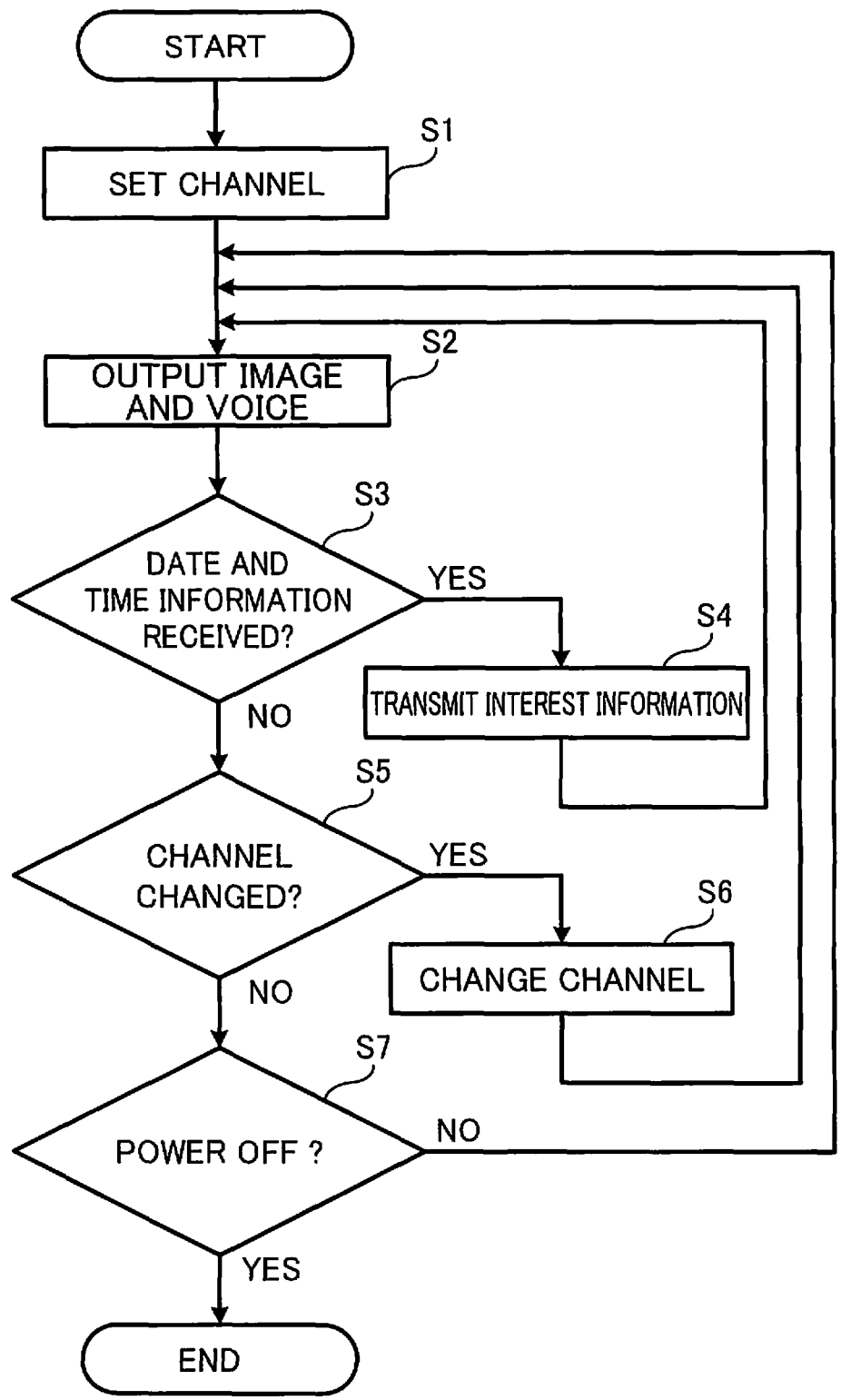
FIG. 8 is a flowchart illustrating the operation of the information presenting device in the first embodiment of the present invention.

FIG. 8 is a flowchart illustrating the operation of the information presenting device 100 in the first embodiment of the present invention.

First, the setting storage unit 140 of the information presenting device 100 acquires and stores channel information input from the operative device 200, and sets a channel of a broadcast wave to be received by the receiving unit 110 on the basis of the channel information (step S1).

Next, the receiving unit 110 receives the broadcast wave corresponding to the set channel information, the decoding unit 120 decodes the received broadcast wave, and the display unit 130 outputs a decoded image or voice (step S2).

Then, the communicating unit 150 judges whether or not date and time information transmitted from the operative device 200 is received (step S3). When it is judged that the date and time information is received (YES in step S3), the communicating unit 150 reads out the channel information, an identification number of a user, and an identification number of the information presenting device stored in the setting storage unit 140, and transmits interest information including the read-out channel information, the identification number of the user and the identification number of the information presenting device, and the received date and time information to the information managing device 300 (step S4). After that, the flow returns to the process in step S2.

To the contrary, when it is judged that the date and time information is not received (NO in step S3), the setting storage unit 140 judges whether or not channel information to change the channel is input from the operative device 200 (step S5). When it is judged that the channel is changed (YES in step S5), the setting storage unit 140 stores the channel information input from the operative device 200, and changes the channel of the broadcast wave to be received by the receiving unit 110 according to the channel information (step S6). After that, the flow returns to the process in step S2.

On the other hand, when it is judged that the channel is not changed (NO in step S5), the setting storage unit 140 judges whether or not an operation of a power-off is input from the operative device 200 (step S7). When it is judged that the power-off is not performed (NO in step S7), the flow returns to step S2. To the contrary, when it is judged that the power-off is performed, the setting storage unit 140 performs the power-off, and ends the process.

<Operation of Operative Device 200>

Figure 9:
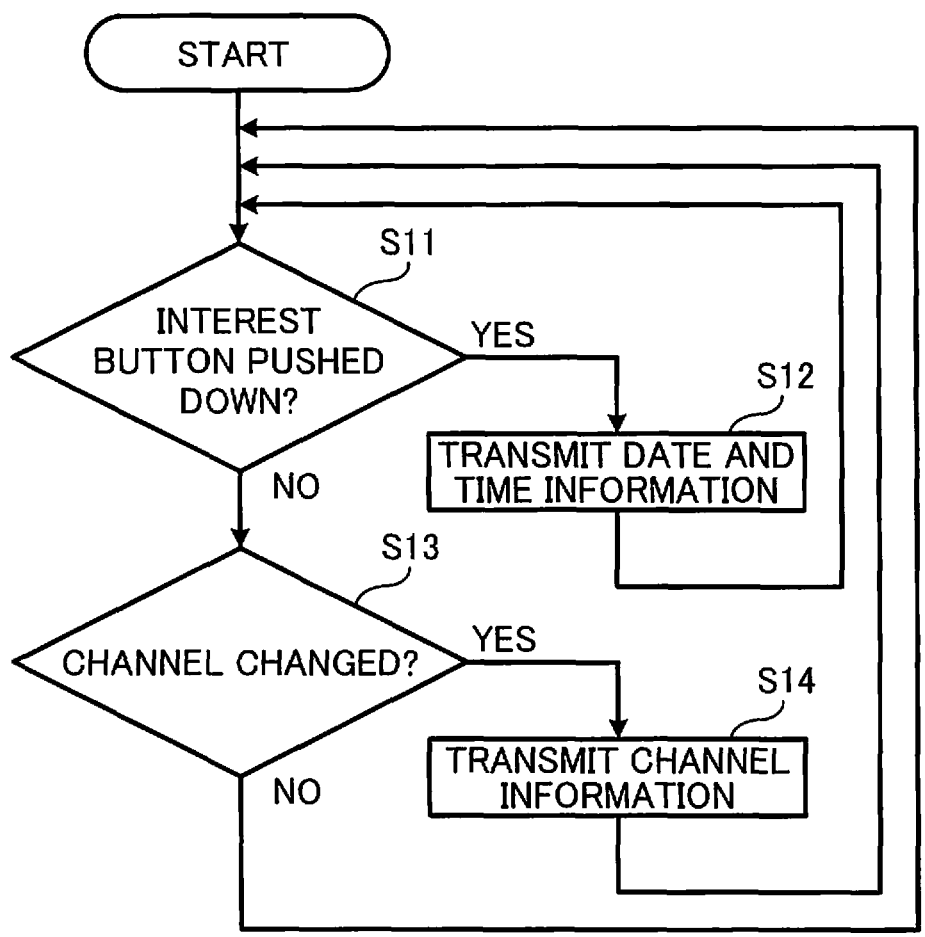
FIG. 9 is a flowchart illustrating an operation of the operative device in the first embodiment of the present invention.

FIG. 9 is a flowchart illustrating an operation of the operative device 200 in the first embodiment of the present invention.

First, the input unit 210 of the operative device 200 judges whether or not a signal representing an indication that a user has an interest in an image displayed by the information presenting device 100 is input, that is, judges whether or not an interest button is pushed down (step S11). When it is judged that the interest button is pushed down (YES in step S11), the timer unit 220 transmits timer information of the time at which the interest button is pushed down as date and time information to the information presenting device 100 (step S12). After that, the flow returns to the process in step S11.

To the contrary, when it is judged that the interest button is not pushed down (NO in step S11), the input unit 210 judges whether or not an operation to change the channel is input (step S13). When it is judged that the operation to change the channel is input (YES in step S13), the input unit 210 transmits the channel information to change the channel to the information presenting device 100 (step S14). After that, the flow returns to the process in step S11. On the other hand, when it is judged that the operation to change the channel is not input (NO in step S13), the flow returns to the process in step S11.

Figure 10:
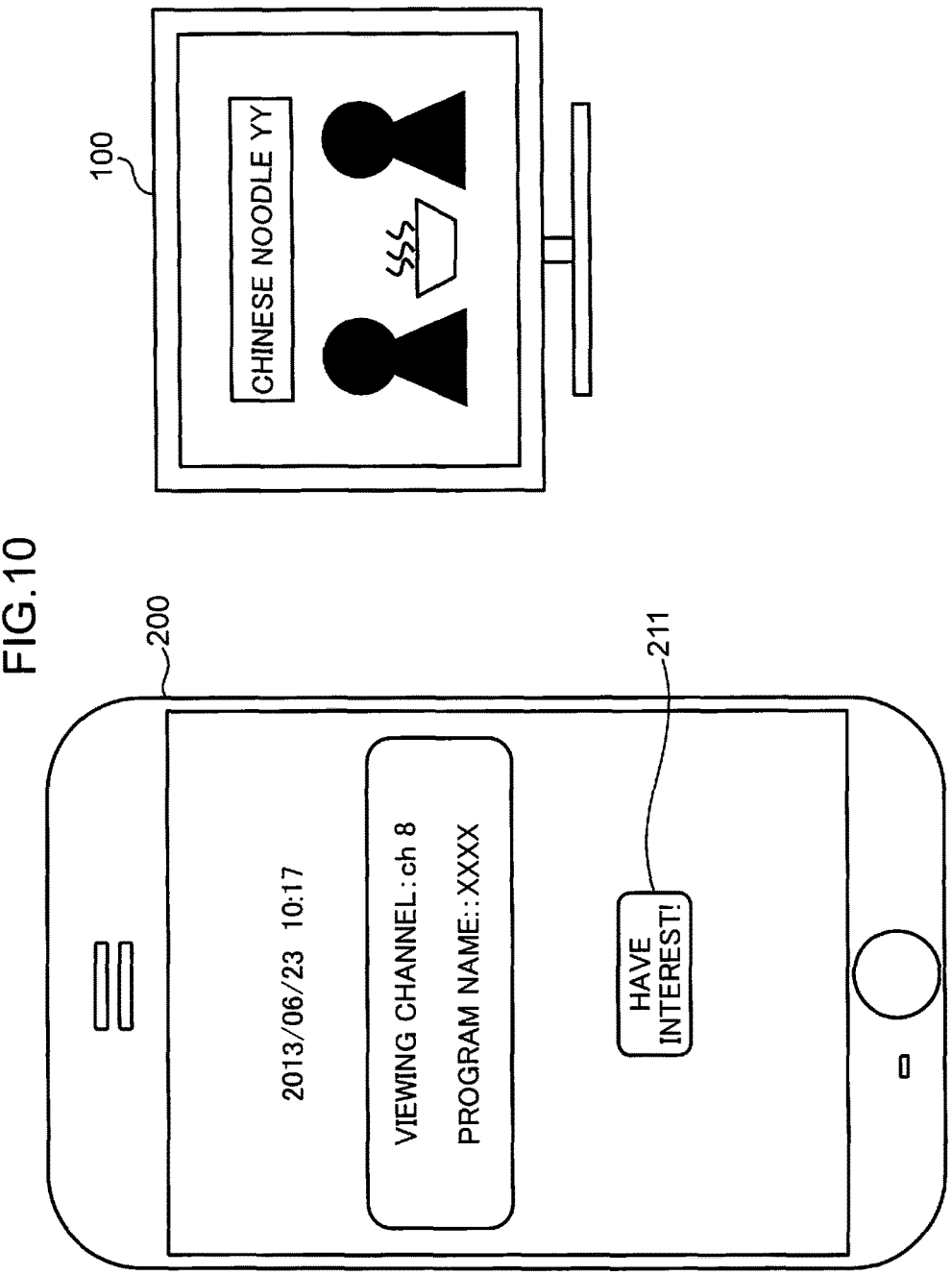
FIG. 10 is a diagram illustrating exemplary screen images displayed on the operative device and the information presenting device during viewing of a program in the first embodiment of the present invention.

FIG. 10 is a diagram illustrating exemplary screen images displayed on the operative device 200 and the information presenting device 100 during viewing of a program in the first embodiment of the present invention.

As illustrated in FIG. 10, the operative device 200 displays a current date and time, a viewing channel number, a program being viewed, and the interest button 211 during presentation of a television program by the information presenting device 100. When a certain place or commodity in which a user has an interest is displayed in the program being viewed, the user pushes down the interest button 211.

The information presenting device 100 may include the functions of the operative device 200. In other words, the information presenting device 100 illustrated in FIG. 3 may further include the input unit 210 and the timer unit 220.

Figure 11:
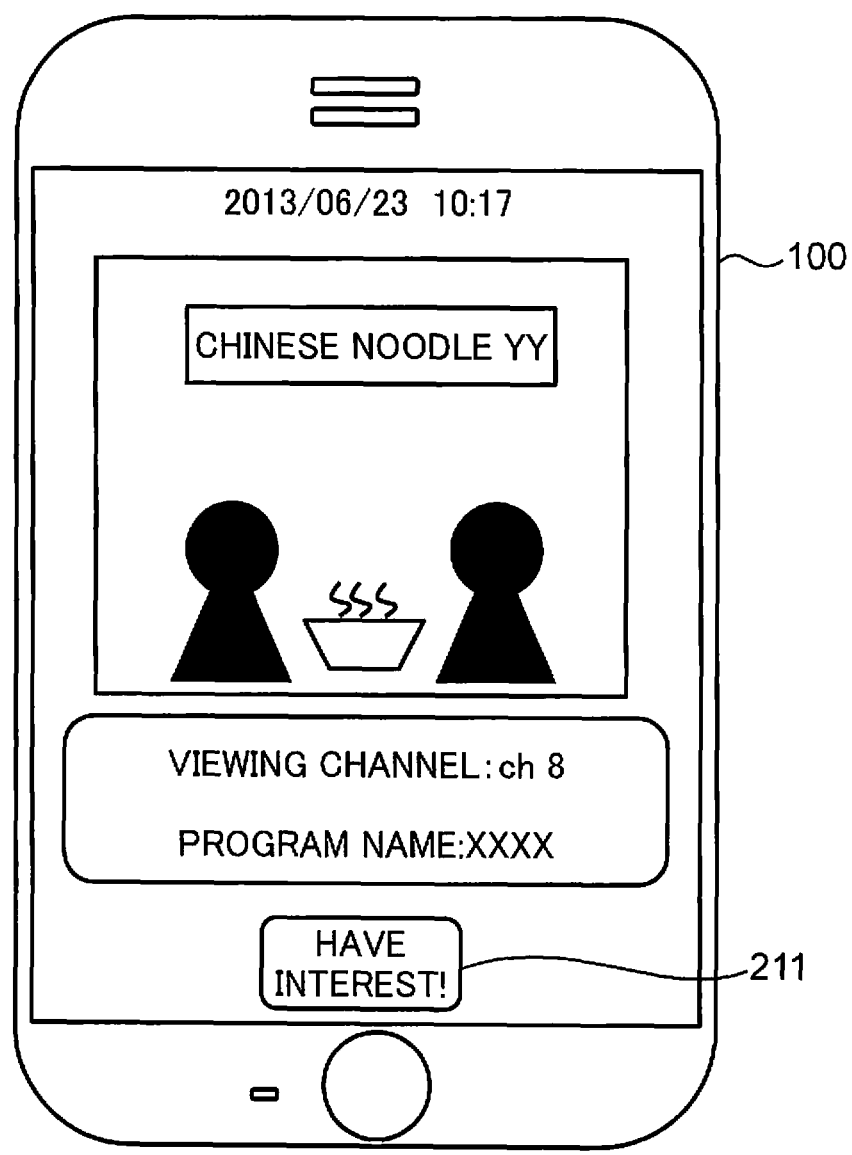
FIG. 11 is a diagram illustrating an exemplary screen image displayed on the information presenting device during viewing of a program in the first embodiment of the present invention.

FIG. 11 is a diagram illustrating an exemplary screen image displayed on the information presenting device 100 during viewing of a program in the first embodiment of the present invention. In FIG. 11, the information presenting device 100 includes the functions of the operative device 200. Therefore, the information presenting device 100 displays a television program being viewed, a current date and time, a viewing channel number, a name of the program being viewed, and the interest button 211. When a certain place or commodity in which a user has an interest is displayed in the program being viewed, the user pushes down the interest button 211.

<Operation of Guide Information Managing Device 300>

Figure 12:
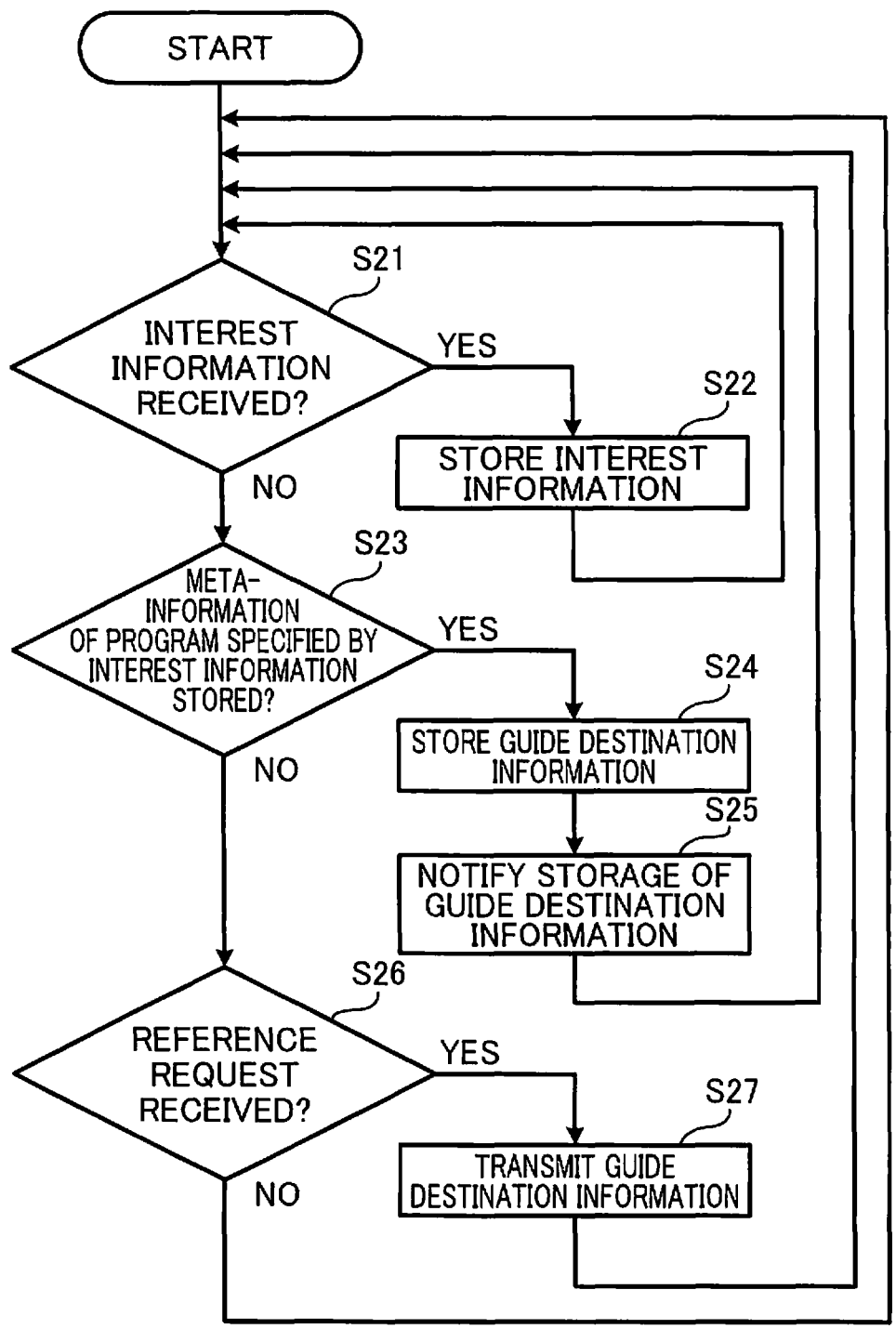
FIG. 12 is a flowchart illustrating an operation of the guide information managing device in the first embodiment of the present invention.

FIG. 12 is a flowchart illustrating an operation of the guide information managing device 300 in the first embodiment of the present invention.

First, the receiving unit 310 of the guide information managing device 300 judges whether or not interest information transmitted by the information present device 100 is received (step S21). When it is judged that the interest information is received (YES in step S21), the receiving unit 310 allows the received interest information to be stored in the input storage unit 320 (step S22). After that, the flow returns to the process in step S21.

To the contrary, when it is judged that the interest information is not received (NO in step S21), the registration unit 340 judges whether or not the meta-information storage unit 330 stores meta-information of a program specified by the date and time information and the channel information included in the interest information stored in the input storage unit 320 (step S23). When it is judged that the meta-information of the program specified by the interest information is stored (YES in step S23), the registration unit 340 allows the interest information and guide destination information included in the meta-information corresponding to the interest information to be stored in the presentation information storage unit 350 (step S24).

Next, the transmitting unit 360 notifies that the guide destination information is stored in the presentation information storage unit 350 to the information presenting device 100 or the guide device 400 (step S25). After that, the flow returns to the process in step S21. To the contrary, when it is judged that the meta-information of the program specified by the interest information is not stored (NO in step S23), it is judged whether or not the receiving unit 310 receives a reference request for referring to the guide destination information (step S26). When it is judged that the reference request is received (YES in step S26), the transmitting unit 360 transmits the guide destination information stored in the presentation information storage unit 350 to the guide device 400 (step S27). After that, the flow returns to the process in step S21. On the other hand, when it is judged that the reference request is not received (No in step S26), the flow returns to step S21.

Figure 13:
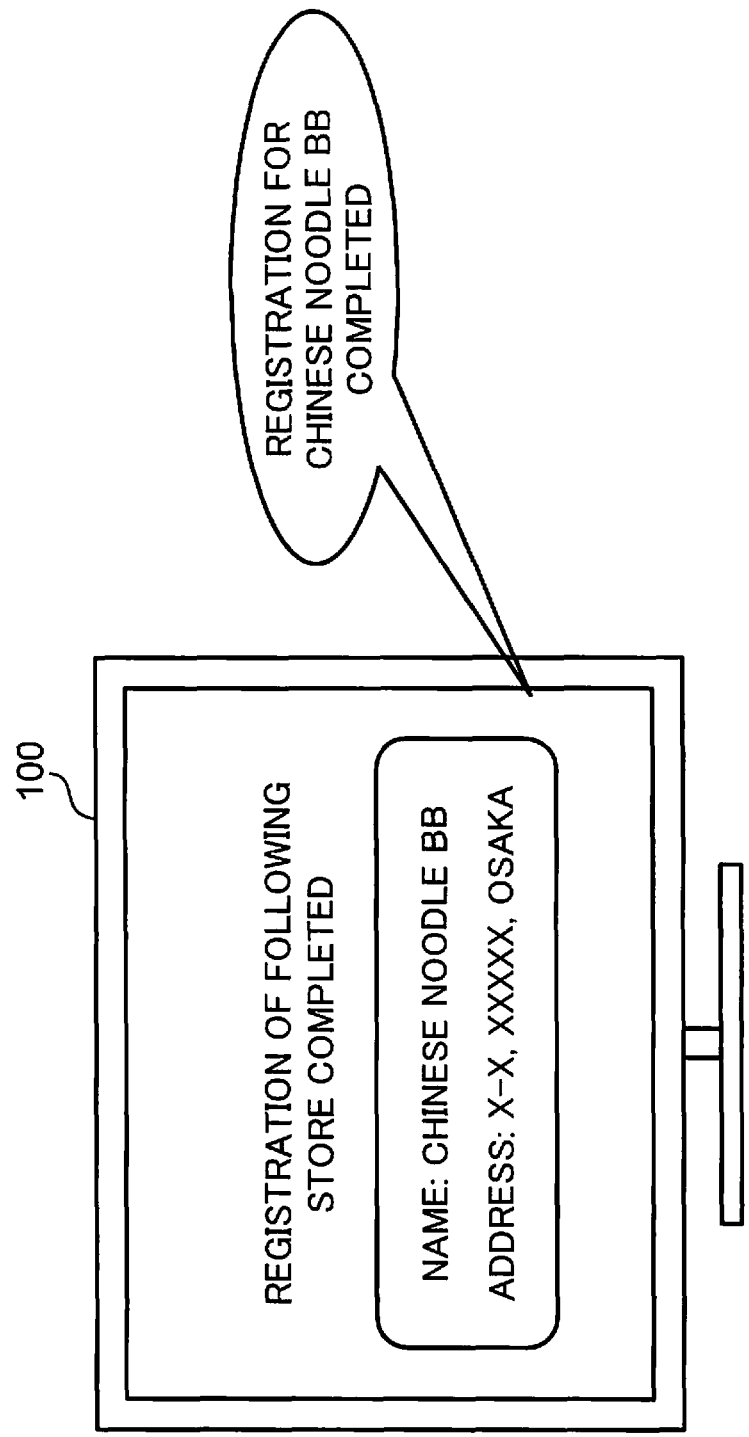
FIG. 13 is a diagram illustrating an exemplary screen image displayed on the information presenting device when guide destination information is stored in a presentation information storage unit.

FIG. 13 is a diagram illustrating an exemplary screen image displayed on the information presenting device 100 when guide destination information is stored in the presentation information storage unit 350.

In the guide information managing device 300, when the guide destination information is stored in the presentation information storage unit 350, it is notified to the information presenting device 100 that the guide destination information is stored in the presentation information storage unit 350.

As illustrated in FIG. 13, the information presenting device 100 displays a name and an address of a place for which the guide destination information is stored, and outputs the stored place name by a voice.

Figure 14:
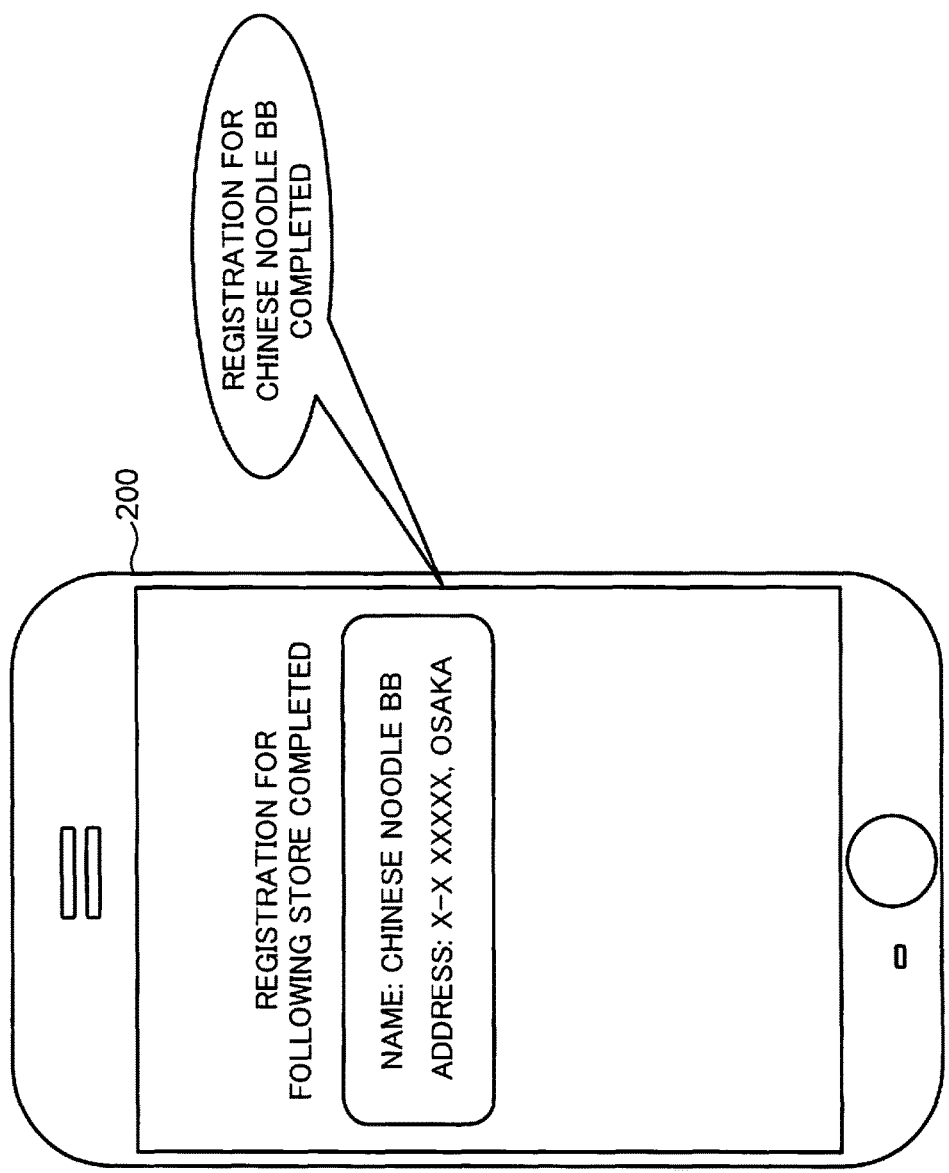
FIG. 14 is a diagram illustrating an exemplary screen image displayed on the operative device when the guide destination information is stored in the presentation information storage unit.

FIG. 14 is a diagram illustrating an exemplary screen image displayed on the operative device 200 when the guide destination information is stored in the presentation information storage unit 350.

In the guide information managing device 300, when the guide destination information is stored in the presentation information storage unit 350, it is notified to the operative device 200 that the guide destination is stored in the presentation information storage unit 350.

As illustrated in FIG. 14, the operative device 200 displays a name and an address of a place for which the guide destination information is stored, and outputs the stored place name by a voice. It is notified to at least either of the information presenting device 100 and the operative device 200 that the guide destination information is stored in the presentation information storage unit 350.

As described above, after guide destination information is stored in a database, information indicating that the guide destination information is stored in the database is presented. In this manner, it is notified to a user that the guide destination information is stored in the presentation information storage unit 350, therefore, the user can know that a place introduced in a program having been viewed is guidable, and can know that the place is settable in the guide device 400 as a target destination.

<Operation of Guide Device 400>

Figure 15:
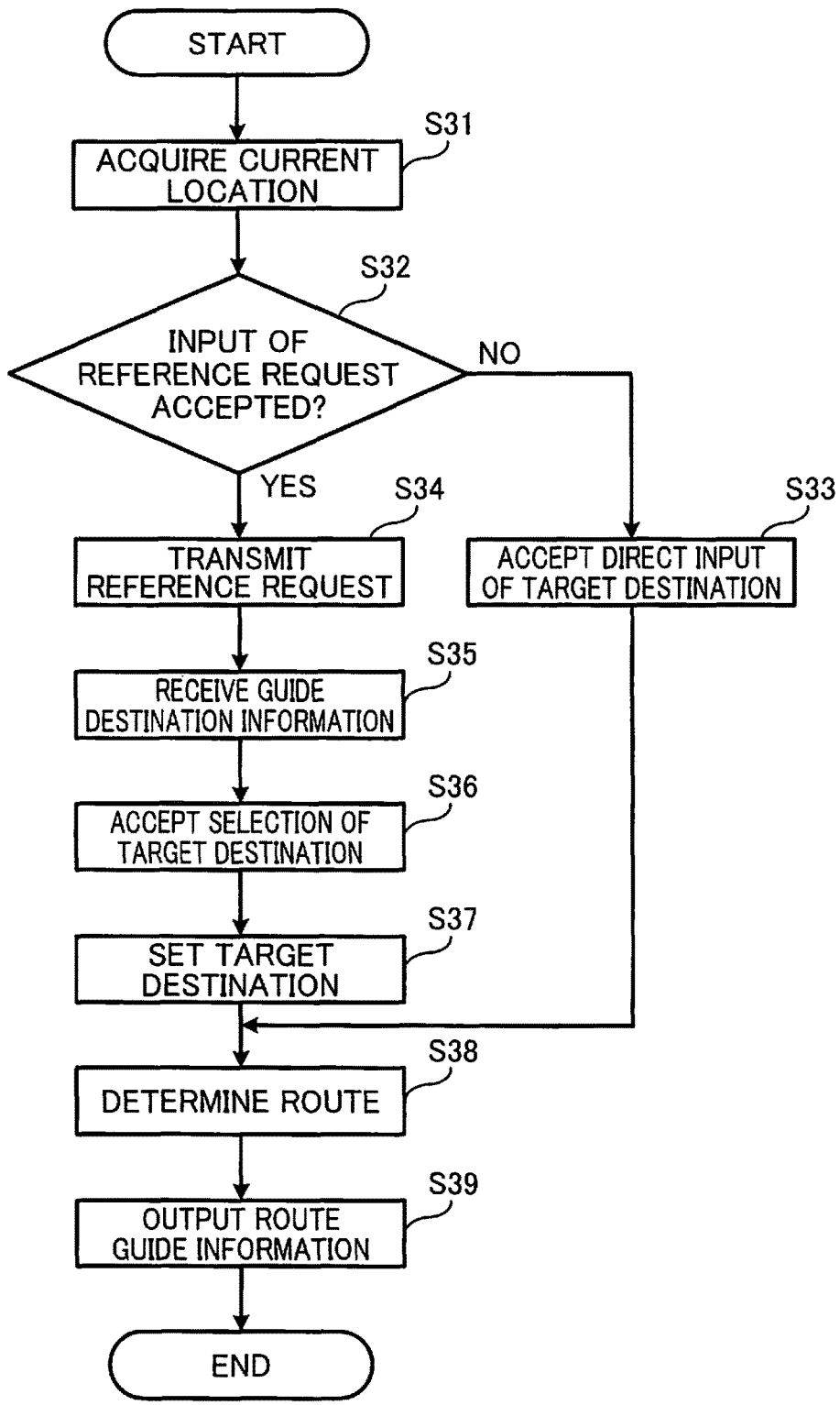
FIG. 15 is a flowchart illustrating an operation of the guide device in the first embodiment of the present invention.

FIG. 15 is a flowchart illustrating an operation of the guide device 400 in the first embodiment of the present invention.

First, the current location specifying unit 460 of the guide device 400 acquires a current location of the guide device 400 (step S31).

Next, the input unit 420 judges whether or not an input of a reference request for referring to guide destination information is accepted (step S32). For example, a menu screen image is displayed on the display unit 470 and a specific item which corresponds to the reference request is selected. Then, it is judged that the input of the reference request is accepted. When it is judged that the input of the reference request is not accepted (NO in step S32), the input unit 420 accepts a direct input of a target destination by the user (step S33).

To the contrary, when it is judged that the input of the reference request is accepted (YES in step S32), the communicating unit 410 transmits the reference request requesting the transmission of the guide destination information to the guide information managing device 300 (step S34).

Next, the communicating unit 410 receives the guide destination information transmitted by the guide information managing device 300 (step S35).

Subsequently, the input unit 420 accepts a selection of the user's desired target destination (guide destination information) among the guide destination information received by the communicating unit 410 (step S36).

Then, when the user selects the guide destination information, the target destination setting unit 430 sets the selected guide destination information in the route specifying unit 440 as a target destination (step S37).

The route specifying unit 440 determines a route from the current location to the target destination on the basis of the current location acquired by the current location specifying unit 460, the target destination set by the target destination setting unit 430, and the map information stored in the map storage unit 450 (step S38).

After that, the route specifying unit 440 causes the display unit 470 to output route guide information guiding the user from the current location to the target destination in accordance with the determined route (step S39).

Figure 16:
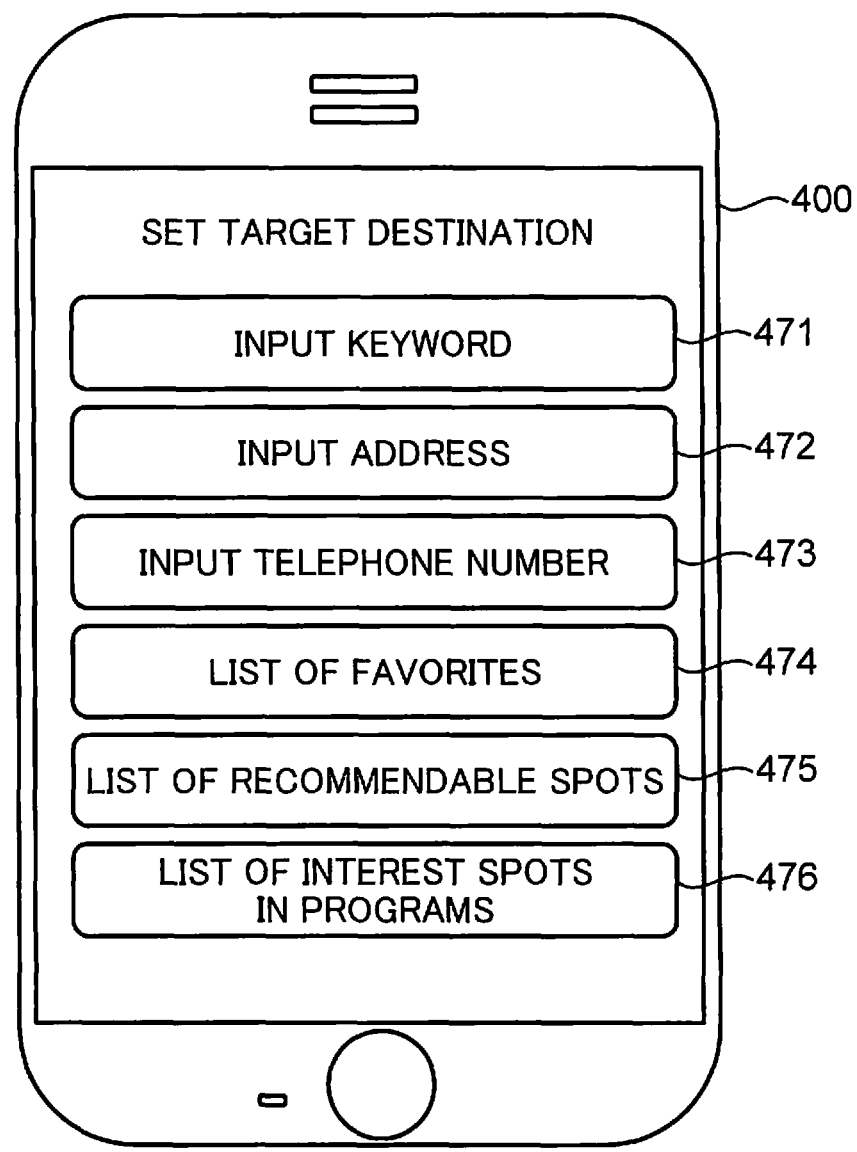
FIG. 16 is a diagram illustrating an exemplary menu screen image displayed on the guide device.

FIG. 16 is a diagram illustrating an exemplary menu screen image displayed on the guide device 400.

As illustrated in FIG. 16, the guide device 400 displays a menu screen image to set a target destination. The menu screen image has a button 471 for inputting a target destination using a keyword, a button 472 for inputting an address of the target destination, a button 473 for inputting a telephone number of the target destination, a button 474 for displaying the target destination registered as a favorite, a button 475 for displaying the target destination recommendable to the user, and a button 476 for displaying the target destination registered by pushing down an interest button during viewing of a program.

When the button 476 is pushed down, the communicating unit 410 transmits a reference request to the guide information managing device 300. The communicating unit 410 receives the guide destination information transmitted by the guide information managing device 300, and the display unit 470 displays the received guide destination information.

Figure 17:
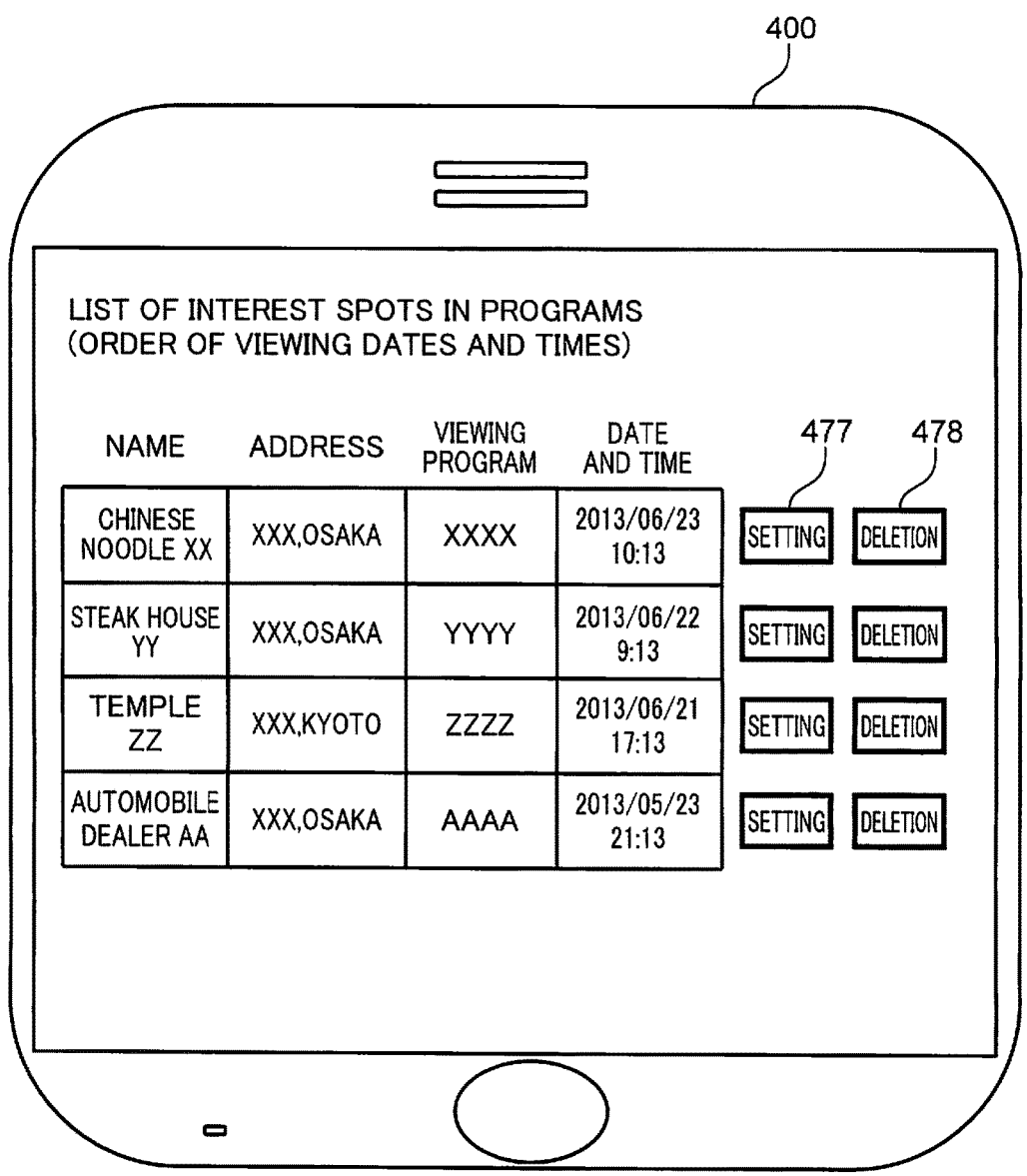
FIG. 17 is a diagram illustrating an exemplary guide destination information displayed on the guide device in the order of viewing dates and times.

FIG. 17 is a diagram illustrating an exemplary guide destination information displayed in the order of viewing dates and times on the guide device 400.

The guide device 400 displays a list of places registered as places in which a user has interests during viewing of programs. As illustrated in FIG. 17, the guide device 400 displays names of guide destinations, addresses of the guide destinations, programs having been viewed, and date and times at which the interest button has been pushed down. The respective guide destinations are displayed in the order of viewing dates and times. Moreover, the guide device 400 displays the button 477 for setting each guide destination as a target destination, and the button 478 for deleting the guide destination from the list.

When the button 477 is pushed down, a guide destination corresponding to the button 477 is set as a target destination. When the button 478 is pushed down, the communicating unit 410 of the guide device 400 transmits a deletion request requesting deletion of the guide destination corresponding to the button 478 from the database to the guide information managing device 300. The receiving unit 310 of the guide information managing device 300 deletes the corresponding guide destination information from the presentation information storage unit 350 upon receipt of the deletion request.

In this manner, it is presented whether or not guide destination information is stored in the database in response to a request from a user. When a plurality of pieces of guide destination information are presented, the plurality of pieces of guide destination information are presented in the order of presentation of the image information.

Figure 18:
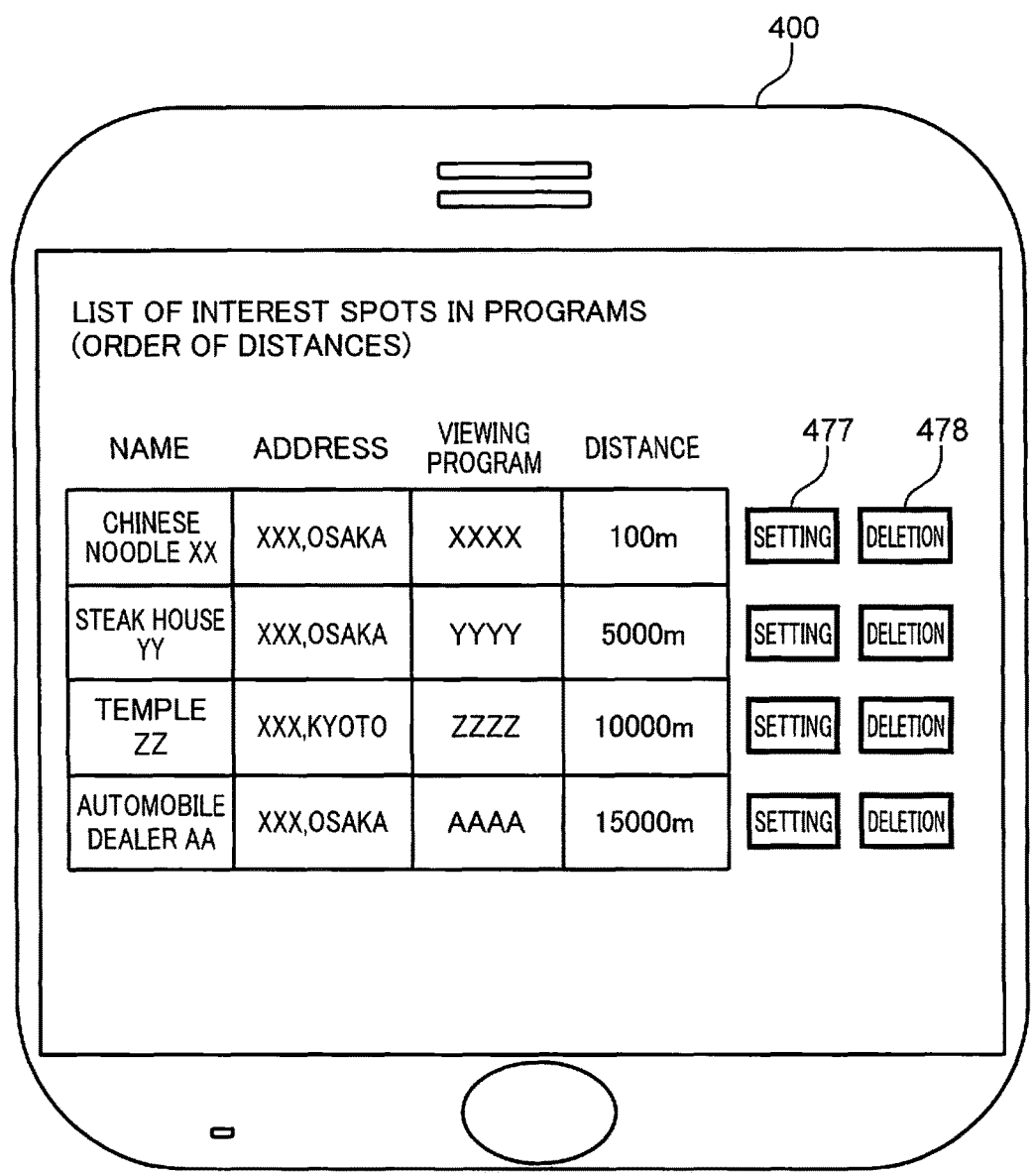
FIG. 18 is a diagram illustrating an exemplary guide destination information displayed on the guide device in the order of nearness to a current location.

FIG. 18 is a diagram illustrating an exemplary guide destination information displayed on the guide device 400 in the order of nearness to a current location.

The guide device 400 displays a list of places registered as places in which a user has interests during viewing of programs. As illustrated in FIG. 18, the guide device 400 displays names of guide destinations, addresses of the guide destinations, programs having been viewed, and distances from the current location. The respective guide destinations are displayed in the order of nearness to the current location. Moreover, the guide device 400 displays the button 477 for setting each guide destination as a target destination, and the button 478 for deleting the guide destination from the list.

In this manner, when a plurality of pieces of guide destination information are presented, the a plurality of pieces of guide destination information are presented in the order of nearness to the current location of the guide device 400 which presents the plurality of pieces of guide destination information.

Figure 19:
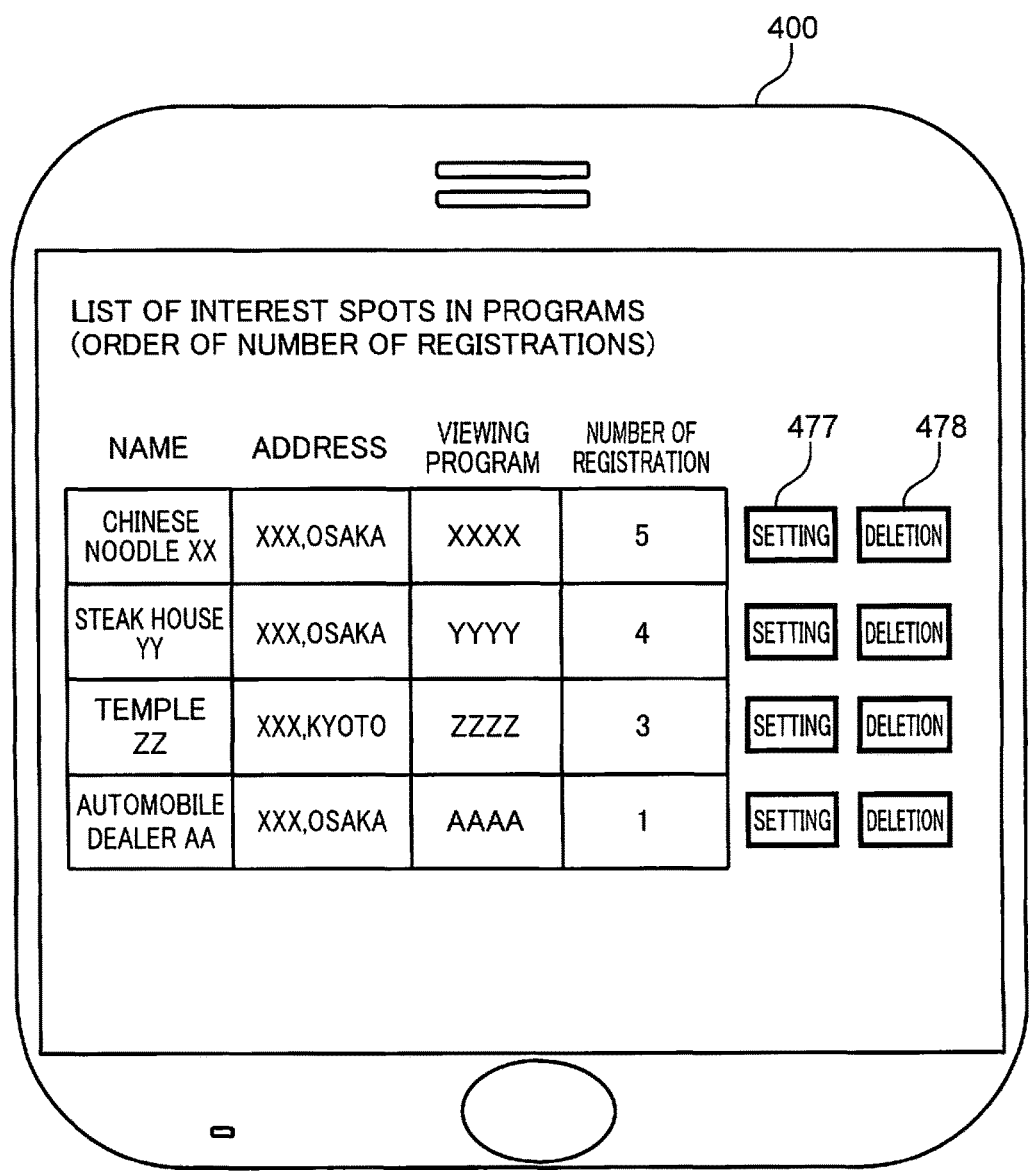
FIG. 19 is a diagram illustrating an exemplary guide destination information displayed on the guide device in the descending order of the number of registrations performed by the same user.

FIG. 19 is a diagram illustrating an exemplary guide destination information displayed on the guide device 400 in the descending order of the number of registrations performed by the same user.

The guide device 400 displays a list of places registered as places in which a user has interests during viewing of programs. As illustrated in FIG. 19, the guide device 400 displays names of guide destinations, addresses of the guide destinations, programs having been viewed, and the number of registrations performed by the same user. The respective guide destinations are displayed in the descending order of the number of registrations performed by the same user. Moreover, the guide device 400 displays the button 477 for setting each guide destination as a target destination, and the button 478 for deleting the guide destination from the list.

When the interest button is pushed down a plurality of times during viewing of the same program (scene), a plurality of pieces of the same guide destination information are created. The number of pieces of the same guide destination information is counted, and displayed as a registration number.

As described above, when a plurality of pieces of destination information are presented, the plurality of pieces of destination information are presented in the descending order of the number of registrations performed by the same user.

Figure 20:
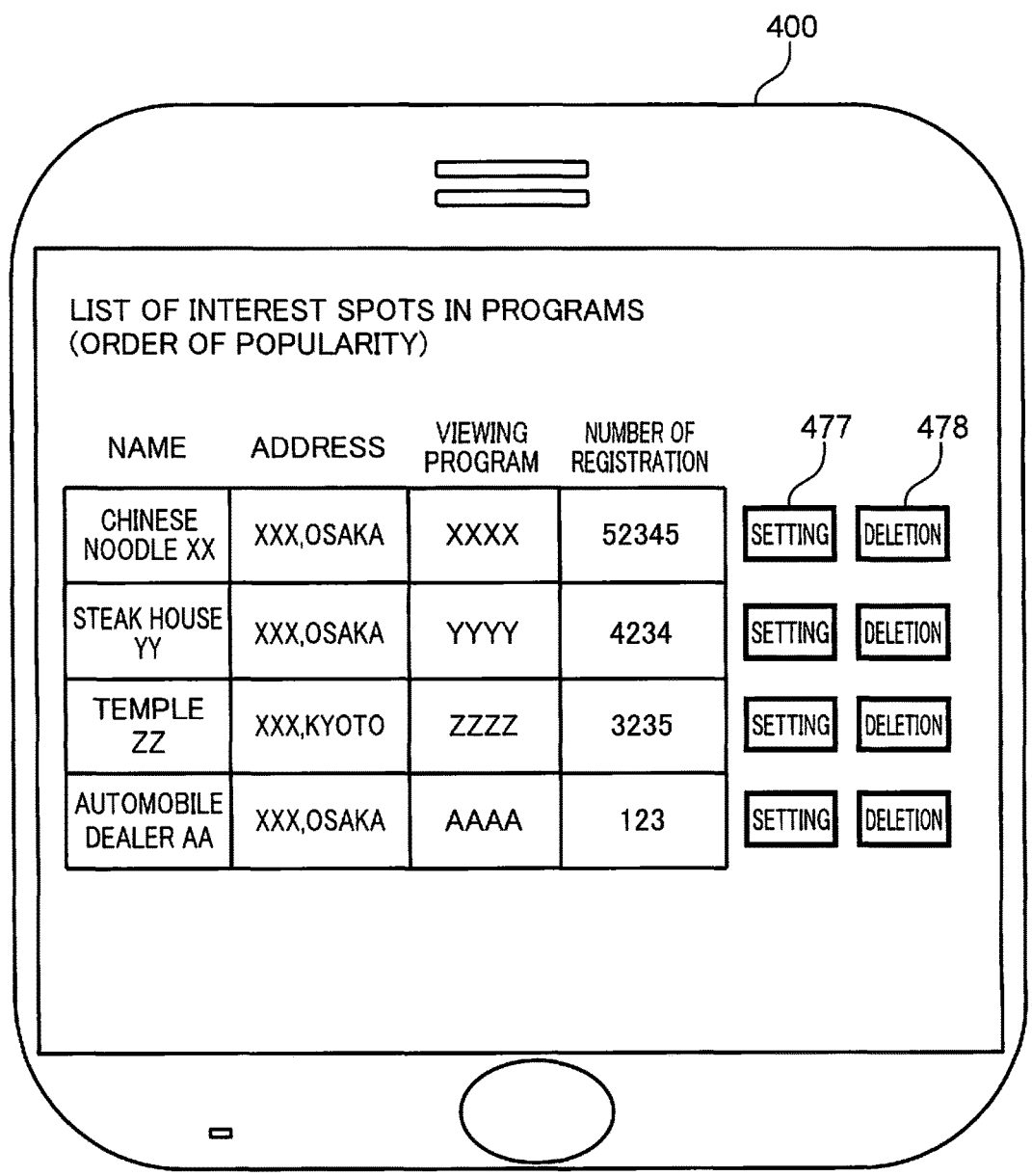
FIG. 20 is a diagram illustrating an exemplary guide destination information displayed on the guide device in the descending order of the number of registrations performed by an other user.

FIG. 20 is a diagram illustrating an exemplary guide destination information displayed on the guide device 400 in the order of the number of registrations performed by an other user.

The guide device 400 displays a list of places registered as places in which a user has interests during viewing of programs. As illustrated in FIG. 20, the guide device 400 displays names of guide destinations, addresses of the guide destinations, programs having been viewed, and the number of registrations performed by an other user. The respective guide destinations are displayed in the descending order of registrations performed by the other user. Moreover, the guide device 400 displays the button 477 for setting each guide destination as a target destination, and the button 478 for deleting the guide destination from the list.

The guide information managing device 300 counts the number of storage incidences that a plurality of other users store in other databases the same guide destination information as that stored in the database. When a plurality of pieces of guide destination information are presented, the plurality of pieces of guide destination information are presented in the descending order of the number of storage incidences in the other databases.

Figure 21:
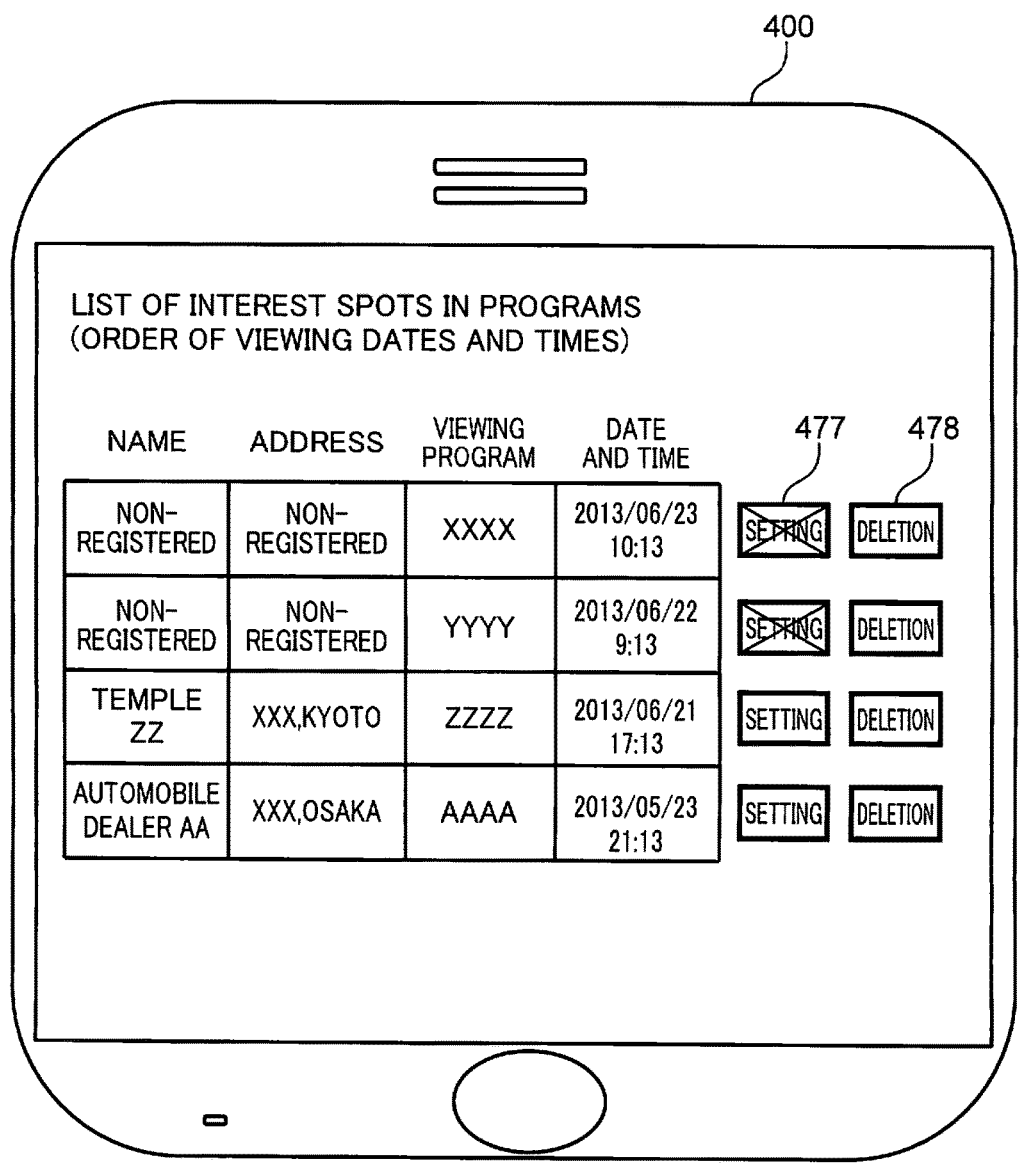
FIG. 21 is a diagram illustrating another exemplary guide destination information displayed on the guide device in the order of viewing dates and times.

FIG. 21 is a diagram illustrating another exemplary guide destination information displayed on the guide device 400 in the order of viewing dates and times.

The guide device 400 displays a list of places registered as places in which a user has interests during viewing of programs. As illustrated in FIG. 21, the guide device 400 displays names of guide destinations, addresses of the guide destinations, programs having been viewed, and date and times at which the interest button has been pushed down. The respective guide destinations are displayed in the order of viewing dates and times. When meta-information (a name and an address of each destination) corresponding to the interest information stored in the input storage unit 320 is not stored in the meta-information storage unit 330, the guide device 400 displays that the name and the address of the guide destination are unregistered.

The guide device 400 displays the button 477 for selecting each guide destination as a target destination so as not to be selectable about the guide destination whose name and address is unregistered.

When guide destination information is not stored, only interest information is displayed, thus the user can confirm interest information for which guide destination information has not been stored yet.

Figure 22:
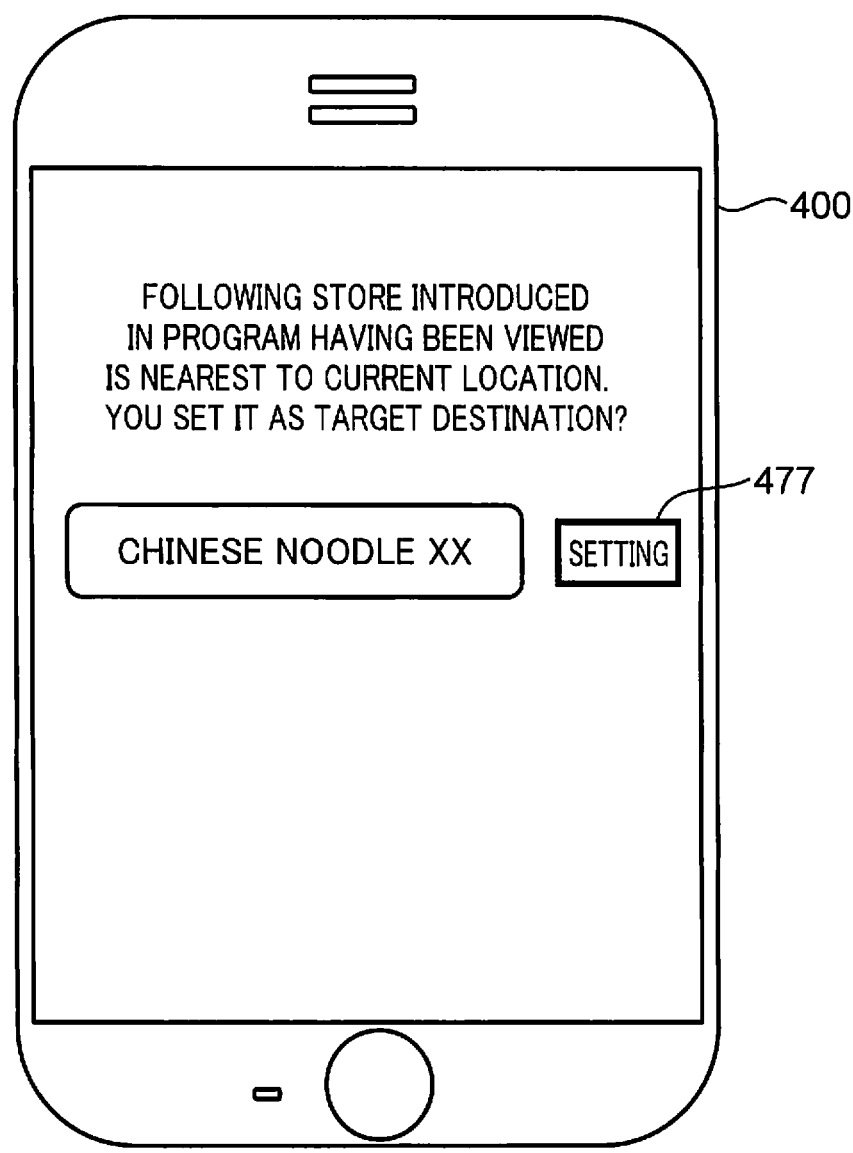
FIG. 22 is a diagram illustrating an exemplary information displayed on the guide device about a guide destination nearest to a current location.

FIG. 22 is a diagram illustrating an exemplary information presented in the guide device 400 about a guide destination nearest to a current location.

The guide device 400 displays a place nearest from the current location among places registered as places in which a user has interests during viewing of programs. As illustrated in FIG. 22, the guide device 400 displays a name of a guide destination nearest to the current location. Moreover, the guide device 400 displays the button 477 for setting the guide destination as a target destination.

Accordingly, presented is the information of the guide destination nearest to the current location of the guide device 400 which presents the guide destination information.

Figure 23:
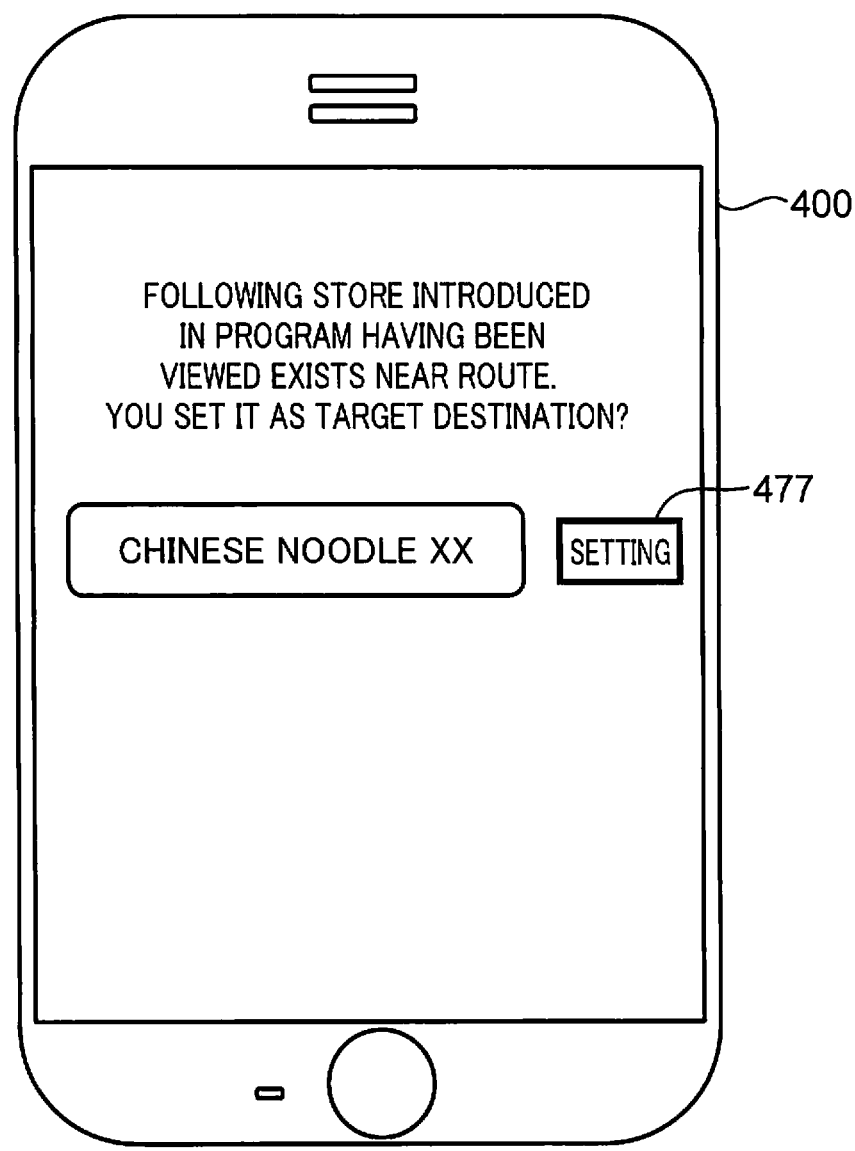
FIG. 23 is a diagram illustrating an exemplary information displayed on the guide device about a guide destination existing on a route from a current location to a target destination.

FIG. 23 is a diagram illustrating an exemplary information displayed on the guide device 400 about a guide destination existing on a route from a current location to a destination.

When the route from the current location to the target destination is determined, the guide device 400 displays a place existing near the route among the places registered as places in which a user has interests during viewing of programs. As illustrated in FIG. 23, the guide device 400 displays a name of a guide destination which exists within a predetermined distance from the determined route. Moreover, the guide device 400 displays the button 477 for setting the guide destination as a target destination.

In this way, the route from the current location to the target destination is determined, and the information of the guide destination existing near the determined route is presented.

Figure 24:
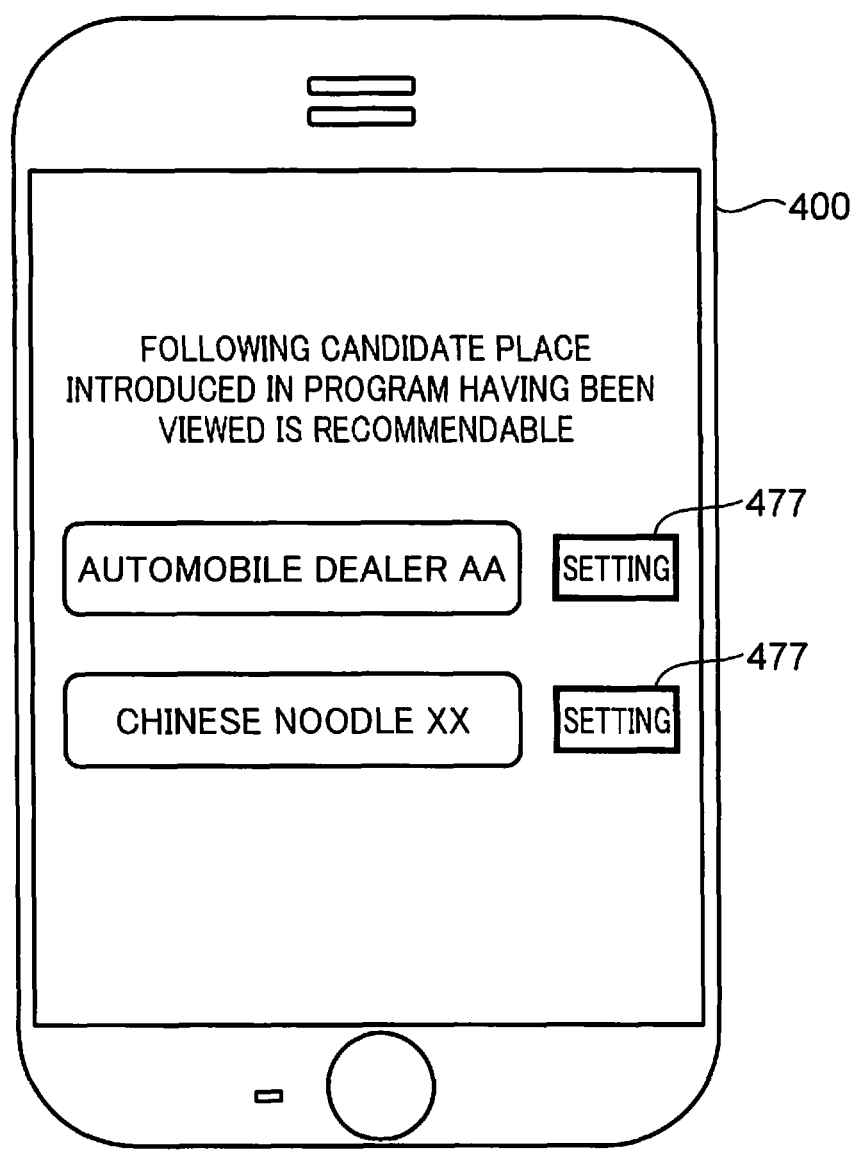
FIG. 24 is a diagram illustrating an exemplary information displayed on the guide device about other guide destination introduced in a program having been viewed by a user.

FIG. 24 is a diagram illustrating an exemplary information displayed on the guide device 400 about other guide destination introduced in a program having been viewed by a user.

The guide device 400 may display a list of places introduced in programs except for the places registered as places in which a user has interests during viewing of programs. As illustrated in FIG. 24, the guide device 400 displays a name of each guide destination. The displayed guide destination information is not the guide destination information registered by pushing down the interest button by the user, but the guide destination information introduced in a scene for which the user has not pushed down the interest button in the same program. Moreover, the guide device 400 displays the button 477 for setting the guide destination as a target destination.

As described above, guide destination information introduced in a scene for which the user has not pushed down the interest button may be presented.

<Operation of Entire System for Presenting Information>

Figure 25:
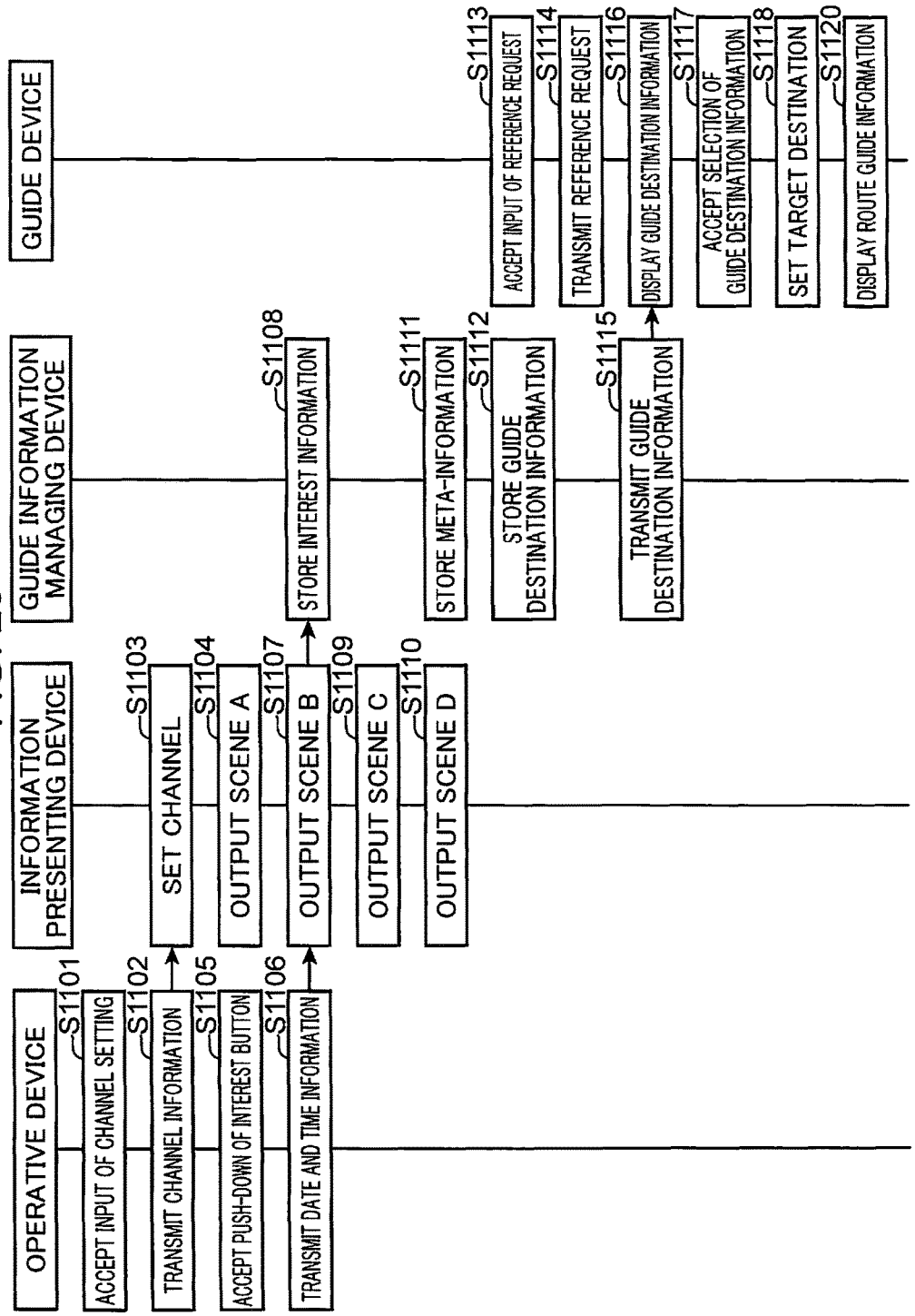
FIG. 25 is a sequential diagram explaining an operation of the entire system for presenting information in the first embodiment of the present invention.

FIG. 25 is a sequence diagram explaining an operation of the entire system for presenting information in the first embodiment of the present invention.

First, the operative device 200 accepts an input of channel setting by user A (step S1101).

Next, the operative device 200 transmits the channel information input by the user A to the information presenting device 100 (step S1102).

Then, the information presenting device 100 receives the channel information transmitted by the operative device 200, and sets a channel to be received in the receiving unit 110 in response to the received channel information (step S1103).

Subsequently, the information presenting device 100 chronologically outputs an image and a voice corresponding to the set channel (steps S1104 to S 1110). For example, the information presenting device 100 outputs an image and a voice of scene A at a certain time (step S1104), an image and voice of scene B at another time (step S1107), an image and voice of scene C at a subsequent time (step S1109), and an image and voice of scene D at further subsequent time (step S1110).

When the user A has an interest in an image and a voice during viewing, the user A operates the operative device 200 to notify that the user A has the interest. The operative device 200 accepts the pushing down of the interest button by the user (step S1105). For example, when a scene in which the user A has an interest is displayed, the user A pushes down the interest button provided in the operative device 200. In FIG. 25, the pushing down of the interest button is accepted during the output of the scene B.

When the pushing down of the interest button is accepted, the operative device 200 transmits date and time information at the timing at which the interest button is pushed down (step S1106). The date and time information is transmitted to the information presenting device 100, and the information presenting device 100 transmits the interest information indicating that the user A has an interest in a place or a commodity introduced in the displayed scene B to the guide information managing device 300.

The guide information managing device 300 allows the interest information transmitted to be stored in the input storage unit 320 by the information presenting device 100 (step S1108).

Next, the guide information managing device 300 allows the meta-information including the address of the place displayed in the scene B in which the user 1 has the interest to be stored in the mete-information storage unit 330 (step S1111).

Subsequently, the guide information managing device 300 allows the interest information, and the guide destination information included in the meta-information in association with each other to be stored in the presentation information storage unit 350 (step S1112).

Then, the guide information managing device 300 accepts an input of a reference request requesting guide destination information from the user A (step S1113). The guide information managing device 300 accepts the input of the reference request from the user A, but the present invention is not limited to this configuration. An input of a reference request from user B who is different from the user A may be accepted.

Next, the guide device 400 transmits the reference request for the guide destination information to the information managing device 300 in order to acquire the guide destination information (step S1114).

The guide information managing device 300 receives the reference request, and transmits the guide destination information stored in the presentation information storage unit 350 to the guide device 400 (step S1115).

The guide device 400 receives the guide destination information transmitted by the guide information managing device 300, and the display unit 470 displays the received guide destination information (step S1116). The user A refers to the displayed guide destination information.

The guide device 400 further accepts selection of user A's desired guide destination information (step S1117). Then, the guide device 400 sets the guide destination information selected by the user A as a target destination (step S1118). Subsequently, the guide device 400 determines a route from a current location to the set target destination, and displays route guide information guiding the user from the current location to the target destination in accordance with the determined route (step S1120).

The operation of the system for presenting information in the first embodiment of the present invention has been described.

Effects

The system for presenting information makes it possible to, when an image being viewed includes a place where a user wants to go, acquire information relevant to the place after the presentation of the image even in the case that the information is not given to the image data during the viewing of the image to thereby guide the user to the place in which the user has the interest during viewing of the image. In other words, the system for presenting information makes it possible to specify a scene of an image specified by the user during viewing of the image, and provide information relevant to the specified scene as guide destination information.

Accordingly, the system for presenting information makes it possible to specify information designated by the information presenting device during the presentation of the information to thereby acquire and provide additional information relevant to the specified information.

Second Embodiment

General Configuration

A general configuration of a system for presenting information in a present second embodiment is identical to that of the first embodiment.

The second embodiment differs from the first embodiment in the configuration of the operative device 200. Only the difference from the first embodiment will be described below.

<Detailed Configuration of Operative Device 200>

Figure 26:
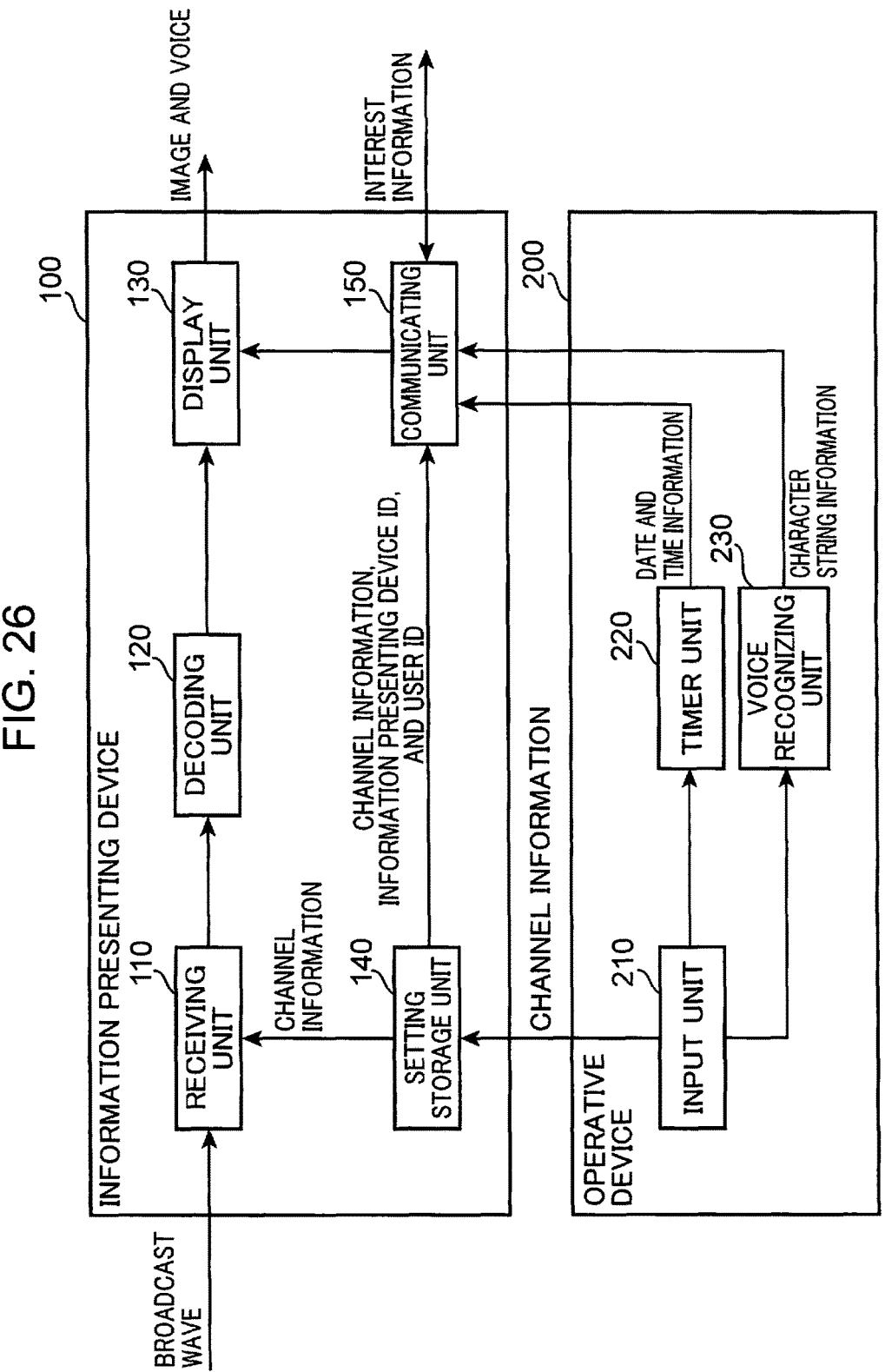
FIG. 26 is a diagram illustrating a detailed configuration of an information presenting device and an operative device in a second embodiment of the present invention.

FIG. 26 is a diagram illustrating a detailed configuration of an information presenting device 100 and an operative device 200 in the second embodiment of the present invention.

As illustrated in FIG. 26, the operative device 200 includes an input unit 210, a timer unit 220, and a voice recognizing unit 230. The voice recognizing unit 230 recognizes a voice input from the input unit 210, and transmits information indicating a timing and an object in which a user has an interest to the information presenting device 100.

The operative device 200 is configured by, for example, a remote controller or a smartphone, and causes an application adapted to input a voice to activate. The input unit 210 includes, for example, a microphone, and collects voices in a peripheral area. The input unit 210 accepts a voice uttered by a user during the presentation of image information. When a place, an item or a commodity in which the user has an interest is introduced in a program being viewed, the user utters voices indicating a demand, e.g. "want to go", "want to eat", or "want to buy". The voice recognizing unit 230 performs voice recognition of the voices collected by the input unit 210, generates character string information obtained by converting contents of the utterance indicating the user's demand into a character string, and transmits the generated character string information to the information presenting device 100. In this case, the character string information includes, for example, information indicating a place where the user wants to go, an item which the user wants to eat, or a commodity the user wants to buy.

Furthermore, when the voices are acquired by the input unit 210, the timer unit 220 outputs date and time information indicating a date and a time at which the voices acquired. When the voice recognizing unit 230 judges that the voices indicate a demand, the timer unit 220 may output the date and time information indicating the date and the time at which the voices are acquired to the information presenting device 100.

Whereby, the input unit 210 determines that the timing at which the voices indicating the demand for the program being viewed corresponds to the timing at which the user has the interest in the program, and outputs a timing signal. The timer unit 220 outputs date and time information indicating a coinciding date and a time in response to the input of the timing signal. Accordingly, the user can specify a seen in which the user has the interest in the program being viewed. Furthermore, for example, in the case that a plurality of places are displayed in a program being viewed, the voice recognizing unit 230 analyzes contents of the utterance of "want to go to XXXX" by the user to thereby specify that the user has an interest in "XX (sic. XXXX)", when accepting the voice input.

The communicating unit 150 of the information presenting device 100 receives the date and time information and the character string information transmitted by the operative device 200. The communicating unit 150 reads out the channel information, the identification number of the information presenting device 100, and the identification number of the user from the setting storage unit 140, when receiving the date and time information and the character string information. The communicating unit 150 transmits the date and time information and the character string information received from the operative device 200, and the channel information, the identification number of the information presenting device 100 and the identification number of the user read out from the setting storage unit 140 when receiving the date and time information, as interest information to the guide information managing device 300.

The receiving unit 310 of the guide information managing device 300 receives the interest information transmitted by the information presenting device 100. The input storage unit 320 stores the interest information received by the receiving unit 310.

FIG. 27 is a diagram illustrating an interest information table stored in an input storage unit in the second embodiment of the present invention.

As illustrated in FIG. 27, an input storage unit 320 stores the interest information table in which the date and time information, the channel information, and the character string information is associated with one another. The character string information is information specifying a place or a commodity in which a user has an interest, or specifying a place or a commodity in which a viewer has an interest among a plurality of places or commodities introduced in a program being viewed. The interest information table illustrated in FIG. 27 is provided for each identification number of an information presenting device and each identification number of a user. In other words, the interest information transmitted from the information presenting device 100 includes the date and time information, the channel information, the character string information, the identification number of the information presenting device, and the identification number of the user. The input storage unit 320 stores the date and time information, the channel information and the character string information in association with one another in the interest information table corresponding to the identification number of the information presenting device and the identification number of the user.

The configuration of the system for presenting information in the second embodiment has been described.

<Operation>

Hereinafter, the operation of the system for presenting information in the second embodiment of the present invention will be described.

The second embodiment differs from the first embodiment in the operation of the operative device 200. Only the difference from the first embodiment will be described below.

<Operation of Operative Device 200>

The operation of the operative device 200 in the second embodiment will be described by using the flowchart of FIG. 9. In step S11 of FIG. 9, the voice recognizing unit 230 judges whether or not contents of an utterance by a user are contents indicating that the user has an interest. When it is judged that the contents of the utterance by the user are the contents indicating that the user has the interest (YES in step 11), the voice recognizing unit 230 transmits the character string information indicating a place or an object in which the user has the interest to the information presenting device 100, and the timer unit 220 transmits the date and time information to the information presenting device 100, in step S12.

Figure 28:
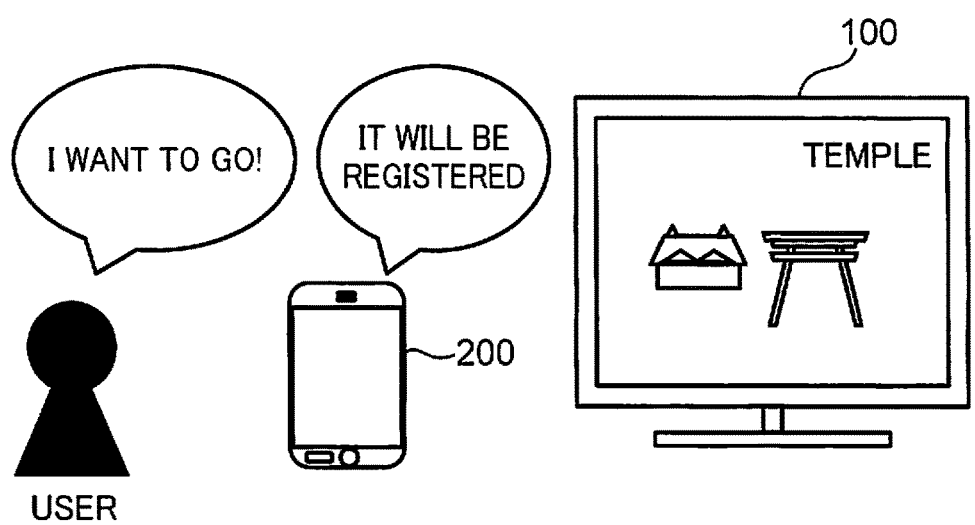
FIG. 28 is a diagram explaining a process of registering a place where a user wants to go as interest information by a voice input in the second embodiment of the present invention.

FIG. 28 is a diagram explaining a process of registering a place where a user wants to go as interest information by a voice input in the second embodiment of the present invention.

As illustrated in FIG. 28, the operative device 200 accepts a voice input by a viewer during display of a television program by the information presenting device 100. A user utters, for example, "I want to go", when a place in which the user has an interest is displayed in the program being viewed. The voice recognizing unit 230 of the operative device 200 performs voice recognition of the voices uttered by the viewer, and judges that the voices of "I want to go" are voices indicating a demand. When it is judged that the input voices are the voices indicating the demand, the timer unit 220 transmits the date and time information to the information presenting device 100. After that, the operative device 200 outputs voices, for example, "It will be registered".

Also, when the voices include a voice specifying a concrete place, the voice recognizing unit 230 creates character string information indicating the concrete place, and transmits the created character string information to the information presenting device 100. When the voices do not include any voice specifying the concrete place, the voice recognizing unit 230 may not transmit the character string information to the information presenting device 100.

The communicating unit 150 of the information presenting device 100 receives the date and time information and the character string information transmitted from the operative device 200. The communicating unit 150 transmits the date and time information and the character string information received from the operative device 200, and the channel information, the identification number of the information presenting device 100 and the identification number of the user read out from the setting storage unit 140 when receiving the date and time information, as interest information to the guide information managing device 300.

The receiving unit 310 of the guide information managing device 300 receives the interest information transmitted by the information presenting device 100. The input storage unit 320 stores the interest information received by the receiving unit 310.

Figure 29:
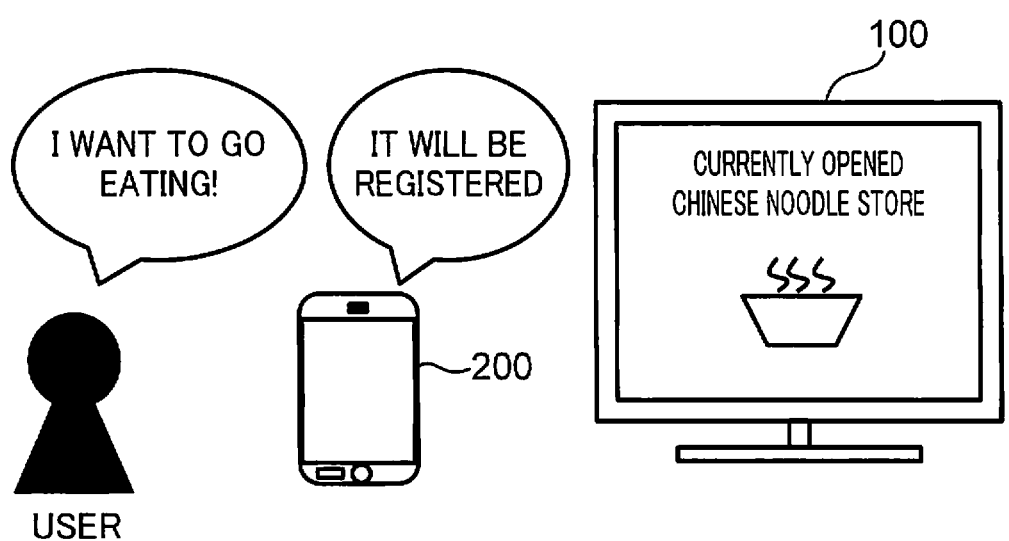
FIG. 29 is a diagram explaining a process of registering a place where a user wants to go eating as interest information by a voice input in the second embodiment of the present invention.

FIG. 29 is a diagram explaining a process of registering a place where a user wants to go eating as interest information by a voice input in the second embodiment of the present invention.

As illustrated in FIG. 29, the operative device 200 accepts a voice input by a viewer during display of a television program by the information presenting device 100. A user utters, for example, "I want to go eating", when a place in which the user has an interest is displayed in the program being viewed. The voice recognizing unit 230 of the operative device 200 performs voice recognition of the voices uttered by the viewer, and judges that the voices of "I want to go eating" are voices indicating a demand. When it is judged that the input voices are voices indicating the demand, the timer unit 220 transmits the date and time information to the information presenting device 100. After that, the operative device 200 outputs voices, for example, "It will be registered". Other processes are the same as those in FIG. 28.

Figure 30:
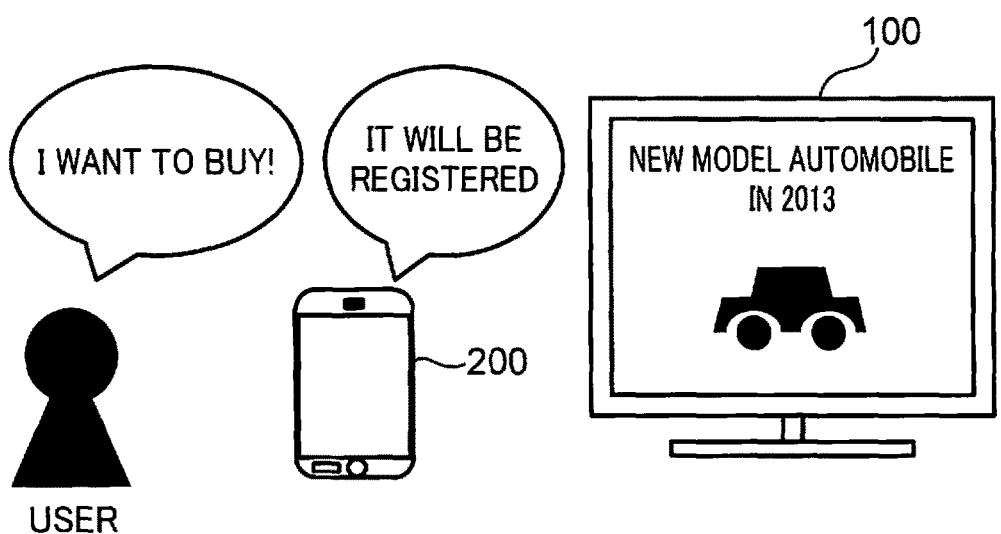
FIG. 30 is a diagram explaining a process of registering a commodity which a user wants to buy as interest information by a voice input in the second embodiment of the present invention.

FIG. 30 is a diagram explaining a process of registering a commodity which a user wants to buy as interest information by a voice input in the second embodiment of the present invention.

As illustrated in FIG. 30, the operative device 200 accepts a voice input by a viewer during display of a television program by the information presenting device 100. A user utters, for example, "I want to buy", when a commodity in which the user has an interest is displayed in the program being viewed. The voice recognizing unit 230 of the operative device 200 performs voice recognition of the voices uttered by the viewer, and judges that the voices of "I want to buy" are voices indicating a demand. When it is judged that the input voices are voices indicating the demand, the timer unit 220 transmits the date and time information to the information presenting device 100. After that, the operative device 200 outputs voices, for example, "It will be registered". Other processes are the same as those in FIG. 28.

Figure 31:
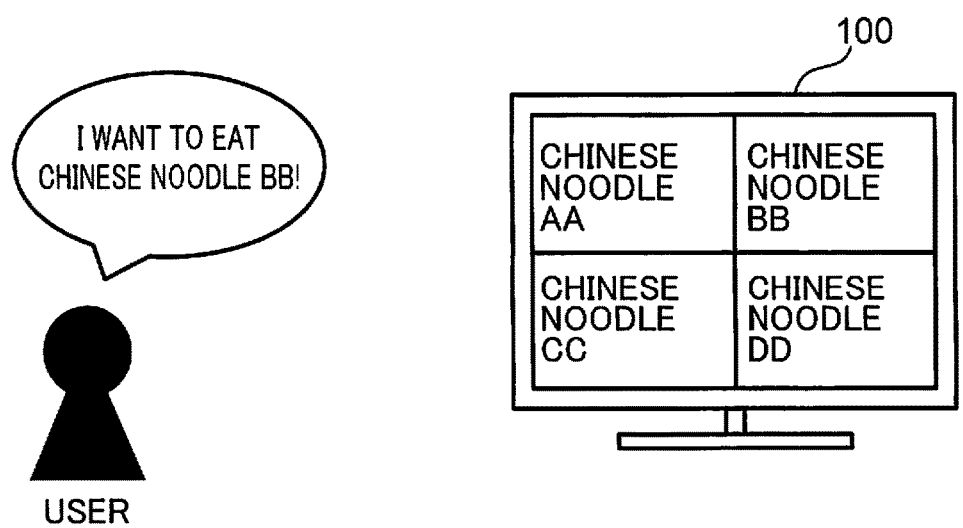
FIG. 31 is a diagram explaining a process of registering an item which a user wants to eat when a plurality of places are displayed in a program being viewed in the second embodiment of the present invention.

FIG. 31 is a diagram explaining a process of registering an item which a user wants to eat when a plurality of places are displayed in a program being viewed in the second embodiment of the present invention.

As illustrated in FIG. 31, the operative device 200 accepts a voice input by a viewer during display of a television program by the information presenting device 100. In this case, the television program displays a plurality of items, thus it is impossible to specify which item the viewer wants to eat only by the input of the voices of "I want to eat". Therefore, a user utters, for example, "I want to eat Chinese noodle BB", during the display of the plurality of items including one in which the user has an interest in the program being viewed. The voice recognizing unit 230 of the operative device 200 performs voice recognition of the voices uttered by the viewer, and judges that the voices of "I want to eat" are voices indicating a demand.

Moreover, the voice recognizing unit 230 judges that the voices of "Chinese noodle BB" are the voices indicating a specific item. When it is judged that the input voices are the voices indicating the demand, the timer unit 220 transmits the date and time information to the information presenting device 100. Also, when it is judged that the input voices are voices indicating the specific item, the voice recognizing unit 230 converts the voices indicating the specific item into character string information, and transmits the character string information to the information presenting device 100. After that, the operative device 200 outputs voices, for example, "It will be registered".

The operation of the system for presenting information in the second embodiment have been described.

Effects

The system for presenting information makes it possible to, when information of a plurality of places or objects are presented during viewing of an image, specify a place or an object in which a user has an interest. In other words, the system for presenting information makes it possible to specify information designated by the user among a plurality of pieces of information (places or objects) presented in a scene of an image designated by the user during the viewing of the image, and provide information relevant to the specified scene as guide destination information.

Accordingly, the system for presenting information makes it possible to specify information designated by the information presenting device during the presentation of the information to thereby acquire and provide additional information relevant to the specified information.

Third Embodiment

General Configuration

A general configuration of a system for presenting information in a third embodiment is identical to that of the first embodiment.

The third embodiment differs from the first embodiment in the configuration of the operative device 200. Only the difference from the first embodiment will be described below.

<Detailed Configuration of Operative Device 200>

Figure 32:
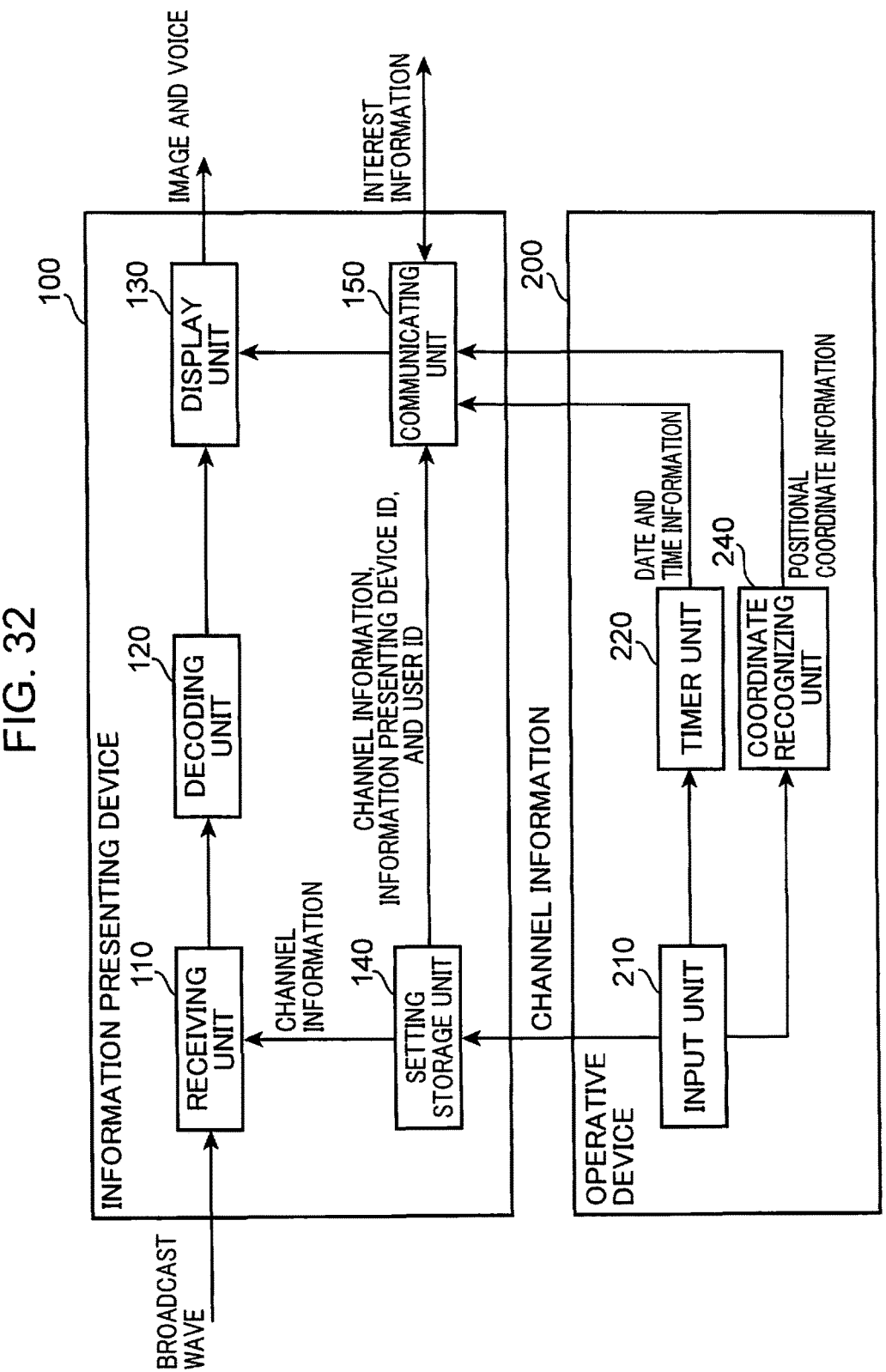
FIG. 32 is a diagram illustrating the detailed configuration of an information presenting device and an operative device in a third embodiment of the present invention.

FIG. 32 is a diagram illustrating a detailed configuration of an information presenting device 100 and an operative device 200 in the third embodiment of the present invention.

As illustrated in FIG. 32, the operative device 200 includes an input unit 210, a timer unit 220, and a coordinate recognizing unit 240.

The input 210 includes an interest button to be pushed down during presentation of an image in which a user has an interest.

The input 210 includes a camera for detecting a sight line of the user. The coordinate recognizing unit 240 accepts sight line information indicating the position of the sight line of the user over a screen. The coordinate recognizing unit 240 specifies a positional coordinate on the screen about the sight line of the user input from the input unit 210, and transmits the specified positional coordinate to the information presenting device 100. Furthermore, the coordinate recognizing unit 240 is triggered by the pushing down of the interest button to thereby specify the positional coordinate on the screen about the sight line of the user input from the input unit 210. In this manner, it is possible to specify which positional coordinate in an image presented by the information presenting device 100 presents a place or an object in which the user has an interest.

The input 210 may include a pointing device. In this case, the coordinate recognizing unit 240 accepts an input operation about a positional coordinate on the screen, the positional coordinate being instructed by the pointing device. The coordinate recognizing unit 240 may specify the positional coordinate input from the input unit 210 and indicated by the pointing device, and transmit the specified positional coordinate to the information presenting device 100. Furthermore, the coordinate recognizing unit 240 is triggered by the pushing down of the interest button to thereby specify the positional coordinate input from the input unit 210 and indicated by the pointing device.

The communicating unit 150 of the information presenting device 100 receives the date and time information and the positional coordinate information transmitted by the operative device 200. The communicating unit 150 reads out the channel information, the identification number of the information presenting device 100, and the identification number of the user from the setting storage unit 140, when receiving the date and time information and the positional coordinate information. The communicating unit 150 transmits the date and time information and the positional coordinate information received from the operative device 200, and the channel information, the identification number of the information presenting device 100 and the identification number of the user read out from the setting storage unit 140 when receiving the date and time information as interest information to the guide information managing device 300.

The receiving unit 310 of the guide information managing device 300 receives the interest information transmitted by the information presenting device 100. The input storage unit 320 stores the interest information received by the receiving unit 310. The registration unit 340 acquires the guide destination information associated with the positional coordinate information from the meta-information storage unit 330. The meta-information storage unit 330 stores the guide destination information in association with the positional coordinate information. The presentation information storage unit 350 stores the date and time information, the image specifying information, and the guide destination information acquired by the registration unit 340.

FIG. 33 is a diagram illustrating an exemplary interest information table stored in an input storage unit in the third embodiment of the present invention.

As illustrated in FIG. 33, the input storage unit 320 stores the interest information table in which the date and time information, the channel information, and the positional coordinate information is associated with one another. The positional coordinate information is information specifying a place or a commodity in which a user has an interest, and specifying a place or a commodity in which a viewer has an interest among a plurality of places or commodities introduced in a program being viewed. The positional coordinate information is represented by a positional coordinated of a pixel. The interest information table illustrated in FIG. 33 is provided for each identification number of an information presenting device and each identification number of a user. In other words, the interest information transmitted from the information presenting device 100 includes the date and time information, the channel information, the positional coordinate information, the identification number of the information presenting device, and the identification number of the user. The input storage unit 320 stores the date and time information, the channel information and the positional coordinate information in association with one another in the interest information table corresponding to the identification number of the information presenting device and the identification number of the user.

The configuration of the system for presenting information in the third embodiment has been described.

<Operation>

Hereinafter, the operation of the system for presenting information in the third embodiment of the present invention will be described.

The third embodiment differs from the first embodiment in the operation of the operative device 200. Only the difference from the first embodiment will be described below.

<Operation of Operative Device 200>

The operation of the operative device 200 in the third embodiment will be described by using the flowchart of FIG. 9. In step S11 of FIG. 9, the input unit 210 judges whether or not the interest button which indicates that a user has an interest is pushed down or not. The input unit 210 may judge whether or not there is a voice input. When it is judged that the interest button is pushed down (YES in step S11), the timer unit 220 transmits timer information of the time at which the interest button is pushed down as date and time information to the information presenting device 100.

Next, the coordinate recognizing unit 240 specifies a positional coordinate of a sight line on a screen when the interest button is pushed down, and transmits information of the specified positional coordinate to the information presenting device 100. At this time, the coordinate recognizing unit 240 may specify a positional coordinate indicated by a pointing device when the interest button is pushed down, and transmits the specified coordinate to the information presenting device 100.

Figure 34:
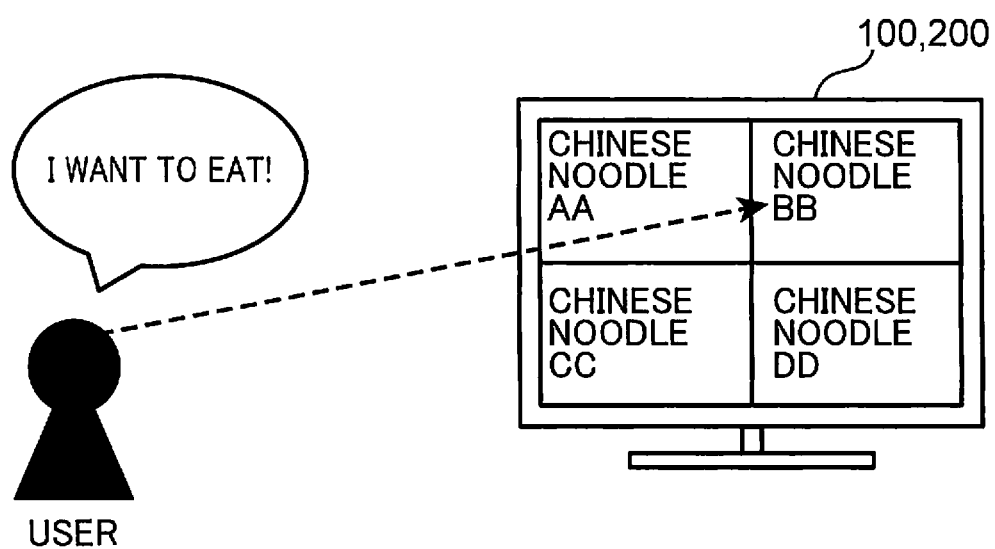
FIG. 34 is a diagram explaining a process of registering an item which a user wants to eat as interest information by a voice input and a detection of a sight line in the third embodiment of the present invention.

FIG. 34 is a diagram explaining a process of registering an item which a user wants to eat as interest information by a voice input and a detection of a sight line in the third embodiment of the present invention.

As illustrated in FIG. 34, the operative device 200 accepts a voice input by a viewer during display of a television program by the information presenting device 100. In FIG. 34, the information presenting device 100 includes the operative device 200. At this time, the television program displays a plurality of items, thus it is impossible to specify which item the viewer wants to eat only by the input of the voices, "I want to eat". Therefore, a user utters, for example, "I want to eat", while watching an item in which the user has an interest during the display of the plurality of items including the item in which the user has the interest in the program being viewed. The voice recognizing unit 230 (not shown) of the operative device 200 performs voice recognition of the voices uttered by the viewer, and judges that the voices of "I want to eat" are voices indicating a demand.

Furthermore, the coordinate recognizing unit 240 specifies a positional coordinate of a sight line of a user on a screen. When it is judged that input voices are voices indicating the demand, the timer unit 220 transmits the date and time information to the information presenting device 100. Also, the coordinate recognizing unit 240 transmits the specified positional coordinate information to the information presenting device 100.

The communicating unit 150 of the information presenting device 100 receives the date and time information and the positional coordinate information transmitted from the operative device 200. The communicating unit 150 transmits the date and time information and the positional coordinate information received from the operative device 200, and the channel information, the identification number of the information presenting device 100, and the identification number of the user read out from the setting storage unit 140 when receiving the date and time information, as interest information to the guide information managing device 300.

The receiving unit 310 of the guide information managing device 300 receives the interest information transmitted by the information presenting device 100. The input storage unit 320 stores the interest information received by the receiving unit 310.

Figure 35:
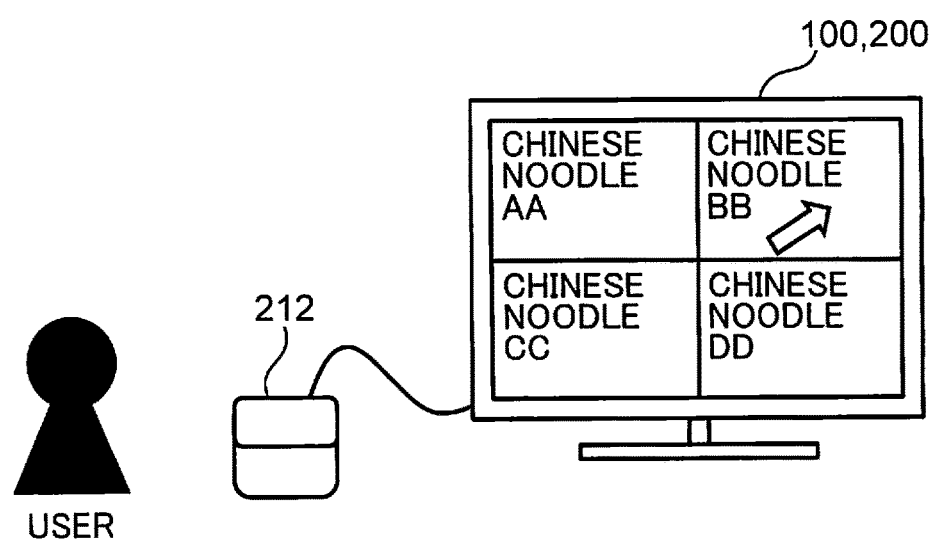
FIG. 35 is a diagram explaining a process of registering an item which a user wants to eat as interest information by a pointing device in the third embodiment of the present invention.

FIG. 35 is a diagram explaining a process of registering an item which a user wants to eat as interest information by a pointing device in the third embodiment of the present invention.

As illustrated in FIG. 35, the operative device 200 accepts an input operation of a pointing device by a viewer during display of a television program by the information presenting device 100. The pointing device is, for example, a mouse 212. In FIG. 35, the information presenting device 100 includes the operative device 200. At this time, the television program displays a plurality of items. The user moves a pointer to an item in which the user has an interest and pushes down a button provided to a mouse 212 during the presentation of the plurality of items including the item in which the user has the interest in the program being viewed. The button provided to the mouse 212 corresponds to the interest button.

The coordinate recognizing unit 240 specifies a positional coordinate of the pointer. The timer unit 220 transmits the date and time information to the information presenting device 100. Furthermore, the coordinate recognizing unit 240 transmits the specified positional coordinate information to the information presenting device 100. Other processes are the same as those in FIG. 34.

The operation of the system for presenting information in the third embodiment has been described.

Effects

The system for presenting information makes it possible to, when information of a plurality of places or objects are presented during viewing of an image, specify a place or an object in which a user has an interest. In other words, the system for presenting information makes it possible to specify information designated by the user among a plurality of pieces of information (places or objects) presented in a scene of an image designated by the user during the viewing of the image, and provide information relevant to the specified scene as guide destination information.

Accordingly, the system for presenting information makes it possible to specify information designated by the information presenting device during the presentation of the information to thereby acquire and provide additional information relevant to the specified information.

Fourth Embodiment

General Configuration

A general configuration of a system for presenting information in a fourth embodiment is identical to that of the first embodiment.

The fourth embodiment differs from the first embodiment in the configuration of the operative device 200. Only the difference from the first to third embodiment will be described below.

<Detailed Configuration of Operative Device 200>

Figure 36:
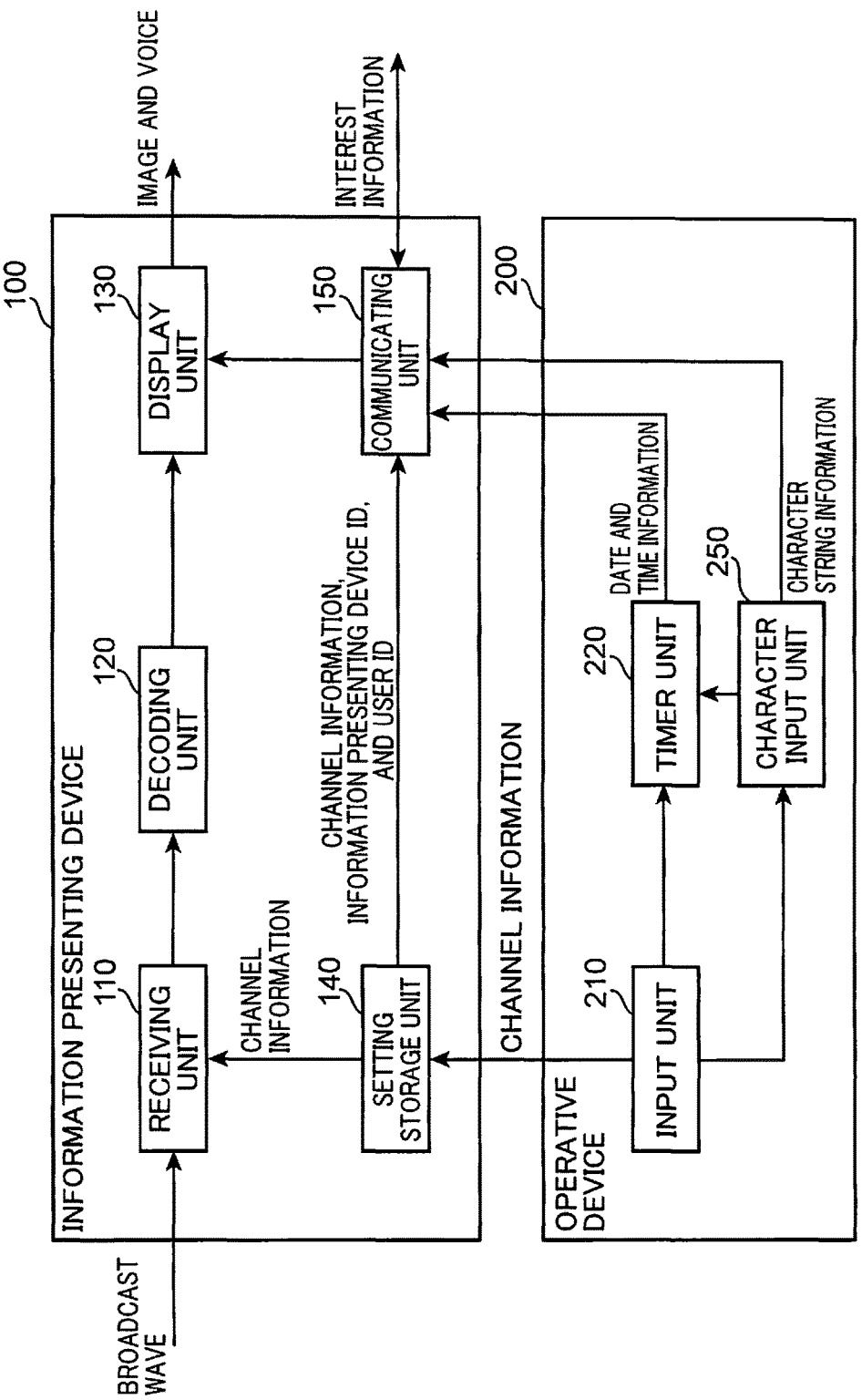
FIG. 36 is a diagram illustrating a detailed configuration of an information presenting device and an operative device in a fourth embodiment of the present invention.

FIG. 36 is a diagram illustrating a detailed configuration of an information presenting device 100 and an operative device 200 in the fourth embodiment of the present invention.

As illustrated in FIG. 36, the operative device 200 includes an input unit 210, a timer unit 220, and a character input unit 250. The input unit 210 accepts a character input by a user. The character input unit 250 interprets the meaning of the character string input from the input unit 210, generates character string information, and transmits the generated character string information to the information presenting device 100. When a place, an item or a commodity in which a user has an interest is introduced in a program being viewed, the user inputs characters indicating a demand, e.g. "want to go", "want to eat", or "want to buy". In this case, the character string information may include, for example, information indicating a place where the user wants to go, an item which the user wants to eat, or a commodity which the user wants to buy.

The configuration of the system for presenting information in the fourth embodiment has been described.

<Operation>

Hereinafter, the operation of the system for presenting information in the fourth embodiment of the present invention will be described.

The fourth embodiment differs from the first embodiment in the operation of the operative device 200. Only the difference from the first embodiment will be described below.

<Operation of Operative Device 200>

The operation of the operative device 200 in the fourth embodiment will be described by using the flowchart of FIG. 9. In step S11 of FIG. 9, the character input unit 250 judges whether or not contents of a character string input by a user are contents indicating that the user has an interest. When it is judged that the contents of the character string input by the user are the contents indicating that the user has the interest (YES in step 11), the voice character input unit 250 transmits the character string information indicating a place or an object in which the user has the interest to the information presenting device 100, and the timer unit 220 transmits the date and time information to the information presenting device 100, in step S12.

Figure 37:
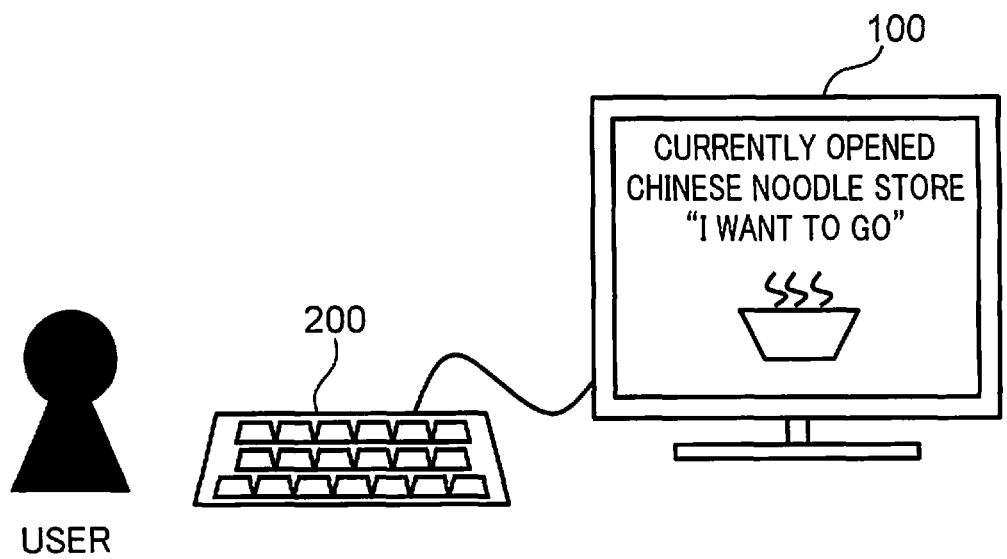
FIG. 37 is a diagram explaining a process of registering a place where a user wants to go as interest information by a character input in the fourth embodiment of the present invention.

FIG. 37 is a diagram for an explanation about a process of registering a place where a user wants to go as interest information by a character input in the fourth embodiment of the present invention.

As illustrated in FIG. 37, the operative device 200 accepts a character input by a viewer during display of a television program by the information presenting device 100. The user inputs, for example, "I want to go", when a place in which the user has an interest is displayed in the program being viewed. The character input unit 250 of the operative device 200 interprets the meaning of the character strings input by the viewer, and judges that the character strings of "I want to go" are character strings indicating a demand. When it is judged that the input character strings are the character strings indicating the demand, the timer unit 220 transmits the date and time information to the information presenting device 100.

Also, when the character strings include a character string specifying a concrete place, the character input unit 250 creates character string information indicating the concrete place, and transmits the created character string information to the information presenting device 100. When the character strings do not include any character string specifying the concrete place, the character input unit 250 may not transmit the character string information to the information presenting device 100.

The communicating unit 150 of the information presenting device 100 receives the date and time information and the character string information transmitted from the operative device 200. The communicating unit 150 transmits the date and time information and the character string information received from the operative device 200, and the channel information, the identification number of the information presenting device 100, and the identification number of the user read out from the setting storage unit 140 when receiving the date and time information, as interest information to the guide information managing device 300.

The receiving unit 310 of the guide information managing device 300 receives the interest information transmitted by the information presenting device 100. The input storage unit 320 stores the interest information received by the receiving unit 310.

The operation of the system for presenting information in the fourth embodiment has been described.

Effects

The system for presenting information makes it possible to, when information of a plurality of places or objects are presented during viewing of an image, specify a place or an object in which a user has an interest. In other words, the system for presenting information makes it possible to specify information designated by the user among a plurality of pieces of information (places or objects) presented in a scene of an image designated by the user during the viewing of the image, and provide information relevant to the specified scene as guide destination information.

Accordingly, the system for presenting information makes it possible to specify information designated by the information presenting device during the presentation of the information to thereby acquire and provide additional information relevant to the specified information.

Fifth Embodiment

General Configuration

A general configuration of a system for presenting information in a fifth embodiment is identical to that of the first embodiment.

The fifth embodiment differs from the first embodiment in the configuration of the guide device 400. Only the difference from the first embodiment will be described below.

The guide device 400 is configured by, for example, a web browser.

<Detailed Configuration of Guide Device 400>

Figure 38:
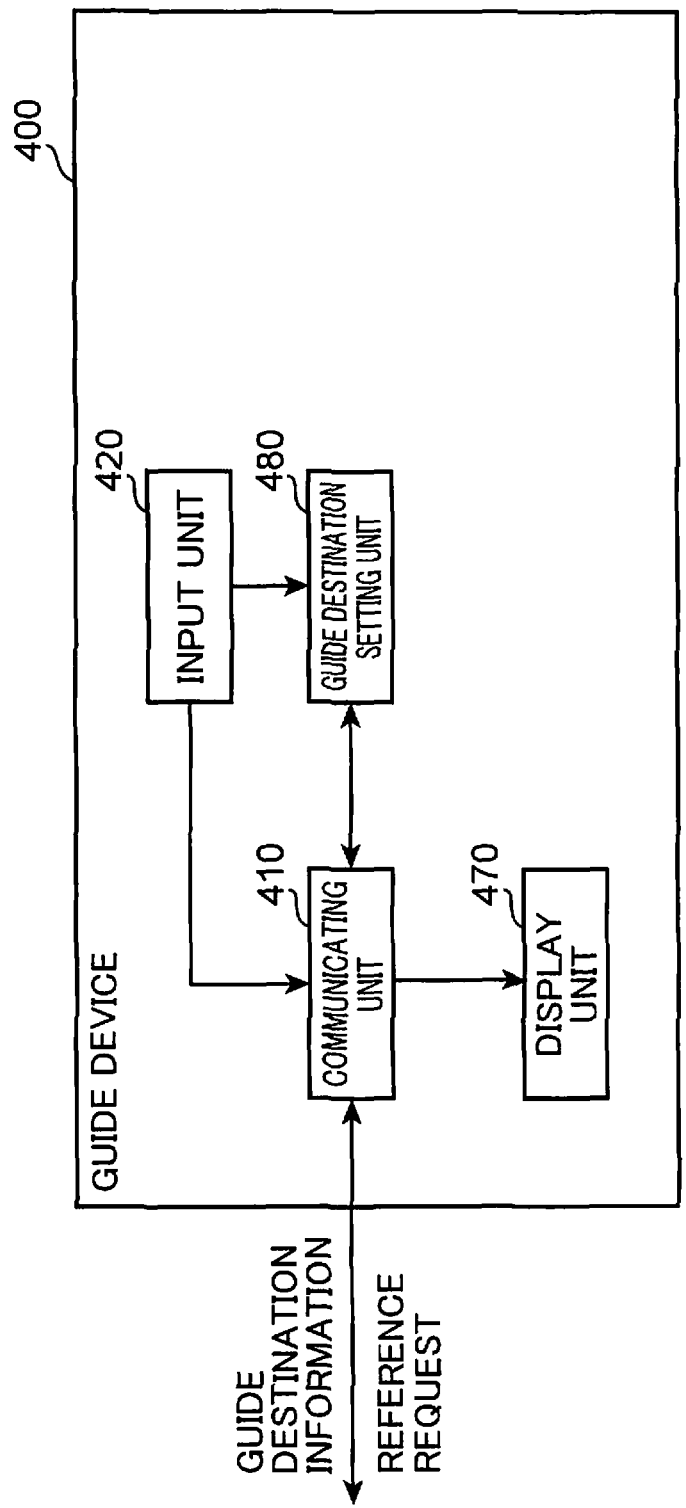
FIG. 38 is a diagram illustrating a detailed configuration of a guide device in a fifth embodiment of the present invention.

FIG. 38 is a diagram illustrating a detailed configuration of a guide device 400 in a fifth embodiment of the present invention.

As shown in FIG. 38, the guide device 400 includes a communicating unit 410, an input unit 420, a display unit 470, and a guide destination setting unit.

When a reference request for guide destination information is input by the input unit 420, the communicating unit 410 transmits the reference request to the guide information managing device 300. Moreover, the communicating unit 410 receives the guide destination information transmitted from the guide information managing device 300.

The input unit 420 accepts an operation into the guide device 400 by a user. For example, the input unit 420 accepts an input of a reference request for referring to the guide destination information. Furthermore, the input unit 420 accepts an input of a URL of a webpage to which the user wants to refer.

The display unit 470 displays an operation screen or an information presentation screen of the guide device 400 to a user. The display unit 470 may present the guide destination information to the user by a voice in addition to an image. For example, in the case that the guide device 400 is a car navigation device, a smartphone, or a tablet computer, the car navigation device, the smartphone, or the tablet computer may present guide destination information on each screen, or may output the guide destination information by a voice from each speaker.

When the user having referred to the guide destination information received by the communicating unit 410 selects specific guide destination information by using the input unit 420, the guide destination setting unit 480 stores and sets the selected guide destination information, and requests the reference of the webpage to the communicating unit 410.

The configuration of the system for presenting information in the fifth embodiment of the present invention has been described.

<Operation>

Hereinafter, the operation of the system for presenting information in the fifth embodiment of the present invention will be described.

The fifth embodiment differs from the first embodiment in the operation of the guide device 400. Only the difference from the first embodiment will be described below.

<Operation of Guide Device 400>

The operation of the guide device 400 in the fifth embodiment will be described by using the flowchart of FIG. 15. In step S38 of FIG. 15, the guide destination setting unit 480 determines a webpage of a guide destination. Next, in Step S39, the display unit 470 displays the webpage determined by the guide destination setting unit 480.

The operation of the system for presenting information in the fifth embodiment has been described.

Effects

The system for presenting information makes it possible to, when information of a plurality of places or objects are presented during viewing of an image, obtain guide destination information for guiding a user to a place or an object in which the user has an interest. In other words, the system for presenting information makes it possible to specify information designated by the user among a plurality of pieces of information (places or objects) presented in a scene of an image designated by the user during the viewing of the image, and provide information relevant to the specified scene as guide destination information.

Accordingly, the system for presenting information makes it possible to specify information designated by the information presenting device during the presentation of the information to thereby acquire and provide additional information relevant to the specified information.

Sixth Embodiment

General Configuration

A general configuration of a system for presenting information in a sixth embodiment is identical to that of the first embodiment.

The sixth embodiment differs from the first embodiment in the configuration of the guide information managing device 300. Only the difference from the first embodiment will be described below.

<Detailed Configuration of Guide Information Managing Device 300>

Figure 39:
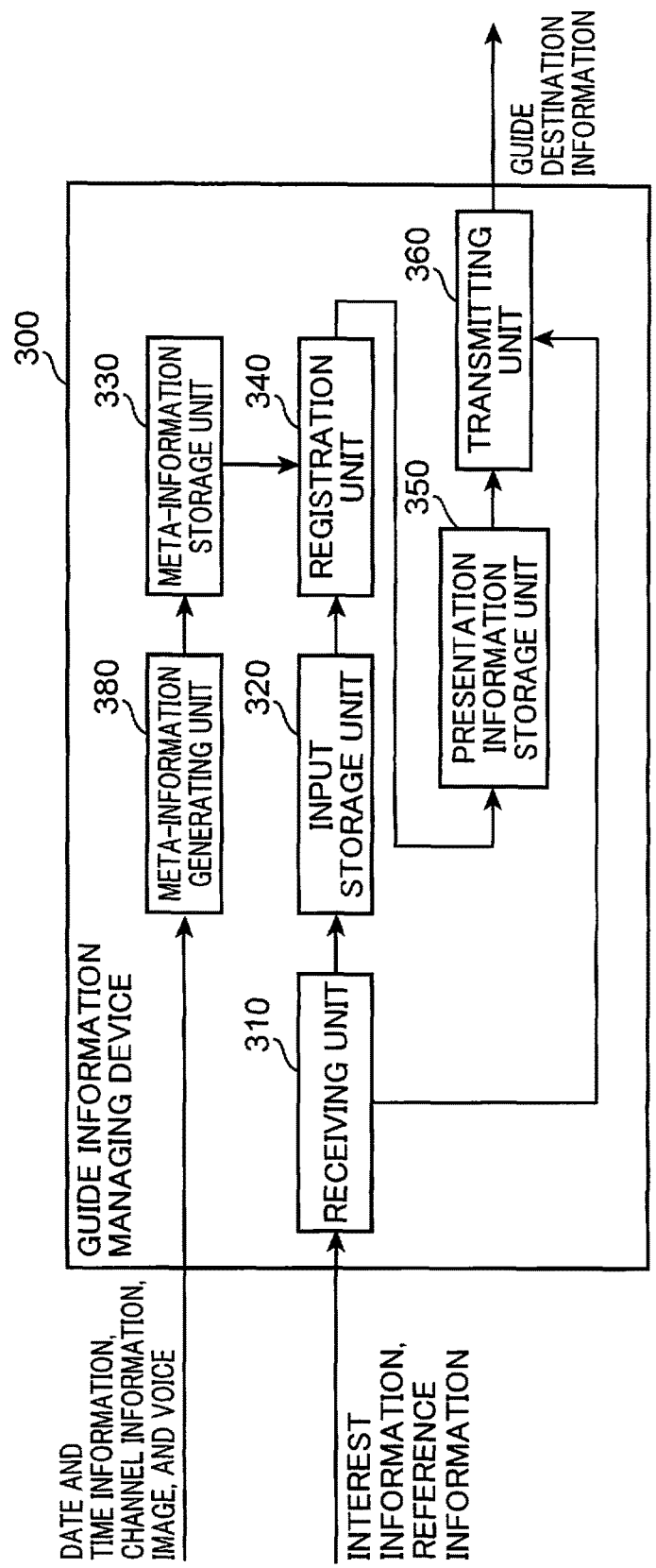
FIG. 39 is a diagram illustrating a detailed configuration of a guide information managing device in a sixth embodiment of the present invention.

FIG. 39 is a diagram illustrating a detailed configuration of a guide information managing device 300 in a sixth embodiment of the present invention.

As illustrated in FIG. 39, the guide information managing device 300 includes a receiving unit 310, an input storage unit 320, a meta-information storage unit 330, a registration unit 340, a presentation information storage unit 350, a transmitting unit 360, and a meta-information generating unit 380.

The meta-information generating unit 380 generates guide destination information based on image information. The meta-information generating unit 380 refers to image and a voice obtained by encoding a broadcast wave transmitted to the information presenting device 100, a recorded image and voice, and information on the Internet or a database on the Internet, and performs picture recognition, voice recognition or character recognition to thereby generate meta-information, as needed. For example, the meta-information generating unit 380 calculates an interrelationship between a picture included in a motion image, and each of pictures taken by a plurality of users at a plurality of places. When the both pictures are similar to each other, the meta-information generating unit 380 judges that the place in the picture included in the motion image is the same as the place in the picture taken by a user, and outputs locational information given to the picture taken by the user as the meta-information. Moreover, for example, the meta-information generating unit 380 may recognize and analyze the presented voice, and output locational information included in the voice as the meta-information relevant to the presented voice.

<Detailed Configuration of Modified Guide Information Managing Device 300>

Figure 40:
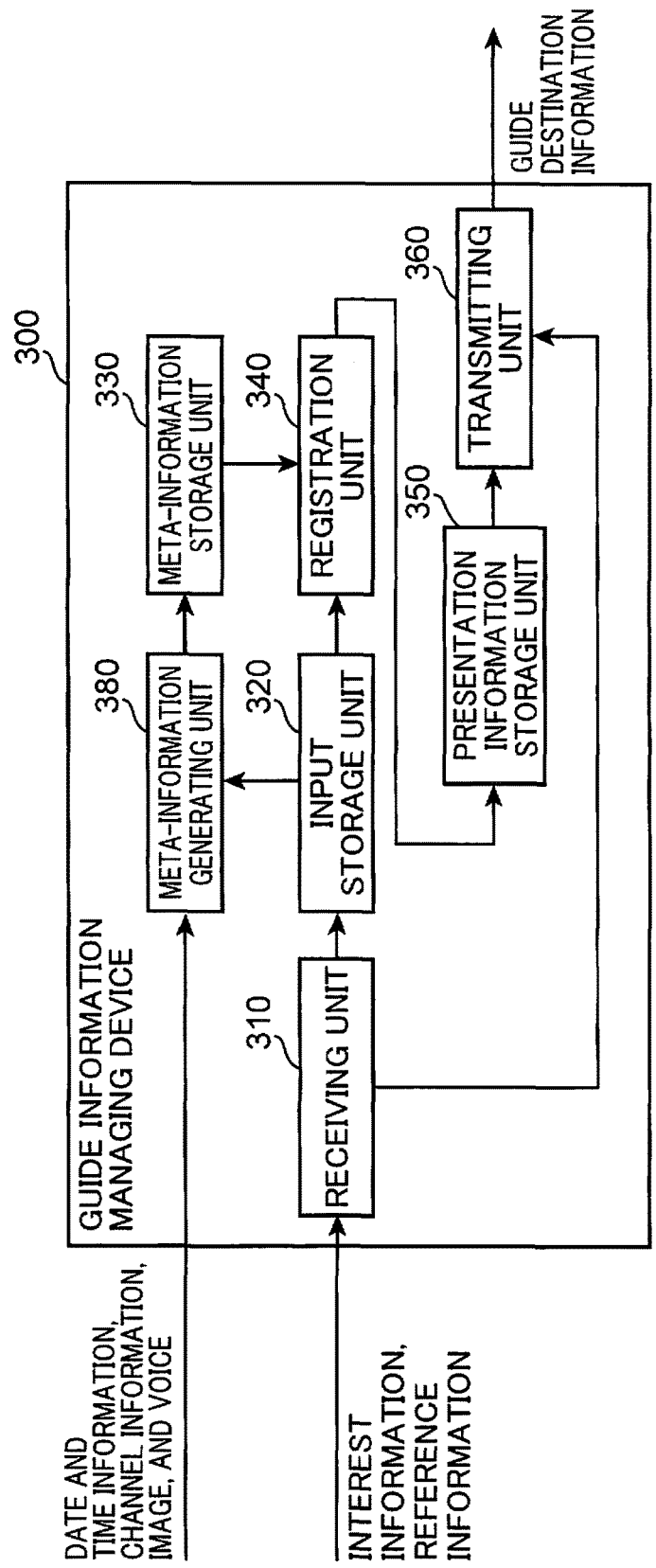
FIG. 40 is a diagram illustrating a detailed configuration of a modified guide information managing device in the sixth embodiment of the present invention.

FIG. 40 is a diagram illustrating a detailed configuration of a modified guide information managing device 300 in the sixth embodiment of the present invention.

As illustrated in FIG. 40, the guide information managing device 300 includes a receiving unit 310, an input storage unit 320, a meta-information storage unit 330, a registration unit 340, a presentation information storage unit 350, a transmitting unit 360, and a meta-information generating unit 380.

The meta-information generating unit 380 may determine the priority order of meta-information to be generated with reference to information stored in the input storage unit 320. The meta-information generating unit 380 also can judge not to give the meta-information to presenting information or a scene for which interest information is not stored in the input storage unit 320. When a plurality of pieces of guide destination information is generated, the meta-information generating unit 380 determines the priority order of the plurality of pieces of guide destination information in response to an accepted input operation.

Interest information of the plurality of users is acquired and stored in the input storage unit 320 to thereby make it is possible to prioritize the registration of the guide destination information in which more users have interest.

The configuration of the system for presenting information in the sixth embodiment of the present invention has been described.

<Operation>

Hereinafter, the operation of the system for presenting information in the sixth embodiment of the present invention will be described.

The sixth embodiment differs from the first embodiment in the operation of the guide information managing device 300. Only the difference from the first embodiment will be described below.

<Operation of Guide Information Managing Device 300>

The operation of the guide information managing device 300 in the sixth embodiment will be described by using the flowchart of FIG. 12. In step S23 of FIG. 12, when it is judged that meta-information of a program specified by interest information is not stored (No in step S23), the meta-information generating unit 380 generates meta-information (guide destination information) based on image information. Next, the registration unit 340 judges whether or not the meta-information (guide destination information) is generated. When it is judged that the meta-information (guide destination information) is generated, the flow proceeds to the process in step S24. To the contrary, when it is judged that the meta-information (guide destination information) is not generated, the flow proceeds to the process in step S26.

The operation of the system for presenting information in the sixth embodiment has been described.

Effects

Even when a plurality of pieces of information of places or objects are not presented during viewing of an image, the system for presenting information makes it possible to obtain guide destination information guiding a user to a place or an object in which the user has an interest. In other words, the system for presenting information makes it possible to specify a scene of an image designated by the user and analyze the specified scene to thereby output relevant additional information (guide destination information) during viewing of the image by the information presenting device.

Accordingly, the system for presenting information makes it possible to specify information designated by the information presenting device during the presentation of the information to thereby acquire and provide additional information relevant to the specified information.

(Modification)

In the respective embodiments, a single information presenting device 100 is connected with a single operative device 200. However, the present invention is not limited to this configuration. A single information presenting device 100 may be connected with a plurality of operative devices 200, or a plurality of information presenting devices 100 may be connected with a single operative device 200.

The respective embodiments may be combined with one another. For example, the second embodiment may be combined with the sixth embodiment.

The techniques described in all of the aforementioned embodiments are realized by, for example, the following types of cloud services. However, the types of cloud services that realize the techniques described in the aforementioned aspects are not limited to the following types.

(Service Type 1: Proprietary Data Center Type Cloud Service)

Figure 41:
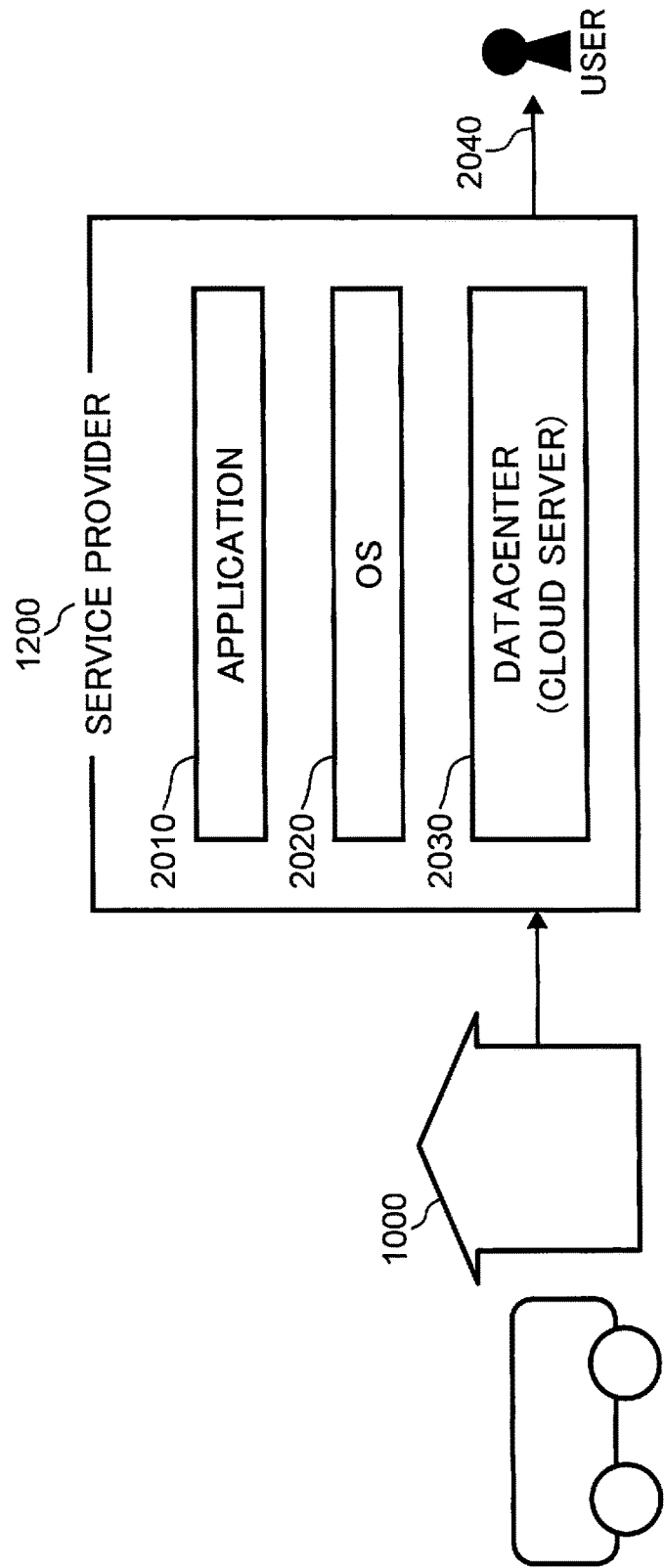
FIG. 41 is a diagram illustrating an overview of services to be provided by a system for presenting information in service type 1 (proprietary data center type cloud service).

FIG. 41 is a diagram illustrating an overview of services to be provided by a system for presenting information in service type 1 (proprietary data center type cloud service). In the present type, the service provider 1200 acquires information from the group 1000, and provides a service to a user. In the present type, the service provider 1200 has functions of a data center operating company. In other words, the service provider 1200 owns a cloud server 110 that manages big data. Therefore, a data center operating company does not exist.

In the present type, the service provider 1200 operates and manages the data center (cloud server) 203. In addition, the service provider 1200 manages an operating system (OS) 2020 and an application 2010. The service provider 1200 provides a service using the OS 2020 and the application 2010 managed by the service provider 1200 (the arrow 2040).

(Service Type 2: Cloud Service Using IaaS)

Figure 42:
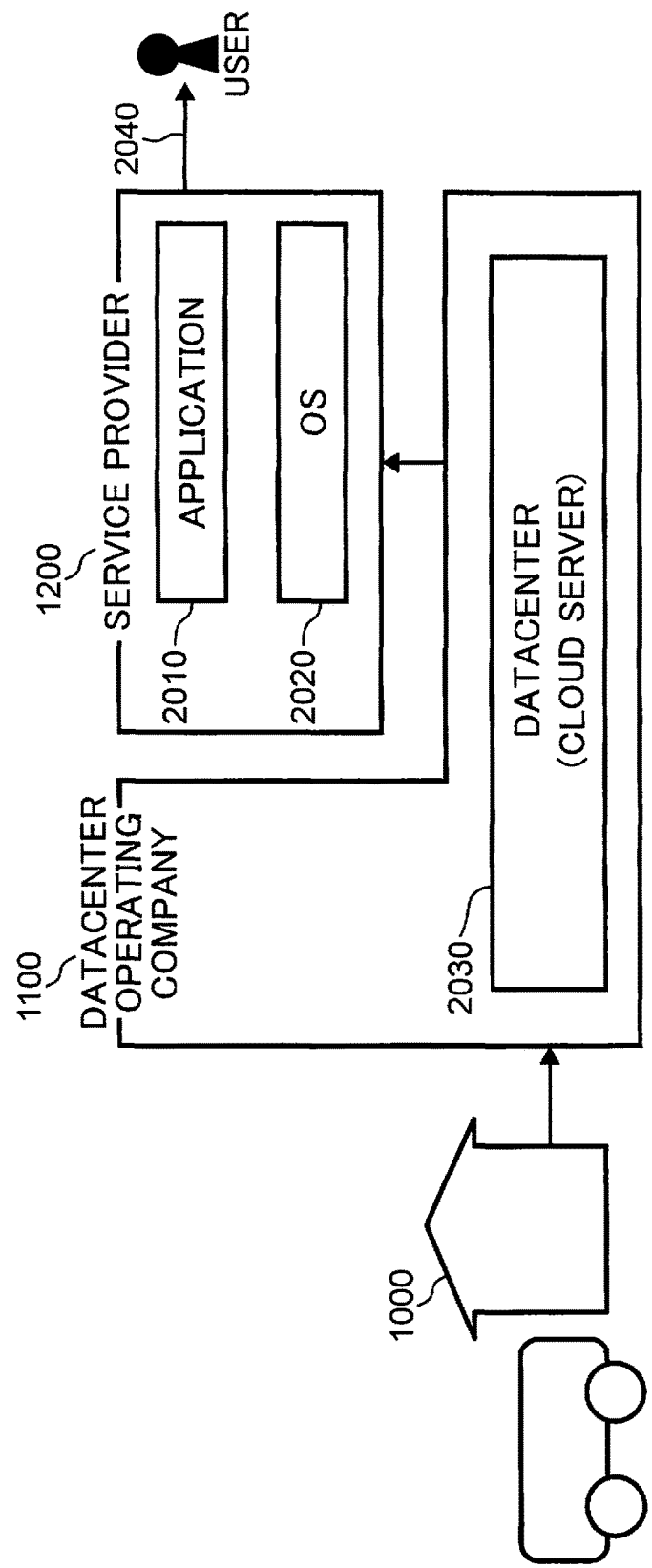
FIG. 42 is a diagram illustrating an overview of a service to be provided by a system for presenting information of service type 2 (cloud service using IaaS).

FIG. 42 is a diagram illustrating an overview of a service to be provided by a system for presenting information of service type 2 (cloud service using IaaS). In this case, IaaS is an abbreviation of Infrastructure as a Service and refers to a cloud service provision model where an infrastructure for building and running a computer system itself is provided as an Internet-based service.

In the present type, the data center operating company 1100 operates and manages the data center (cloud server) 2030. In addition, the service provider 1200 manages an OS 2020 and an application 2010. The service provider 1200 provides a service using the OS 2020 and the application 2010 managed by the service provider 1200 (the arrow 2040).

(Service Type 3: Cloud Service Using PaaS)

FIG. 43 is a diagram illustrating an overview of services to be provided by a system for presenting information of service type 3 (cloud service using PaaS). In this case, PaaS is an abbreviation of Platform as a Service and refers to a cloud service provision model where a platform that constitutes a foundation for building and running software is provided as an Internet-based service.

In the present type, the data center operating company 1100 manages the OS 2020 and operates and manages the data center (cloud server) 2030. In addition, the service provider 1200 manages the application 2010. The service provider 1200 provides service using the OS 2020 managed by the data center operating company 1100 and the application 2010 managed by the service provider 1200 (the arrow 2040).

(Service Type 4: Cloud Service Using SaaS)

FIG. 44 is a diagram illustrating an overview of services to be provided by a system for presenting information of service type 4 (cloud service using SaaS). In this case, PaaS is an abbreviation of Platform as a Service. The cloud service using SaaS is a cloud service provision model having, for example, a function that enables a user such as a company or an individual that does not own a data center (cloud server) to use an application provided by a platform provider that owns a data center (cloud server) via a network such as the Internet.

In the present type, the data center operating company 1100 manages the application 2010, manages the OS 2020, and operates and manages the data center (cloud server) 2030. In addition, the service provider 1200 provides a service using the OS 2020 and the application 2010 managed by the data center operating company 1100 (the arrow 2040).

As described above, the service provider 1200 provides services in all types of cloud services. In addition, for example, an OS, an application, a database for big data, and the like may be developed in-house or may be outsourced by the service provider or the data center operating company.

The present invention has been described on the basis of the aforementioned embodiments and modifications. However, the present invention should not be limited to the aforementioned embodiments and modifications. The present invention further includes the following modifications.

(1) Specifically, each of the aforementioned devices is a computer system configured by, for example, a microprocessor, a ROM (Read Only Memory), a RAM (Random Access Memory), a hard disk unit, a display unit, a keyboard, and a mouse. The RAM or the hard disk unit stores a computer program. The microprocessor operates in accordance with the computer program to thereby achieve functions of each of the devices. In this case, the computer program is configured by combinations of a plurality of command codes indicating commands to the computer in order to achieve predetermined functions.

(2) A part of or an entirety of the constituent elements of each of the aforementioned devices may be configured by a single system LSI (Large Scale Integration). The system LSI is a super multifunctional LSI manufactured by integrating a plurality of constituent units on a single tip, i.e. a computer system configured by a microprocessor, a ROM, a RAM and the like. The RAM stores a computer program. The microprocessor operates in accordance with the computer program to thereby achieve functions of each of the system LSI.

Moreover, each part of the constituent elements of each of the devices may be independently configured as a single tip, or all the constituent elements may be integrally configured as a single tip.

The system is represented as the LSI in this case, but is also represented as an IC (Integrated Circuit), an LSI, a super LSI, or an ultra LSI depending on an integrational difference. Furthermore, the manner to realize the integrated circuit is not limited to the LSI, and the integrated circuit may be realized by a special circuit or a widely-used processor. An FPGA (Field Programmable Gate Array) or a reconfigurable processor may be used, the FPGA being programmable, and the reconfigurable processor being reconfigurable to connect or set a circuit cell in the LSI, after the manufacturing of the LSI.

Moreover, in accordance with an emergence of an advanced technology which realizes the integration circuit in place of the LSI owing to the progress of the semiconductor technology or another relevant technology, the advanced technology may be of course utilized to integrate function brocks. The possible advanced technology for realizing the integrated circuit in place of the LSI may include utilization of, for example, a biotechnology.

(3) A part of or an entirety of the constituent elements of each of the aforementioned devices may be configured by an IC card or a single module detachably attachable to each of the devices. The IC card or the module is a computer system configured by, for example, a microprocessor, a ROM, and a RAM. The IC card or the module may include the aforementioned super multi-functional LSI. The microprocessor operates in accordance with a computer program to thereby achieve functions of the IC card or the module. The IC card or the module may have a tamper resistance.

(4) The present invention may include the aforementioned methods. Furthermore, the present invention may include a computer program to be realized by these methods using a computer, or a digital signal configured by the computer program.

The present invention may include a computer-readable recording medium which records the aforementioned computer program or digital signal, for example, a flexible disk, a hard disk, a CD-ROM, an MO, a DVD, a DVD-ROM, a DVD-RAM, a BD (Blu-ray (registered trademark) Disc), or a semiconductor memory. Or, the present invention may be a digital signal recorded in the recording medium.

The present invention may transmit the computer program or the digital signal via a telecommunication line, a wireless communication line, a wired communication line, a network represented by the Internet, or a data broadcast.

The present invention may include a computer system including a microprocessor and a memory. The memory may store the aforementioned computer program, and the microprocessor may operate in accordance with the aforementioned computer program.

The present invention may be implemented by other independent computer system by recording the computer program or the digital signal in the recording medium to be transferred, or transferring the computer program or digital signal via the network and the like.

(5) One or more of the aforementioned embodiments and the modifications may be combined in the present invention.

The aforementioned concrete embodiments mainly include the inventions having the below-mentioned configurations.

A method for presenting information according to one aspect of the present invention includes: an image information presenting step of presenting image information; an operative step of accepting a predetermined input operation by a user during the presentation of the image information; a guide destination acquiring step of acquiring guide destination information indicating a guide destination to which the user is guided, the guide destination information being specified by date and time information indicating a date and a time at which the input operation is accepted in the operative step, and image specifying information specifying the image information presented in the image information presenting step when the input operation is accepted; a storing step of storing the date and time information, the image specifying information, and the guide destination information in a database in association with one another; and a guide destination presenting step of presenting the guide destination information in response to a request from the user.

In this configuration, the image information is presented, and the predetermined input operation by the user is accepted during the presentation of the image information. The guide destination information indicating the guide destination to which the user is guided is acquired, the guide destination information being specified by the date and time information indicating the date and the time at which the input operation is accepted, and the image specifying information specifying the image information presented when the input operation is accepted. The date and time information, the image specifying information, and the guide destination information is stored in the database in association with one another. Then, the guide destination information is presented in response to the request from the user.

In this manner, the guide destination indicating the guide destination to which the user is guided is acquired, the guide destination being specified by the date and time information indicating the date and the time at which the input operation is accepted, and the image specifying information specifying the image information presented when the input operation is accepted. The date and time information, the image specifying information, and the guide destination information is stored in the database in association with one another. Accordingly, it is possible to guide the user to the guide destination introduced in a scene in which the user has an interest during viewing of the image information.

In the aforementioned method, it is preferable that the guide destination information includes information indicating a place which is specified by the date and time information and the image specifying information, and is introduced in the image information.

In this configuration, it is possible to guide the user to the place introduced in the image information.

In the aforementioned method, it is preferable that the guide destination information includes information indicating a network address which is specified by the date and time information and the image specifying information, and is in connection with a selling of a commodity introduced in the image information.

In this configuration, it is possible to guide the user to the network address which is in connection with the selling of the commodity introduced in the image information.

In the aforementioned method, it is preferable in the operative step that a pushing down of a predetermined button by a user is accepted during the presentation of the image information.

In this configuration, the pushing down of the predetermined button by the user is accepted, thereby allowing the user to easily designate a scene in which the user has the interest during viewing of the image information.

In the aforementioned method, it is preferable in the operative step that a voice uttered by the user is accepted during the presentation of the image information.

In this configuration, the voice uttered by the user is accepted, thereby allowing the user to easily designate the scene in which the user has the interest.

In the aforementioned method, it is preferable in the operative step that a character input by the user is accepted during the presentation of the image information.

In this configuration, the character input by the user is accepted, thereby allowing the user to easily designate a scene in which the user has an interest during viewing of the image information.

In the aforementioned method, it is preferable in the guide destination presenting step that the guide destination information is presented on a screen, and in the operative step that sight line information indicating a sight line position of the user over a screen is accepted during the presentation of the image information.

In this configuration, the guide destination information is displayed on the screen, and the sight line information indicating the sight line position of the user over the screen is accepted. Whereby, in the case that a plurality of places or commodities are displayed in one scene, it is possible to specify a place or a commodity in which the user has an interest.

In the aforementioned method, it is preferable in the guide destination presenting step that, the guide destination information is displayed on a screen; and, in the operative step, an input operation of a positional coordinate on the screen is accepted, the positional coordinate being designated by a pointing device, the method further including: an acquiring step of acquiring guide destination information which corresponds to the positional coordinate accepted in the operative step, wherein in the storing step, the date and time information, the image specifying information, and the guide destination information acquired in the acquiring step is stored.

In this configuration, the input operation of the positional coordinate on the screen is accepted, the positional coordinate being instructed by the pointing device. Also, the guide destination information corresponding to the accepted positional coordinate is acquired. Therefore, in the case that a plurality of places or commodities are displayed in one scene, it is possible to specify a place or commodity in which the user has an interest.

In the aforementioned method, it is preferable in the storing step that user information identifying the user is further stored in association with other information.

In this configuration, the user information identifying the user is further stored in association with other information. Therefore, it is possible to create a database for each user.

In the aforementioned method, it is preferable in the storing step that information presenting device identifying information is stored in association with other information, the information presenting device identifying information being adapted for identifying an information presenting device which presents the image information in the image information presenting step.

In this configuration, the information presenting device being adapted for identifying information identifying the information presenting device which presents image information is further stored in association with other information. Therefore, it is possible to create a database for each information presenting device.

In the aforementioned method, in the storing step, it is preferable in the storing step that guide device identifying information is stored in association with other information, the guide device identifying information being adapted for identifying a guide device which presents the guide destination information in the guide destination presenting step.

In this configuration, the guide device identifying information being adapted for identifying the guide device which presents the guide destination information is further stored in association with other information. Therefore, it is possible to create a database for each guide device.

It is preferable that the aforementioned method further includes: a generating step of judging whether or not images taken by an other user at a plurality of places include one similar to an image included in the image information presented when the input operation by the user is accepted, and, when a similar image is judged to be included, generating locational information given to the image taken by the other user as the guide destination information.

In this configuration, it is unnecessary to give the guide destination information to the image information, and it is possible to create the guide destination information by using the locational information given to the picture taken by other user.

In the aforementioned method, it is preferable in the generating step that, when a plurality of pieces of guide destination information are generated, a priority order of the plurality of pieces of guide destination information is determined in response to an input operation accepted in the operative step; and in the guide destination presenting step, the plurality of pieces of guide destination information are presented in accordance with the determined priority order.

In this configuration, when the plurality of pieces of guide destination information are generated, the priority order of the plurality of pieces of guide destination information is determined in response to the accepted input operation. Therefore, it is possible to generate the guide destination information in the priority order of a scene for which more input operations are performed.

It is preferable that the aforementioned method further includes: a storage completion presenting step of presenting information indicating that the guide destination information is stored in the database, after the guide destination information is stored in the database in the storing step.

In this configuration, after the guide destination information is stored in the database, information indicating that the guide destination information is stored is presented. Therefore, the user can know that the guide destination introduced in a scene in which the user has the interest in the image information is guidable.

In the aforementioned method, it is preferable in the guide destination presenting step that it is presented whether or not the guide destination information is stored in the database in response to the request from the user.

In this configuration, it is presented whether or not the guide destination information is stored in the database in response to the request from the user, thereby allowing the user to confirm whether or not the guide destination is stored in the database.

In the aforementioned method, it is preferable in the guide destination presenting step that, when a plurality of pieces of guide destination information are presented, the plurality of pieces of guide destination information are presented in an order of presentations of the image information.

In this configuration, it is possible to present the plurality of pieces of guide destination in the order of presentations of the image information.

It is preferable that the aforementioned method further includes: a counting step of counting the number of storage incidences that a plurality of other users store in other databases the same guide destination information as that stored in the database, wherein, in the guide destination presenting step, when a plurality of pieces of guide destination information are presented, the plurality of pieces of guide destination information are presented in a descending order of the number of storage incidences in the other databases.

In this configuration, it is possible to present the plurality of pieces of guide destination information in the descending order of the number of storage incidences in the other databases.

In the aforementioned method according, it is preferable in the guide destination presenting step that, when a plurality of pieces of guide destination information are presented, the a plurality of pieces of guide destination information are presented in an order of their locational nearness to a current location of a presenting device which presents the plurality of pieces of guide destination information.

In this configuration, it is possible to present the plurality of pieces of guide destination information in the order of their locational nearness to the current location of the presenting device.

An operative program according to another aspect of the present invention is an operative program for accepting an operation by a user, the program causing a computer to function as: an operative unit which accepts a predetermined input operation during a presentation of image information; and a transmitting unit which transmits date and time information indicating a date and a time at which the input operation is accepted by the operative unit, wherein the date and time information is used, in association with image specifying information specifying the image information presented when the input operation is accepted, to specify guide destination information indicating a guide destination to which the user is guided.

In this configuration, the predetermined input operation by the user is accepted during the presentation of the image information, and the date and time information indicating the date and the time at which the input operation is accepted is transmitted. The date and time information is used together with the image specifying information specifying the image information presented when the input operation is accepted in order to specify the guide destination information indicating the guide destination to which the user is guided. Therefore, it is possible to designate a scene in which the user has an interest during viewing of the image information, and guide the user to the guide destination introduced in the scene in which the user has the interest.

A system for presenting information according to another aspect of the present invention is a system for presenting image information, including: an information presenting device which presents image information; an operative device which accepts a predetermined input operation by a user during the presentation of the image information; a guide information managing device which stores date and time information indicating a date and a time at which the input operation is accepted by the operative device, image specifying information specifying the image information presented by the information presenting device when the input operation is accepted, and guide destination information indicating a guide destination to which the user is guided in a database in association with one another, the guide destination information being specified by the date and time information, and the image specifying information; and a presenting device which presents the guide destination information stored in the guide information managing device.

In this configuration, the image information is presented, and the predetermined input operation by the user is accepted during the presentation of the image information. The date and time information indicating the date and the time at which the input operation is accepted, the image specifying information specifying the image information presented when the input operation is accepted, and the guide destination information indicating the guide destination to which the user is guided is stored in the database in association with one another, the guide destination information being specified by the date and time information, and the image specifying information. Then, the guide destination information is presented in response to the request from the user.

As described above, the date and time information indicating the date and the time at which the input operation is accepted by the operative device, the image specifying information specifying the image information presented by the information presenting device when the input operation is accepted, and the guide destination information indicating the guide destination to which the user is guided is stored in the database in association with one another, the guide destination information being specified by the date and time information, and the image specifying information. Therefore, it is possible to guide the user to the guide destination introduced in the scene in which the user has the interest during viewing of the image information.

Moreover, the information presenting device may include the functions of the operative device. Also, the information presenting device may include the functions of the presenting device. Furthermore, the information presenting device may include the functions of the operative device and the presenting device.

INDUSTRIAL APPLICABILITY OF THE INVENTION

The method for presenting information, the operative program, and the system for presenting information according to the present invention make it possible to guide a user to a guide destination introduced in a scene in which the user has an interest during viewing of image information, thus are respectively useful as a method for presenting information, an operative program and a system for presenting information.

The invention claimed is:

1. A method for presenting information, comprising:
an image information presenting step of presenting image information;
an operative step of accepting a first input operation representing one of a pushing down of a predetermined button by a user and an input of a predetermined voice uttered by the user, and a second input operation representing an input of sight line information indicating a position of a sight line of the user over a screen during the presenting of the image information;
an output step of outputting date and time information indicating a current date and time by a first trigger that the first input operation is accepted;
a coordinate recognizing step of specifying a positional coordinate on the screen from the position of the sight line of the user over the screen input via the second input operation by a second trigger that the first input operation is accepted;
a guide destination acquiring step of: specifying one scene in the image information by the date and time information output in the output step, and specifying image specifying information specifying the image information presented in the image information presenting step when the first input operation is accepted; and acquiring guide destination information associated with the positional coordinate in the specified one scene and indicating a guide destination to which the user is guided;

a storing step of storing the date and time information, the image specifying information, and the guide destination information in one database in association with one another;

a counting step of counting a number of storage incidences that a plurality of other users stores in other databases the same guide destination information as that stored in the one database; and a guide destination presenting step of, when a plurality of pieces of guide destination information is presented in response to a request from the user, presenting the plurality of pieces of guide destination information in a descending order of the number of storage incidences in the other databases.

2. The method according to claim 1, wherein the guide destination information includes information indicating a place which is specified by the date and time information and the image specifying information, and is introduced in the image information.

3. The method according to claim 1, wherein the guide destination information includes information indicating a network address which is specified by the date and time information and the image specifying information, and is in connection with a selling of a commodity introduced in the image information.

4. The method according to claim 1, wherein, in the storing step, user information identifying the user is further stored in association with other information.

5. The method according to claim 1, wherein, in the storing step, information presenting device identifying information is stored in association with other information, the information presenting device identifying information being adapted for identifying an information presenting device which presents the image information in the image information presenting step.

6. The method according to claim 1, wherein, in the storing step, guide device identifying information is stored in association with other information, the guide device identifying information being adapted for identifying a guide device which presents the guide destination information in the guide destination presenting step.

7. The method according to claim 1, further comprising: a generating step of judging whether or not images taken by an other user at a plurality of places include one similar to an image included in the image information presented when the first input operation by the user is accepted, and, when a similar image is judged to be included, generating locational information given to the image taken by the other user as the guide destination information.

8. The method according to claim 7, wherein, in the generating step, when the plurality of pieces of guide destination information is generated, a priority order of the plurality of pieces of guide destination information is determined in response to the first input operation accepted in the operative step, and in the guide destination presenting step, the plurality of pieces of guide destination information is presented in accordance with the determined priority order.

9. The method according to claim 1, further comprising: a storage completion presenting step of presenting information indicating that the guide destination information is stored in the one database, after the guide destination information is stored in the one database in the storing step.

10. The method according to claim 1, wherein, in the guide destination presenting step, a presentation is made as to whether or not the guide destination information is stored in the one database in response to the request from the user.

11. The method according to claim 1, wherein, in the guide destination presenting step, when the plurality of pieces of guide destination information is presented, the plurality of pieces of guide destination information is presented in an order of presentations of the image information.

12. The method according to claim 1, wherein, in the guide destination presenting step, when the plurality of pieces of guide destination information is presented, the plurality of pieces of guide destination information is presented in an order of a locational nearness of each of the plurality of pieces of guide destination information to a current location of a presenting device which presents the plurality of pieces of guide destination information.

13. A non-transitory computer readable recording medium storing an operative program for accepting an operation by a user, the program causing a computer to function as:

an operative unit which accepts a first input operation representing one of a pushing down of a predetermined button by the user and an input of a predetermined voice uttered by the user, and a second input operation representing an input of sight line information indicating a position of a sight line of the user over a screen during a presentation of image information;

an output unit which outputs date and time information indicating a current date and time by a first trigger that the first input operation is accepted;

a coordinate recognizing unit which specifies a positional coordinate on the screen from the position of the sight line of the user over the screen input via the second input operation by a second trigger that the first input operation is accepted; and a transmitting unit which transmits the date and time information output by the output unit, and the positional coordinate specified by the coordinate recognizing unit, wherein the date and time information and the positional coordinate are used, in association with image specifying information specifying the image information presented when the first input operation is accepted, to specify guide destination information associated with the positional coordinate in one scene specified by the date and time information and the image specifying information, and indicating a guide destination to which the user is guided, the date and time information, the image specifying information, and the guide destination information are stored in one database in association with one another, a number of storage incidences that a plurality of other users stores in other databases the same guide destination information as that stored in the one data base is counted, and when a plurality of pieces of guide destination information is presented in response to a request from the user, the plurality of pieces of guide destination information is presented in a descending order of the number of storage incidences in the other databases.

14. A system comprising:
an information presenting device which presents image information;
an operative device which accepts a first input operation representing one of a pushing down of a predetermined button by a user and an input of a predetermined voice uttered by the user, and a second input operation representing an input of sight line information indicating a position of a sight line of the user over a screen during the presentation of the image information;
an output unit which outputs date and time information indicating a current date and time by a first trigger that the first input operation is accepted;
a coordinate recognizing unit which specifies a positional coordinate on the screen from the position of the sight line of the user over the screen input via the second input operation by a second trigger that the first input operation is accepted;
a guide information managing device which stores the date and time information output by the output unit, image specifying information specifying the image information presented by the information presenting device when the first input operation is accepted, and guide destination information indicating a guide destination to which the user is guided in one database in association with one another, the guide destination information being associated with the positional coordinate in one scene specified by the date and time information, and the image specifying information; and
a presenting device which presents the guide destination information stored in the guide information managing device, wherein
the guide destination information managing device counts a number of storage incidences that a plurality of other users stores in other databases the same guide destination information as that stored in the one data base, and
when a plurality of pieces of guide destination information is presented in response to a request from the user, the presenting device presents the plurality of pieces of guide destination information in a descending order of the number of storage incidences in the other databases.

15. The method according to claim 1, further comprising a generating step, wherein
in the generating step, a voice included in the image information presented when the first input operation by the user is accepted is recognized, and locational information included in the voice is generated as the guide destination information.

16. The method according to claim 1, further comprising a generating step, wherein
in the generating step, input of information indicating a place by the other user having viewed the same image information is accepted, and the accepted information indicating the place is generated as the guide destination information.

* * * * *